(12) United States Patent
Ludwig et al.

(10) Patent No.: US 6,816,904 B1
(45) Date of Patent: Nov. 9, 2004

(54) NETWORKED VIDEO MULTIMEDIA STORAGE SERVER ENVIRONMENT

(75) Inventors: Lester Ludwig, Hillsborough, CA (US); William Blake Brown, Los Gatos, CA (US); Inn J. Yul, Cupertino, CA (US); Anh T. Vuong, San Jose, CA (US); Richard W. Vanderlippe, San Francisco, CA (US); Gerald Burnett, Atherton, CA (US); Chris Lauwers, Menlo Park, CA (US); Richard Lui, Union City, CA (US); Daniel Applebaum, Incline Village, NV (US)

(73) Assignee: Collaboration Properties, Inc., Redwood Shores, CA (US)

( * ) Notice: Subject to any disclaimer, the term of this patent is extended or adjusted under 35 U.S.C. 154(b) by 0 days.

(21) Appl. No.: 09/565,192

(22) Filed: May 4, 2000

Related U.S. Application Data

(63) Continuation of application No. PCT/US98/23596, filed on Nov. 4, 1998.
(60) Provisional application No. 60/064,266, filed on Nov. 4, 1997.

(51) Int. Cl.[7] .................. G06F 17/30; G06F 15/173
(52) U.S. Cl. .................. 709/226; 709/204; 725/145
(58) Field of Search ................ 725/145, 146; 709/204, 205, 206, 226, 229, 231; 711/111, 112, 114; 348/384.1, 390.1; 718/105, 104

(56) References Cited

U.S. PATENT DOCUMENTS

| | | | | |
|---|---|---|---|---|
| 5,262,875 A | * | 11/1993 | Mincer et al. | 728/88 |
| 5,581,479 A | * | 12/1996 | McLaughlin et al. | 725/145 |
| 5,594,924 A | * | 1/1997 | Ottesen et al. | 725/116 |
| 5,751,336 A | * | 5/1998 | Aggarwal et al. | 725/146 |
| 6,212,681 B1 | * | 4/2001 | Ikeda | 725/92 |
| 6,353,699 B1 | * | 3/2002 | Schwab | 725/116 |

* cited by examiner

Primary Examiner—Dung C. Dinh
(74) Attorney, Agent, or Firm—Sughrue Mion, PLLC

(57) ABSTRACT

A video storage environment for a networked multimedia system comprising a plurality of workstations, each with audio and video reproduction and capture capabilities. The video storage environmental comprises one or more storage servers. In one embodiment, each video storage server comprises at least one storage cell. Each storage cell internally comprises at least one storage disk, at least one converter, and at least one storage disk, at least one converter, and at least one storage cell manager. The invention provides for various methods of resource allocation under various conditions and policies where there are pluralities of like entities. The invention also provides for transfers of video files among storage disks anywhere in the storage environment, and provides for the same video file to be used simultaneously by multiple users and types of applications. The approach can be extended to included multimedia files comprising any of graphics animations, dynamic annotations, text, and other media accompanying the stored video.

22 Claims, 46 Drawing Sheets

User 1 sees mosaic of users 1 and 2
User 2 sees mosaic of users 1 and 2
AVSS receives mosaic of users 1 and 2

User 1 sees closeup of user 2
User 2 sees closeup of user 1
AVSS receives mosaic of users 1 and 2

User 1 sees mosaic of users 1 and 2
User 2 sees closeup of user 1
AVSS receives mosaic of users 1 and 2

NETWORKED VIDEO MULTIMEDIA STORAGE SERVER ENVIRONMENT

RELATED CASES

This application is a continuation of PCT Application No. PCT/US98/23596, filed Nov. 4, 1998, which claims priority from U.S. provisional Application No. 60/064,266, filed Nov. 4, 1997.

1. BACKGROUND OF THE INVENTION

1.1 Field of the Invention

The present invention relates generally to a scalable networked multimedia system, and more particularly to a scalable audio-video server system and Application Program Interface (API) together with a range of associated software applications that together provide high-quality audio-video and multimedia processing capabilities.

1.2 Background

In recent years, considerable effort has been directed toward the development of hardware and software for network-based audio-video (A/V) and, more generally, networked multimedia systems. Such development has been driven by technology push from equipment manufacturers, as well as the commercial potential of entertainment applications such as video-on-demand and multi-player gaming; and business applications such as video messaging and multimedia conference collaboration.

A critical factor impacting the usefulness and value of a network-based multimedia system is the manner in which computational resources are organized to define a video file storage/encoding/decoding/distributionsystem, hereafter referred to an Audio-Video Storage System (AVSS). Several key requirements exist with regard to defining a Audio Video Storage System applicable to business applications. With particular emphasis on deployment in a business environment supporting multimedia conference collaboration and characterized by on-premises (i.e., local) and wide-area networks, these requirements include the following:

1) ubiquitous premises scalability;
2) ubiquitous wide-area scalability;
3) limited impact upon network loading;
4) low implementation and operational costs;
5) accommodation of multiple desktop platforms (modern, existing, and outdated);
6) accommodation of multiple compression standards;
7) support for a wide range of high-performance, high-quality video-enabled applications;
8) cost-effective ability to upgrade across successive technology and standards generations; and
9) API extensibility.

A collaborative multimedia environment employing a video storage system necessarily includes a plurality of desktop workstations, encoding and decoding resources, video file storage resources, and a premises video distribution network. Two architectural design factors greatly influence the extent to which the aforementioned key requirements can be simultaneously met, namely, 1) the organization of the encoding/decoding resources and video file storage resources relative to the desktop workstations and video distribution network; and 2) the nature of the video distribution network itself.

Encoding and decoding resources, as well as video file storage resources, can be allocated on a desktop-by-desktop basis, or a network (i.e., shared) basis. FIG. 1 illustrates an exemplary Erlang resource sharing utilization relationship 2 showing computational resource utilization efficiency 1 relative to the number of users sharing the resource 6 under fixed blocking conditions. As indicated in FIG. 1, network-based resource allocation 3, 4 results in much higher resource utilization efficiency than desktop-dedicated resources, which are fully allocated to one user each (5). This is turn implies that video storage systems characterized by desktop-based resource allocation leverage technology investments for less effectively than systems that employ resource sharing, particularly in situations involving a significant number of workstation users 3 and/or relatively low usage rates (<20% of workday) by users. Additionally, desktop-based resource allocation undesirably results in greater system upgrade costs.

A video distribution network can be based upon analog technology, digital technology, or their combination. FIG. 2 is a graph showing the relative cost 2.1 of local-area analog and digital video signal distribution technology as a function of video quality 2.2, and hence includes an analog cost-versus-performance/qualitycurve 2.3 and a digital cost-versus-performance/qualitycurve 2.4. Across a first, lower-performance and lower-quality region 2.5 in FIG. 2 that could provide performance and quality suitable, for example, for technology experiments, digital signal distribution technology is significantly more expensive than its analog counterpart. The slope of the digital cost-versus-performance/quality curve 2.4 throughout this first region 2.5 is nearly constant, while that for analog cost-versus-performance/quality 2.3 gradually rises with increasing performance and image quality 2.2. A second region 2.6 shown in FIG. 2 spans a practical region of operation 2.7 relative to business-performance and business-quality levels, which herein correspond to video delivered at 30 frames per second (fps) at a resolution ranging from approximately 320×240 to 640×480 pixels or other standard resolution. Across the second region 2.6, the analog cost-versus-performance/ quality curve 2.3 begins to increase rapidly as performance and quality 2.2 improves, eventually meeting and exceeding the digital cost-versus-performance/qualitycurve 2.4. However, throughout most of the aforementioned practical region of operation 2.7, analog signal distribution technology remains significantly less expensive than its digital counterpart. Thus, for most business environment performance and quality requirements, analog signal distribution technology is more cost-effective than digital signal distribution technology. Readily-available digital network technology lacks sufficient bandwidth for delivering business-quality, real-time or near-real-time video to a large number of users. Finally, a third region 2.8 in FIG. 2 spans high-end or special-situation performance and quality levels 2.2. Within the third region 2.8, the cost of digital signal distribution technology begins to rapidly escalate.

FIG. 2 additionally indicates the manner in which the analog and digital cost-versus-performance/quality curves 2.3, 2.4 can be expected to evolve over time. For each technology type, overall cost 2.1 will decrease relative to a given performance and quality level 2.2 as the technology evolves. The general shape of the curves 2.3, 2.4 shown in FIG. 2, however, can be expected to remain essentially the same. Moreover, digital signal distribution technology is likely to evolve at a much more rapid pace than analog distribution technology in the near term, which implies higher costs 2.1 over a system's lifetime due to system upgrade frequency. Thus, video storage systems that rely upon all-digital video distribution technology are significantly less cost-effective than those employing analog distribution technology.

Known premises-based networked video storage systems fail to come anywhere close to meeting the aforementioned key requirements. Much of the reason for this results from the design approaches taken relative to the aforementioned architectural considerations, particularly when the architectural cornerstones are driven by established technology marketing trends rather than designing to meet true business requirements. What is needed is a video storage system that utilizes resource sharing and the full evolvable range of networked signal distribution technology to meet key cost and application quality requirements described above.

2. SUMMARY OF THE INVENTION

The present invention is a networked multimedia system comprising a plurality of workstations and at least one storage server. At least one signal path interconnects the workstations and the storage server. Each workstation includes video and audio reproduction capabilities, as well as video and audio capture capabilities. Any given storage server comprises a set of storage cells that operate under the direction of a storage cell manager. A storage cell may include one or more encoding and/or transcoding converters configured to convert or transform audio and video signals originating at a workstation into a form suitable for digital storage. A storage cell may further include one or more decoding converters configured to convert digitally-stored signals into a form suitable for audio and video signal reproduction at a workstation. Each storage cell additionally includes at least one storage device and storage device controller capable of storing, for later retrieval, signals generated by one or more converters.

The storage cell manager is responsive to signals received from the workstations, and oversees the operation of the storage cells to facilitate the storage of converted audio and video signals in at least one file that can be simultaneously accessed by one or more application programs executing on one or more workstations. In one embodiment, the storage cell manager directs the storage of converted signals by selecting a storage cell, and determining whether a converter contained therein has available bandwidth or capacity. If so, the storage cell manager selects a storage device controller within the selected storage cell, and determines whether the controller has available bandwidth or capacity. If so, the storage cell manager determines whether a storage device associated with the controller has available bandwidth or capacity, in which case the storage cell manager directs the converter and the selected storage device controller to convert and store the converted signals upon the selected storage device. In the event that bandwidth or capacity is unavailable for the converter, the storage device controller, or the storage device, the storage cell manager selects other such devices within the selected storage cell for consideration relative to bandwidth or capacity availability. If the selected storage cell has reached a bandwidth or capacity limit, the storage cell manager selects another storage cell for consideration. In the event that the storage cell manager or the storage server itself has reached a bandwidth or capacity limit, the storage cell manager requests another storage cell manager to direct the storage of the converted signals.

The storage cell manager further selectively directs the copying or transfer of stored converted signals between 1) any plurality of storage devices within a given storage cell; and/or 2) any set of storage cells, where one or more such storage cells may be under the control of another storage cell manager. Such copying or transfer maximizes the likelihood that any given file containing converted signals will be simultaneously accessible to one or more application programs executing upon multiple workstations. The storage cell manager may also direct the transfer of stored converted signals to workstations or other types of servers coupled to the networked multimedia system.

The storage cell manager also oversees the retrieval and decoding conversion of stored converted signals under the direction of one or more application programs executing on one or more workstations. Such retrieval and decoding conversion facilitates real-time and/or near real-time audio and video signal reproduction at such workstations.

In common usage, a multimedia file comprises one or more types of files and/or references to files, where such files may include textual, graphical, image, audio, and/or video information and/or commands or event sequences for generating or rendering such information. The multimedia file also includes temporal correlation data specifying one or more manners in which its constituent files and/or file references are associated in time. In addition to the above operations, the storage cell manager in one embodiment oversees the storage of these multimedia files or portions of them. The storage cell manager further oversees the retrieval of multimedia file contents and the distribution of such contents to one or more workstations in conjunction with audio and video signal reproduction at such workstations, in a manner specified by the temporal correlation data.

The system is configured to create a pointer referencing a predetermined file or group of files on one or more of the storage cells; to transmit at least the pointer to a receiving application program, and to render the contents of the file or group of files at a workstation by retrieving data from the file or group of files identified by the pointer.

The system also provides a viewer application for setting up connections and sessions; preparing files for viewing, and providing the necessary viewer interface to enable a user to access and manipulate files on the workstation, as permitted.

Further, the system has at least one stored-video application program on at least one of the storage sub-system and a workstation; and share at least one process primitive across at least two of the stored-video application programs. The stored-video application programs are one or more from the group consisting of: videoconference recording; video mail; video answering system; video documents; and video publishing. The system is further configured to share at least one data primitive across at least two of the plurality of stored-video application programs.

The system can also invoke a process primitive and a data primitive as standardized attachments to a file. Such attachment is in a format that is accepted by third parties in accordance with a standard data interchange protocol.

The system can also be configured to establish real time data sharing sessions between at least two workstations using a synchronized data sharing process as a shared conference window. It can use a video conference application to establish a video conference session among the interconnected workstations, and to use a video conference recording application to record at least a portion of the established video conference session on at least one storage sub-system.

The system is further configured to provide at least one video mail application, which can do at least one of authoring a video mail message for transmission to storage sub-system and reading a video mail message previously stored on the storage subsystem. The system typically utilizes a storage cell to record at least one of an audio, a video message, and a multimedia message from an incoming caller whose call attempt is one of not answered by the recipient, refused by the recipient, and made solely to leave a message without connecting to the recipient. Video files stored on a storage cell can be included in an on-line electronic document.

The system further can incorporate a shareboard or other window-sharing session, either static or synchronized with video or audio information to enable a multimedia implementation of at least one of video conference recording, video mail, video answering system, video documents, and video publishing.

Moreover the system can incorporate a video editing program. The video editing program may be implemented either as an integral part of at least one of the applications or by incorporating a third-party video editor.

The system can support video mail applications either using conventional third-party e-mail systems or e-mail systems enhanced to offer the ability to obtain and or file copy events from the e-mail system.

The system can support video document applications either using conventional third-party document systems or document systems enhanced to offer the ability to obtain and or file copy events from the document system.

In addition, the system can function as an internet proxy server for reducing the total number of copies of video files in the enterprise by file sharing, or reducing enterprise network load by transporting video files over a separate audio-video network, or transcoding among multiple audio-video formats, and or allowing any audio-video workstation in the enterprise to serve as a video publisher for the enterprise. Finally, the system, functioning as an internet proxy server, enables the implementation of at least one animated annotation on the internet.

3. BRIEF DESCRIPTION OF THE DRAWINGS

For fuller understanding of the principles of the present invention, reference is made to the several figures of the drawing. In the drawing.

Figure 37:
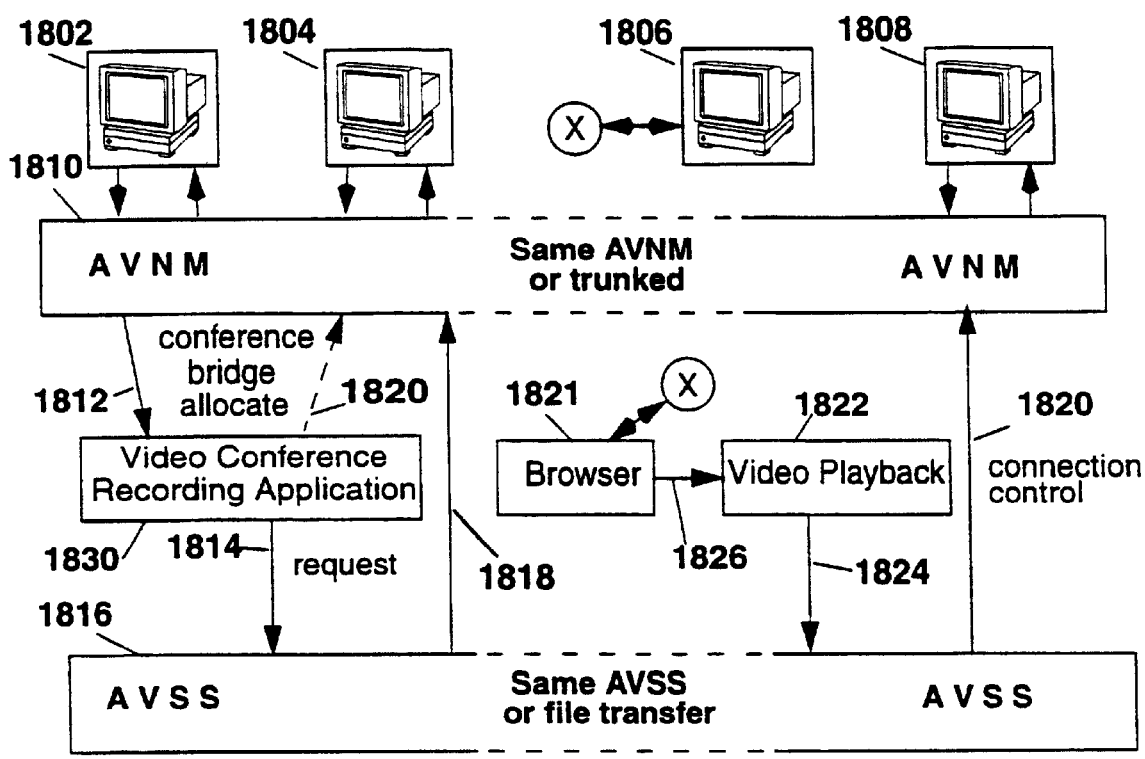

FIG. 37 an overview of the video conference recording application of the present invention.

Figure 38:
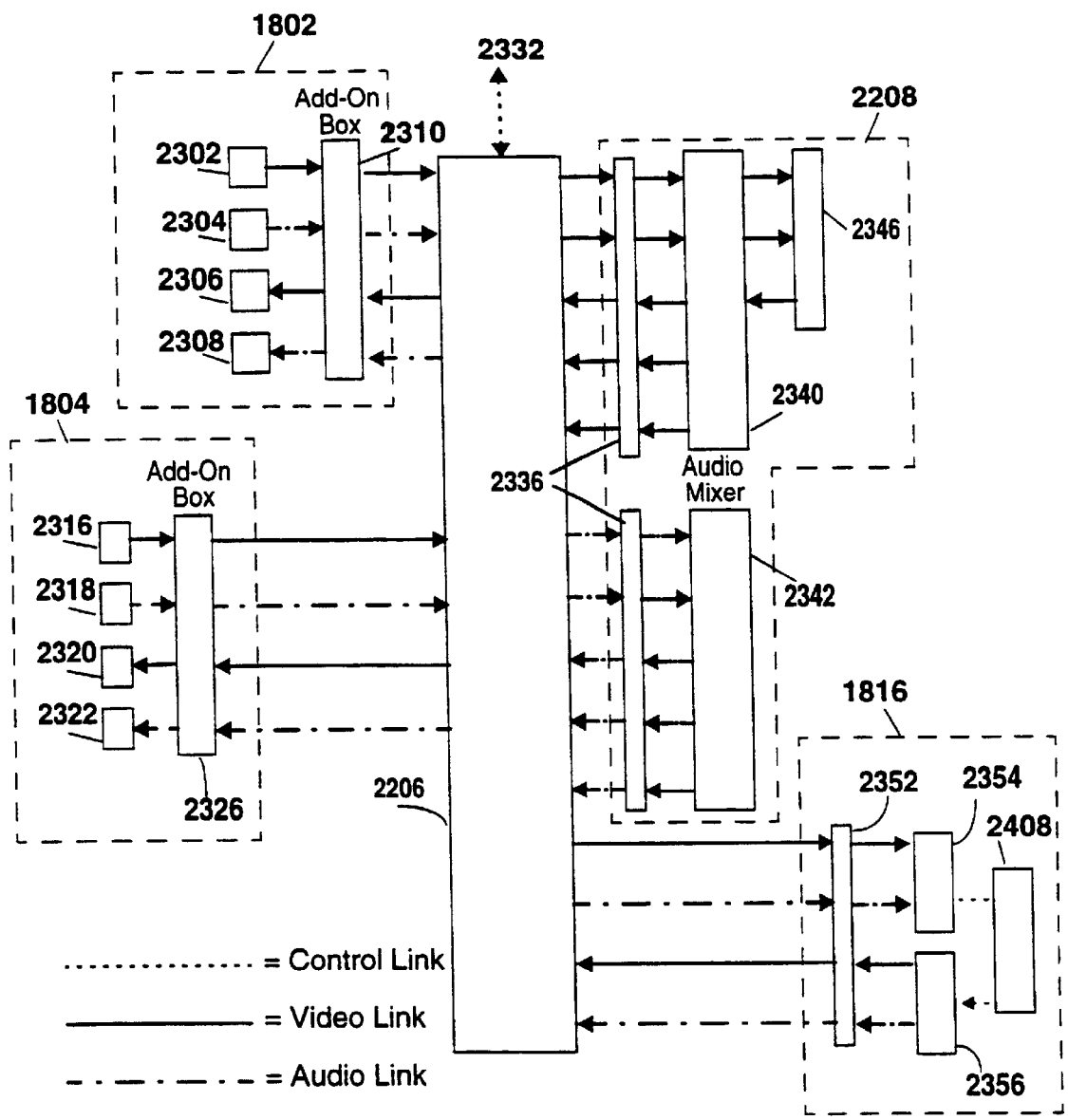

FIG. 38 an overview of several of the components of the present invention required to implement video conference recording.

Figure 39:
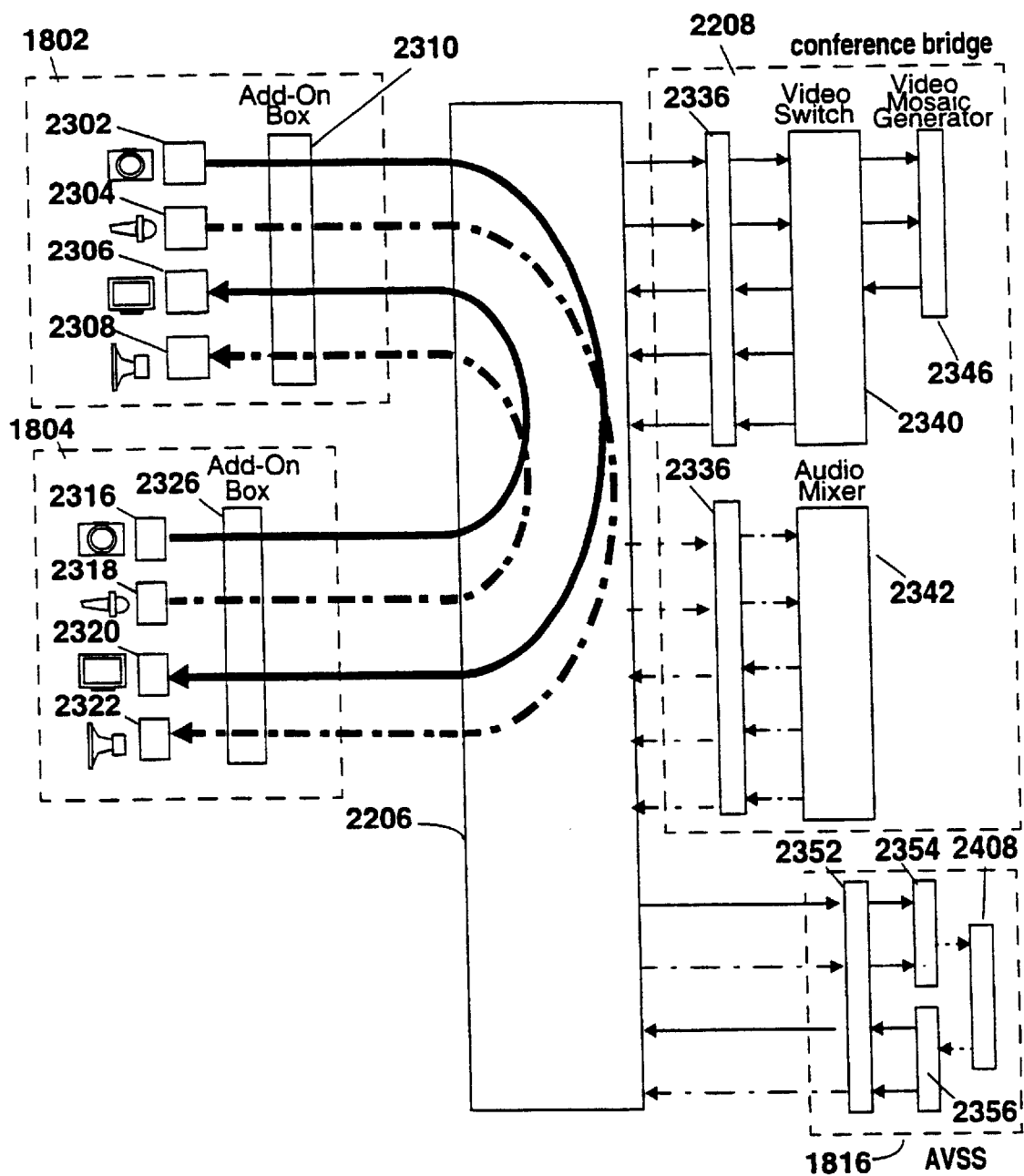

FIG. 39 is a signal state diagram of a two-party video conference.

Figure 40:
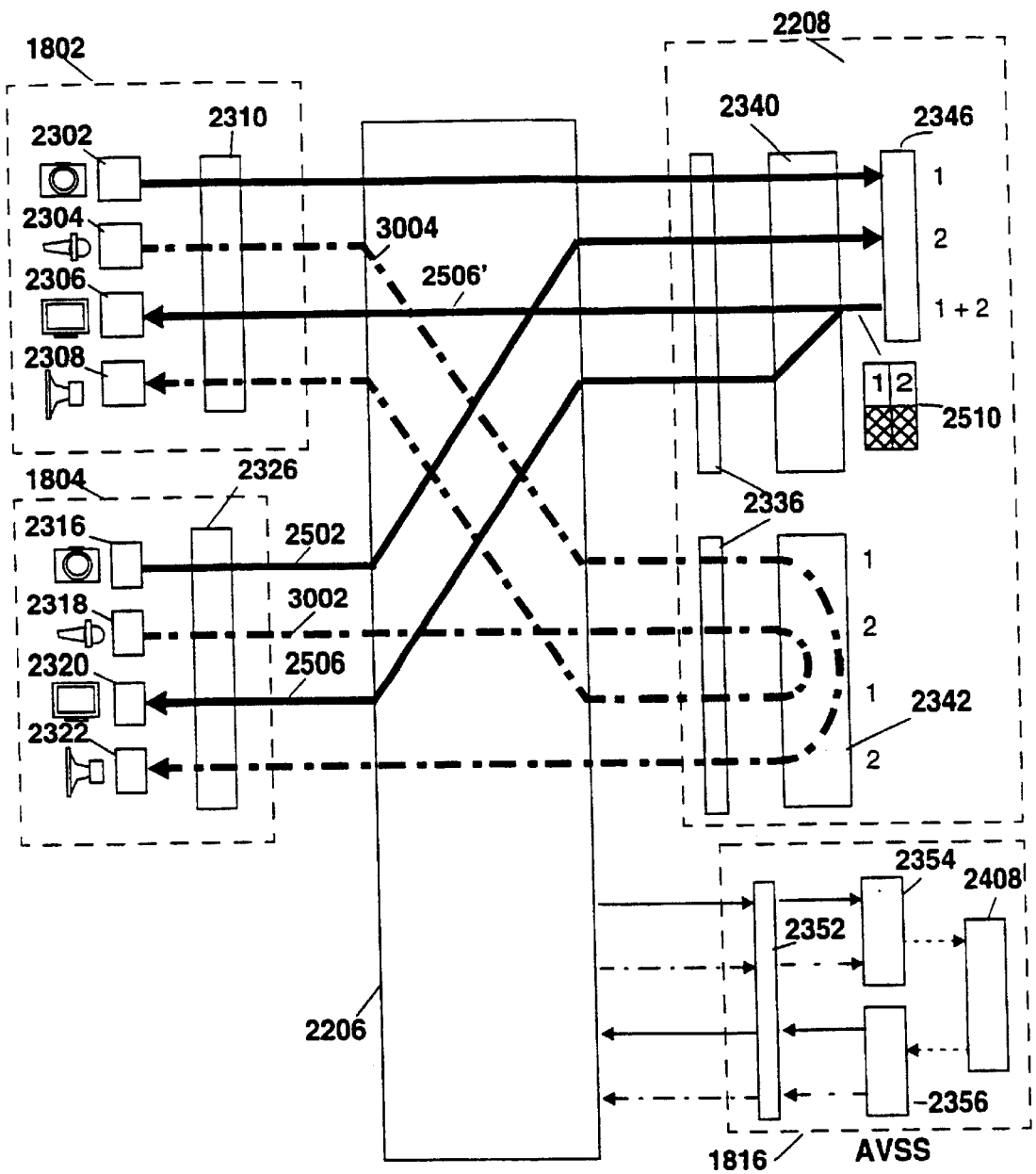

FIG. 40 is a signal state diagram of a video conference, including a third party or implementing conference recording.

Figure 41:
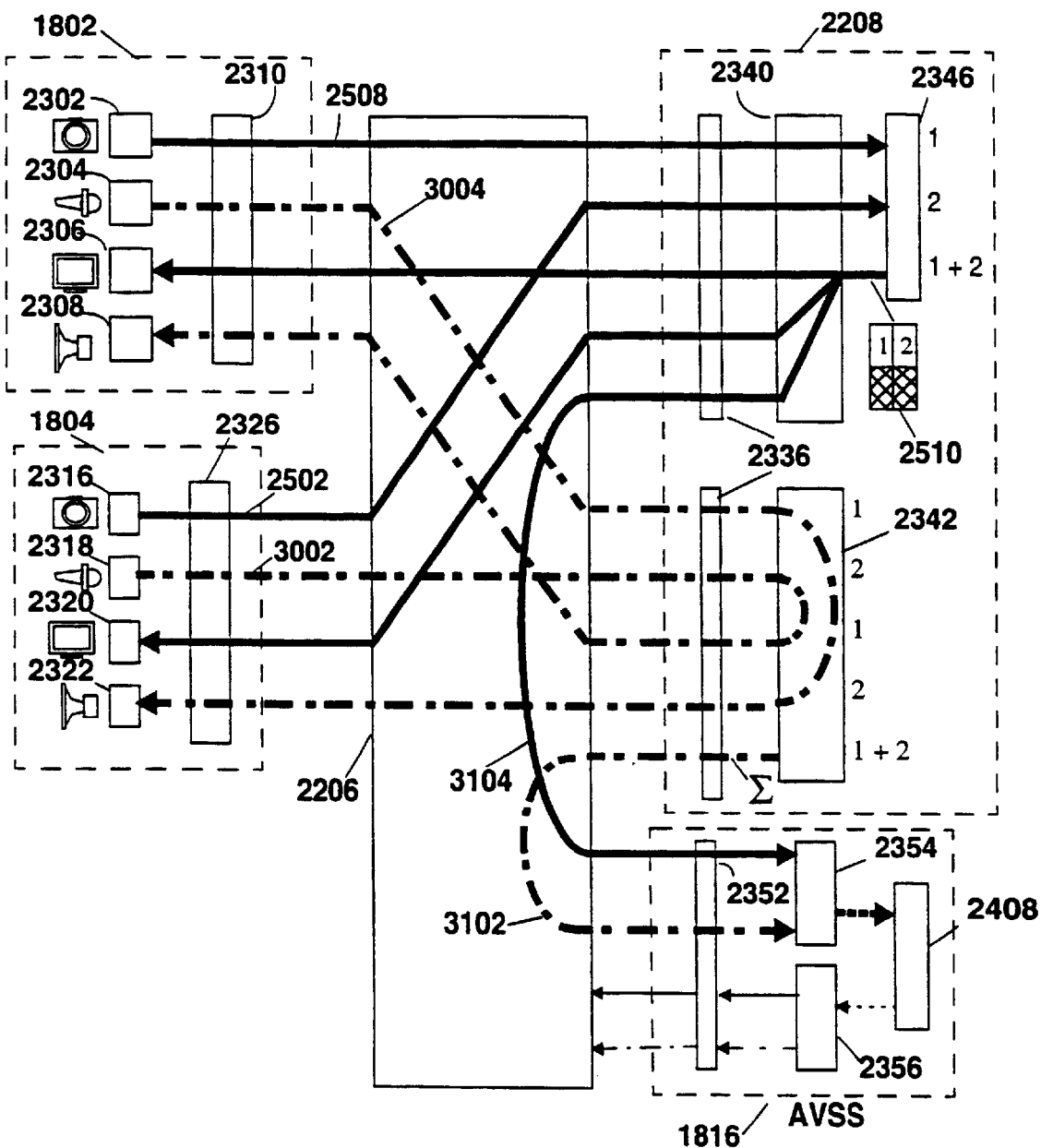

FIG. 41 is a signal state diagram at the initiation of conference recording.

Figure 42:
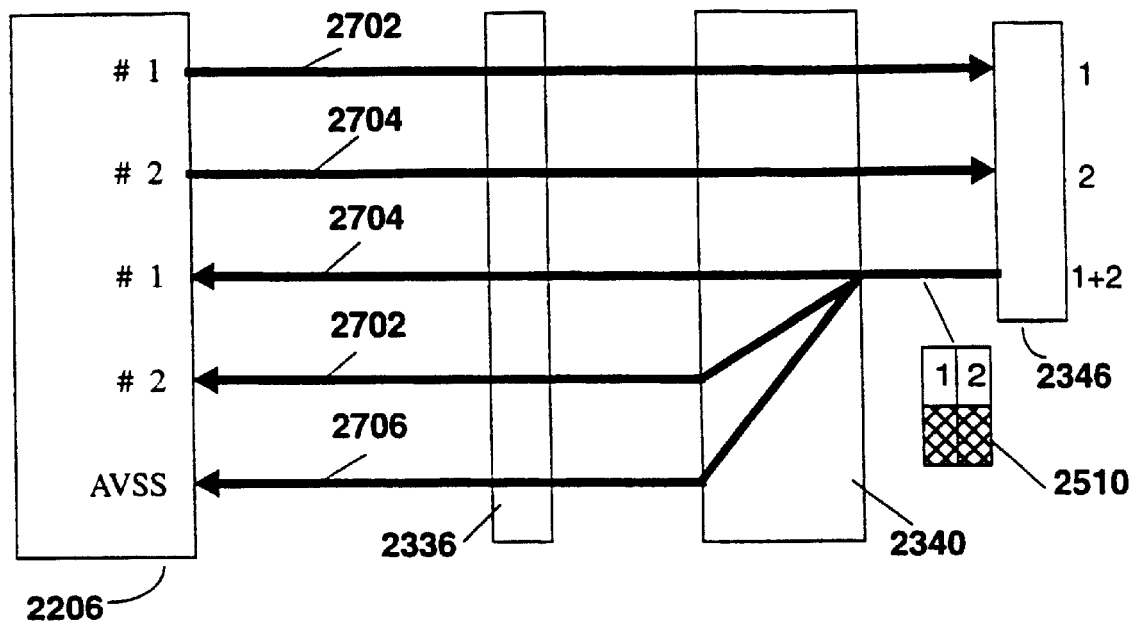

FIG. 42 is a signal state diagram of a first video conference representation.

Figure 43:
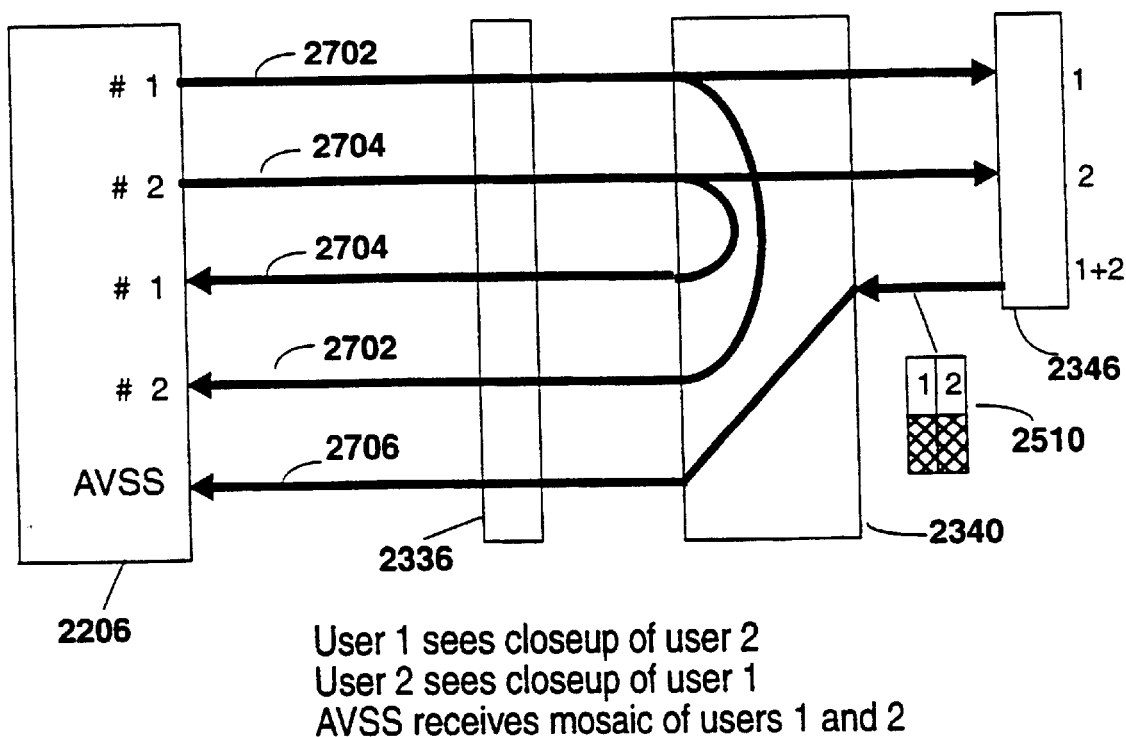

FIG. 43 is a signal state diagram of a second video conference representation.

Figure 44:
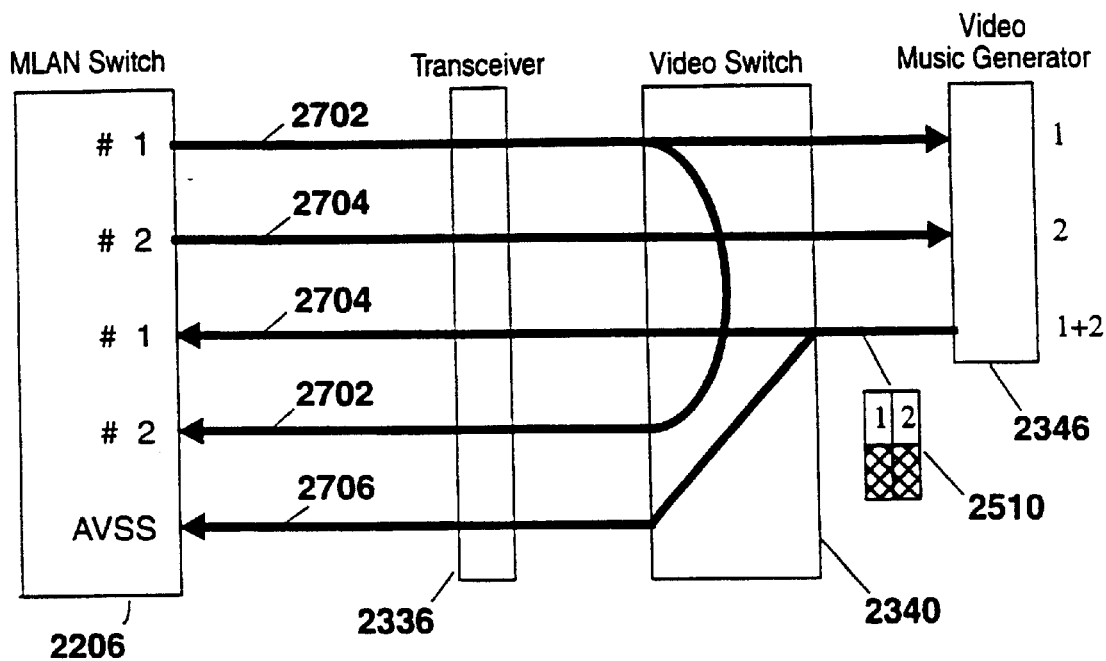

FIG. 44 is a signal state diagram of a third video conference representation.

Figure 45:
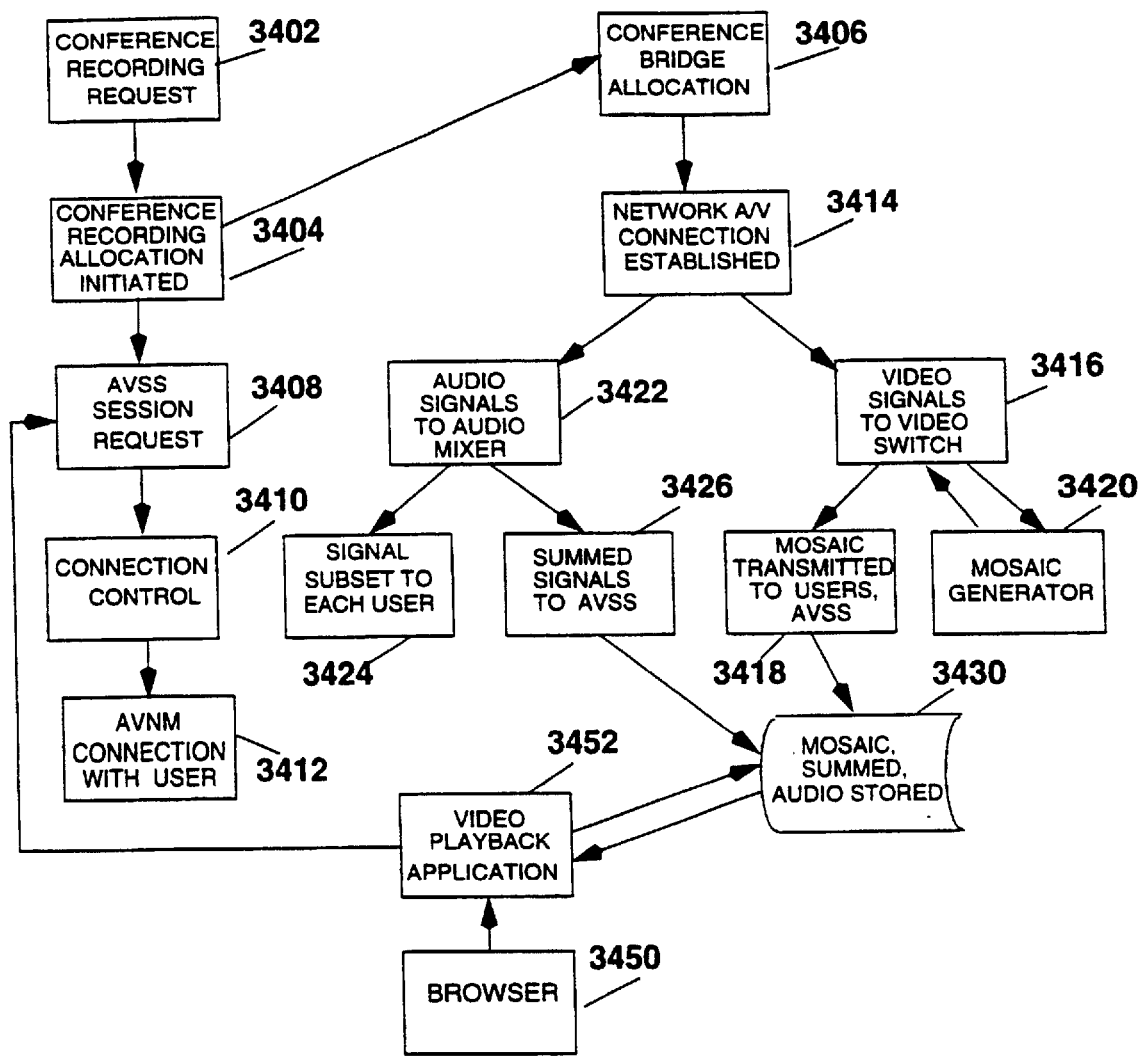

FIG. 45 is a data flow diagram of one software implementation of the video conference application of the present invention.

Figure 46:
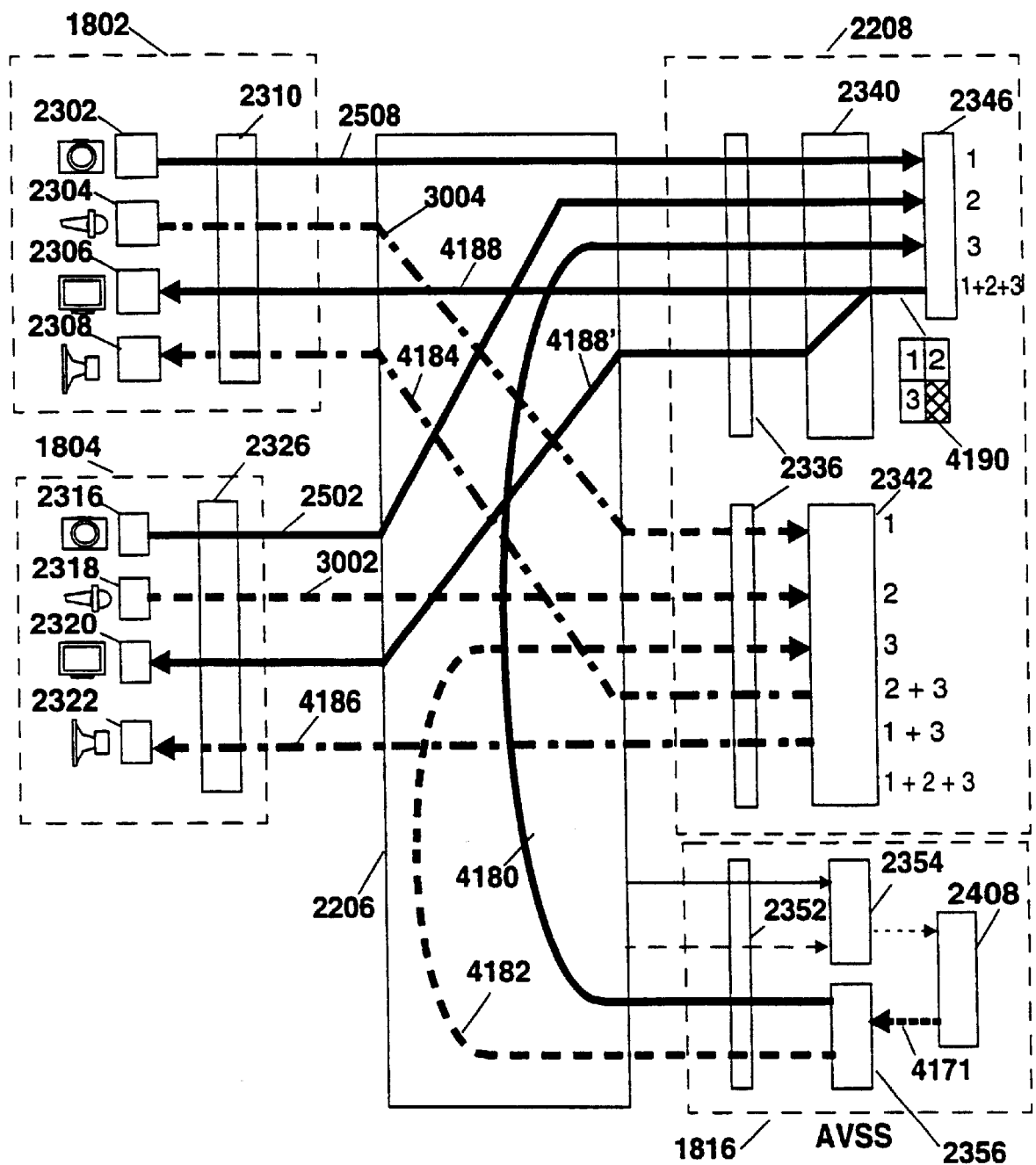

FIG. 46 is a signal state diagram at the initiation of video conference playback.

4. DETAILED DESCRIPTION

4.1 Architectural Framework

The present invention comprises at least one shared centralized audio-video (A/V) file storage and processing system within a collaborative or networked multimedia computing environment. Herein, this collaborative or networked multimedia computing environment comprises a plurality of user workstations plus multimedia-enabled servers that are linked together via one or more networks. The present invention further comprises workstation-based application programs plus control software executing on the servers that facilitate the exchange of A/V and/or multimedia information among workstations and servers in real-time, near-real-time, and/or non-real time. The A/V file storage and processing system provides a wide range of video storage and playback services to workstation application programs and/or other servers, including several of analog to digital encoding, digital to analog decoding, transcoding digital file storage, multimedia file recording, multimedia file playback analog streaming digital format transcoding, digital file streaming, digital file transfer, and file administration operations that facilitate the recording/encoding, storage, distribution, decoding/playback, copying, archival, and deletion of A/V and/or multimedia files.

Figure 3:
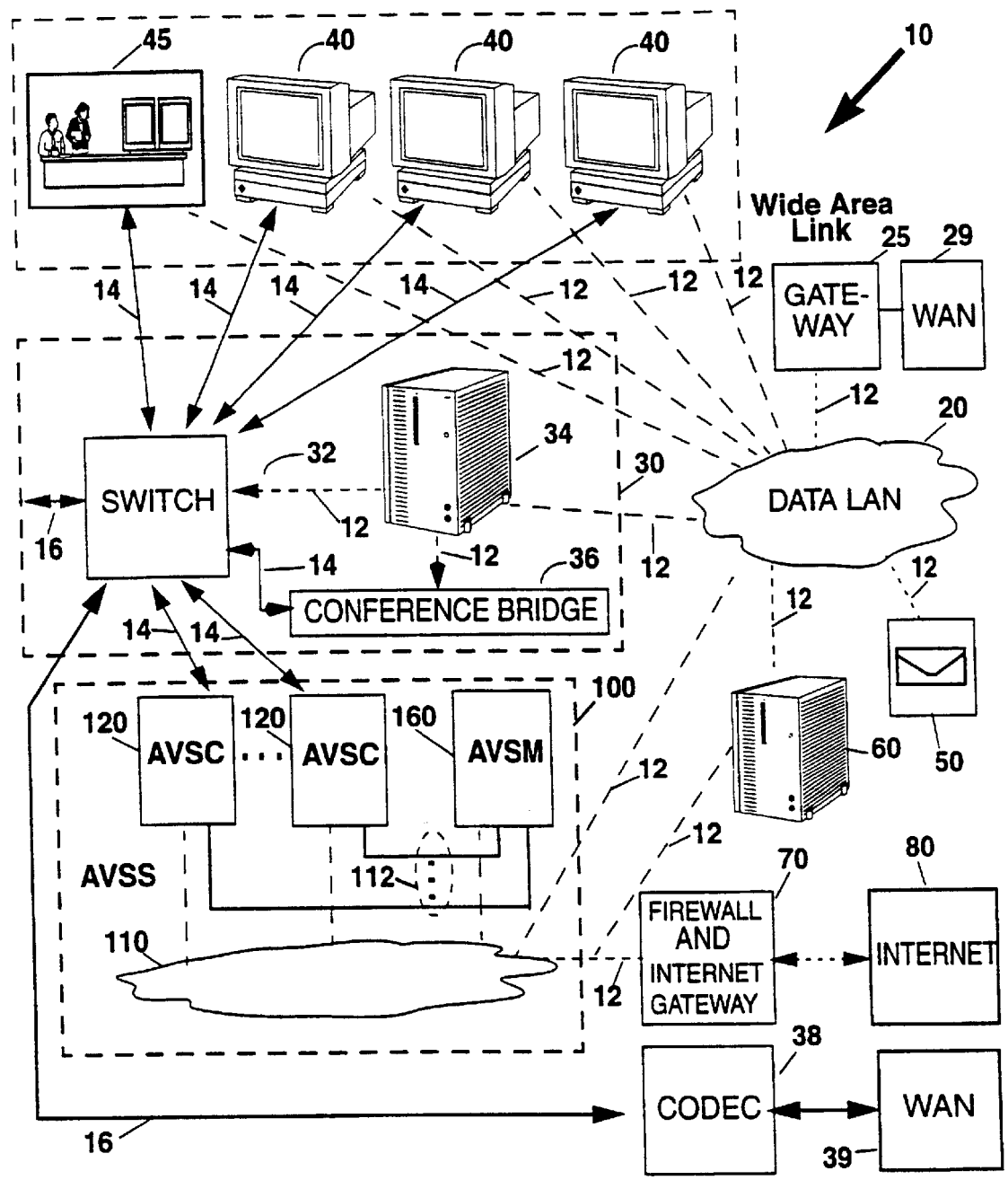
FIG. 3 is a block diagram of a Collaborative Multimedia Computing Environment (CMCE) employing an Audio/Video Server System (AVSS) constructed in accordance with the present invention.

FIG. 3 is a block diagram of a Collaborative Multimedia Computing Environment (CMCE) 10 employing an Audio/Video Server System (AVSS) 100 constructed in accordance with the present invention. The CMCE 10 comprises a data network 20; an A/V network 30; a plurality of user workstations 40 and/or a set of A/V conference rooms 45; an Audio/Video Server System (AVSS) 100; and a set of supporting server systems that include an e-mail system 50, an intranet server system 60, and a firewall/internet gateway system 70. The data network 20 couples the A/V network 30, the workstations 40, the A/V conference room(s) 45, each supporting server system 50, 60, 70, and the AVSS 100. The data network 20 also maintains a wide area link that is coupled to a Wide Area Network (WAN) gateway 25, which is coupled to a first WAN 29. The A/V network 30 couples the workstations 40, the A/V conference rooms 45, and the AVSS 100. The A/V network 30 maintains at least one trunk line coupling 16 to a remote and/or another local A/V network 30. The A/V network 30 additionally maintains a trunk line coupling 16 to a coder/decoder (codec) gateway 38, which is coupled to a second WAN 39.

4.2 Signal Distribution Networks

Figure 1:
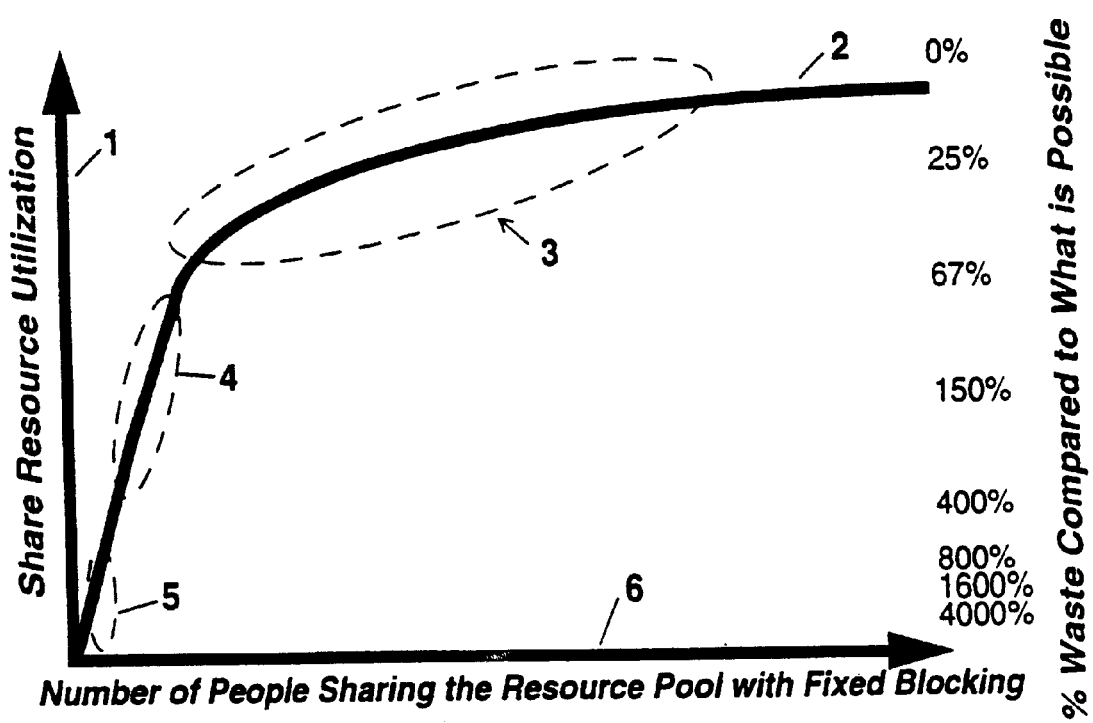
FIG. 1 is an exemplary Erlang diagram showing computational resource utilization efficiency relative to the number of users sharing the resource under fixed blocking conditions.
Figure 2:
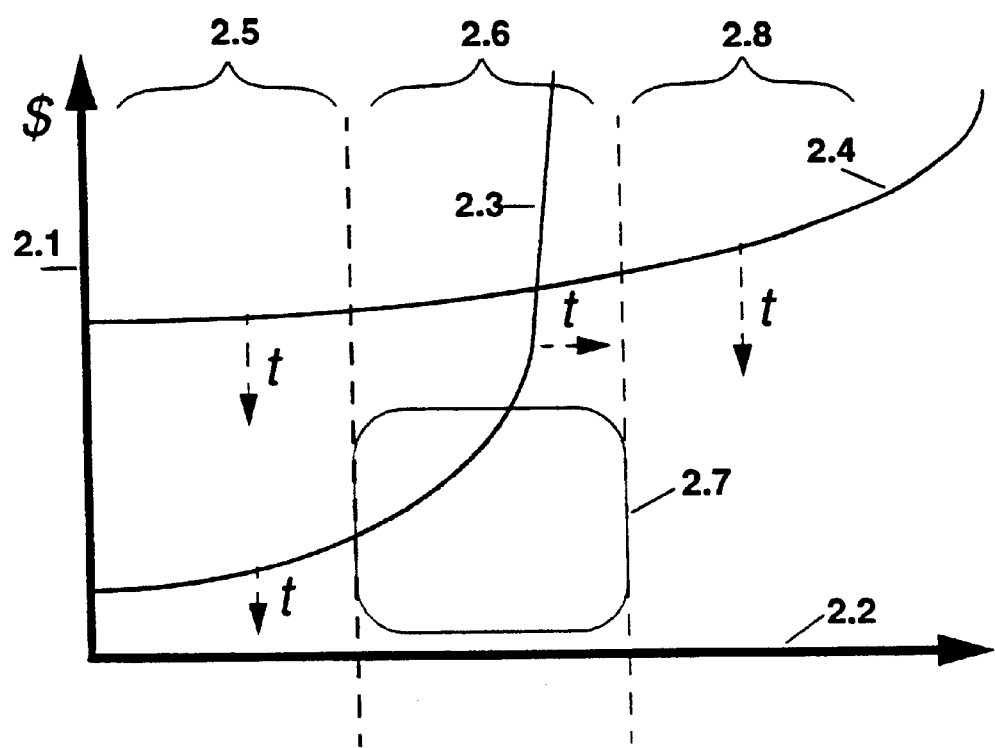
FIG. 2 is a graph showing the relative cost of analog and digital distribution technology as a function of performance and image quality.

The present invention supports both real-time (or near real-time) and delayed A/V signal exchange or distribution on a local and/or remote basis. In the context of real-time A/V signal distribution via currently-available networking technologies, analog premises networking provides, for the foreseeable future, higher video quality and real-time performance at a lower cost than digital premises networking. In the embodiment shown in FIG. 3, the CMCE 10 relies upon the data network 20 to facilitate the exchange of digital information between CMCE elements, and the A/V network 30 to facilitate analog signal exchange. Thus, the analog signal premises distribution network shown in FIG. 3 provides a low-cost CMCE implementation capable of delivering high-quality A/V signals (i.e., NTSC television-quality video at 640×480 pixels or similar standard television resolution, plus 7–15 kHz high-fidelity audio) in real-time. This embodiment additionally ensures that real-time A/V signal distribution has essentially no impact upon local data network loading. As described in detail below, alternate CMCE embodiments could rely upon a single physical network that utilizes any of a variety of suitable analog and/or digital multiplexing scheme: these will become increasingly important over time as suggested by the time evolution of the curves in FIG. 2.

In FIG. 3, the data network 20 provides for both local- and wide-area digital networking, while the A/V network 30 provides for both local- and wide-area analog networking. In terms of local analog networking, a single instance of the A/V network 30 typically directly serves one AVSS 100 plus an associated group of workstations 40 and/or A/V conference rooms 45 located within a single premises. Hence, an A/V network 30, its corresponding AVSS 100 and workstations 40 and A/V conference rooms 45 are referred to herein as a premises group. Multiple proximate premises groups may be locally linked via trunk lines among corresponding data and A/V networks 20, 30 to form a common campus. One example of this is a large office building where different areas or building floors are served by different premises groups. Another example involves situations where a corporate headquarters facility includes multiple generally-proximate buildings, one or more premises groups could be deployed within each building. Each of the premises groups within these buildings could then further be locally coupled to form a common campus, in a manner consistent with generally-accepted use of the term "campus" in corporate environments. The structure and functionality of the data and A/V networks 20, 30, and the manners in which they support premises, campus, and wide-area or remote networking, are described in detail hereafter.

4.2.1 Data Network

The data network 20 comprises a conventional network hub, plus data links 12 that implement an Ethernet, Asynchronous Transfer Mode (ATM), or other type of network, and which facilitates the exchange of data and control signals between the elements to which it is coupled either locally or via the wide area link. In the context of the present invention, the data network 20 is a Local Area Network (LAN) that spans an extent ranging from approximately a few tens of meters to perhaps one kilometer. The data links 12 can comprise unshielded twisted pair (UTP) wiring, compatible to standard telephone system wiring, or essentially any other type of network communication coupling (coax, optical, wireless radio, etc.).

The data network 20 facilitates digital communication within at least one premises group, where such communication may include control signal transfer, digital file transfer, and/or digital streaming. Via a set of data links 12 locally coupled to conventional routers, data switching hubs, or a network backbone, one or more data networks 20 can readily serve multiple premises groups (i.e., a common campus) subject to geographic, network-loading, and signal quality constraints, in a manner readily understood by those skilled in the art. The data network's wide area link facilitates digital communication between premises and non-campus or remote CMCE elements. The wide area link is coupled to the gateway and WAN 25, 29, which are implemented in a conventional manner such as that described in U.S. Pat. No. 5,617,539.

4.2.2 A/V Network

The A/V network 30 distributes A/V signals under the direction of a server that is responsive to requests and messages received from-other CMCE elements. The A/V network 30 comprises an A/V switch 32, an A/V network manager 34, and a conference bridge 36. The A/V switch 32 is coupled to the conference bridge 36, the workstations 40, and the AVSS 100 via analog links 14. The A/V switch 32 maintains trunk line couplings 16 to one or more campus A/V networks, and also to the codec gateway 38, which couples the A/V switch 32 to the second WAN 39. The A/V network manager 34 is coupled to the data network 20, the A/V switch 32, and the conference bridge 36 via digital links 12.

The A/V switch 32 comprises standard commercially-available circuitry for selectively establishing analog signal couplings between a source port and one or more output ports. The A/V switch 32 may be implemented using CMOS analog switching elements that are linked by buses to form a cross-bar switch. Such CMOS analog switches are controlled by one or more microprocessors that receive commands through serial or data network ports.

A trunk line 16 couples the A/V switch 32 to other campus-based A/V switches 32. In addition, a trunk line 16 couples the A/V switch 32 to the codec gateway 38. In one embodiment, the codec gateway 38 is conventional. Other embodiments may involve physically separate switching multiplexers and/or access multiplexers. The codec gateway 38 could be implemented, for example, using a Zydacron codec (Zydacron, Inc., Manchester, N.H.) or a Tandberg codec (Tandberg, Lysaker, Norway and Herndon, Va.). The codec gateway 38 is coupled to the second WAN 39, thereby facilitating wide-area A/V networking. In general, the second WAN 39 comprises a conventional network capable of providing a guaranteed quality-of-service level and low latency data transfer, such as a T1, DS3, ISDN, public-switched, or other network. Those skilled in the art will understand that the WAN 39 utilized for wide-area A/V networking may be the same as that used for wide-area data networking (i.e., a single conventional ISDN, T-carrier, ATM, or frame relay telecommunications WAN), where the A/V and data signals are multiplexed in accordance with priority and quality-of-service considerations in a standard manner. That is, the present invention could be served by a single WAN rather than separate WANs 29, 39.

The conference bridge 36 comprises conventional audio mixing and video mosaicing circuitry. The conference bridge 36 selectively provides A/V and/or multimedia conference participants with one or more conference video images, as well as conference audio streams. In one embodiment, the conference video images comprise mosaiced subsets of video images generated by conference participants, as well as a video mosaic of each video image associated with all conference participants. Similarly, the conference audio streams comprise subsets of audio signals generated by conference participants, plus an audio stream corresponding to all conference participants.

The A/V network manager 34 comprises a server plus attendant software that coordinates or manages the operation of the A/V switch 32 and conference bridge 36 in response to requests received over the data network 20. The A/V network manager 34 provides an Application Program Interface (API) through which client application programs may request A/V and/or multimedia switching and/or conferencing services. Thus, the A/V network manager 34 directs the A/V switch 32 in establishing A/V and/or multimedia sessions and/or conferencing sessions between workstations 40, A/V conference rooms 45, the AVSS 100, and/or the trunk line 16.

In one embodiment, the A/V network manager comprises a collaborative A/V and/or multimedia conferencing system that is implemented in the manner described in U.S. Pat. No. 5,617,539, entitled "Multimedia Collaboration System with Separate Data Network and A/V Network Controlled by Information Transmitting on the Data Network."

4.2.3 Multimedia Network

Taken together, the data network 20 and the A/V network 30 comprise a Multimedia Local Area Network (MLAN). Wide-area networking is facilitated by the data network's wide-area link gateway and WAN 25, 29, plus the A/V network's trunk line coupling 16 to the codec gateway and WAN 38, 39. The MLAN WANs 29, 39 of the present invention may be implemented in the manner described in U.S. Pat. No. 5,617,539. A collection of MLANs coupled by WAN 29, 39 facilitate the exchange of A/V and/or multimedia information between premises, campus, and/or remote CMCE elements.

4.2.4 Alternate Signal Distribution Architecture

Figure 4:
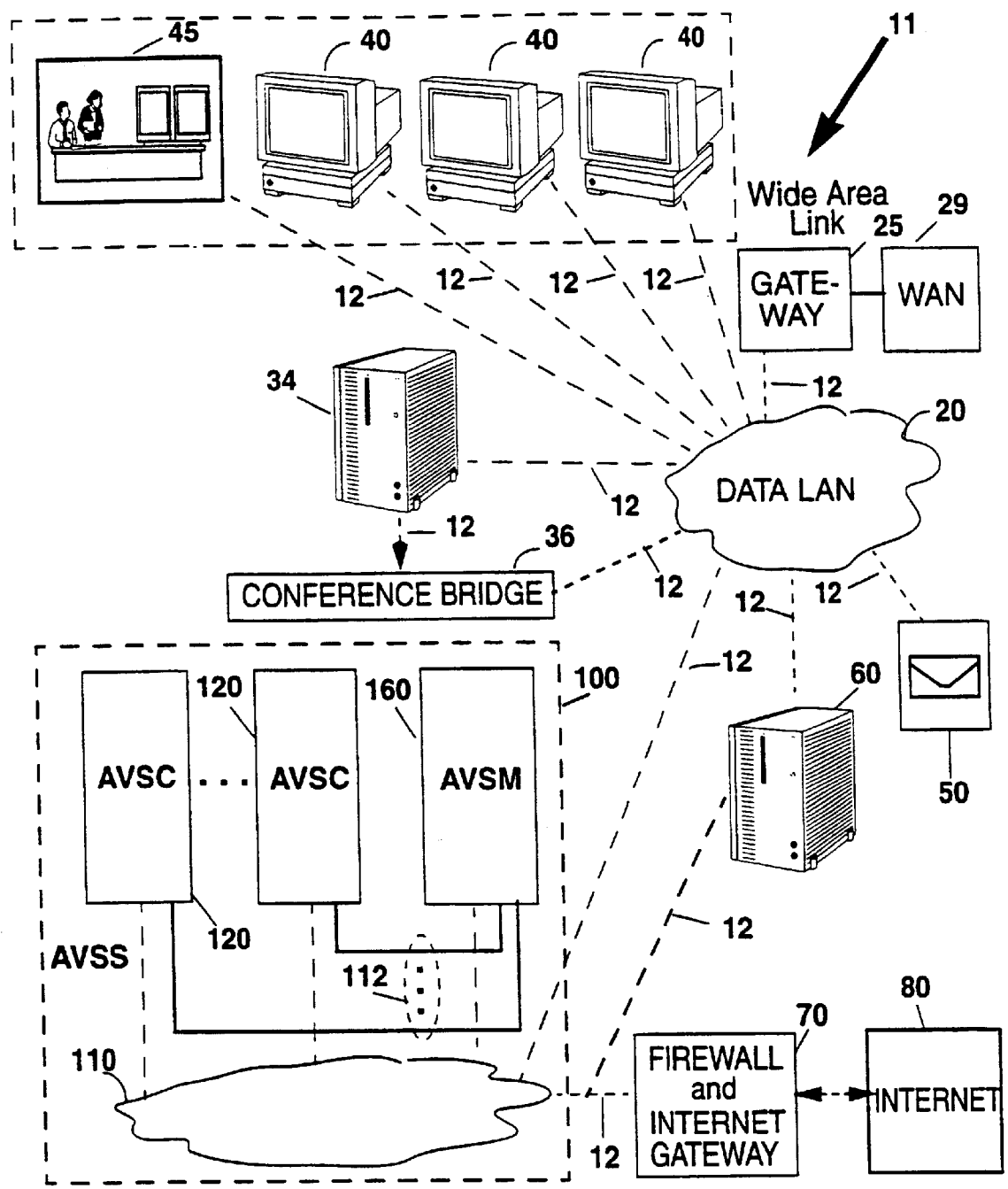
FIG. 4 is a block diagram of an alternate embodiment of a CMCE constructed in accordance with the present invention.

As previously indicated, the present invention could rely upon a single network for distributing both data and A/V signals. FIG. 4 is a block diagram of an alternate embodiment of a CMCE 11 constructed in accordance with the present invention. With regard to FIG. 3, like reference numbers have been used to denote like elements in FIG. 4. In the alternate embodiment, the CMCE 11 comprises a data network 20; an A/V conference manager 34 coupled to a conference bridge 36; a set of workstations 40 and possibly one or more AV conference rooms 45; a set of supporting server systems 50, 60, 70; and an AVSS 100. The data network 20 couples the A/V conference manager 34, the conference bridge 36, the workstations 40 and A/V conference room(s) 45, each supporting server system 50, 60, 70, and the AVSS 100.

In the single-network CMCE 11, the data network 20 is typically implemented as an IP or ATM network. A/V file exchange between CMCE elements such as the AVSS 100 and workstations 40 or A/V conference rooms 45 would occur via streaming or file transfer, and each workstation 40 may include compression/decompression resources.

4.3 Workstations and A/V Conference Rooms

Users interact with CMCE elements, including the AVSS 100, via application programs executing on workstations 40. Each workstation 40 comprises a conventional desktop-based computer system having a processing unit, memory, disk drive, display device, keyboard, mouse, and speaker(s). Any particular workstation 40 can be implemented in accordance with essentially any hardware/software platform, such as a Windows-based (Microsoft Corporation, Redmond, Wash.) personal computer, an Apple-based (Apple Computer Corporation, Cupertino, Calif.) computer, a Unix-based computer, or other type of system. Each workstation 40 is also equipped with a video camera and a microphone, such as in the manner described in U.S. Pat. No. 5,617,539. The video camera and microphone generate a high-quality A/V signal that is directed to the A/V network 30 via an analog line 14. In like manner, the display device receives a high-quality A/V signal from the A/V network 30 via the analog line 14.

In embodiments in which each workstation 40 is coupled to both the data network and the A/V network 30, a variety of possibilities exist for the transfer of A/V and/or multimedia files to any given workstation 40. In particular, the present invention supports "real-time" analog A/V file transfer (i.e., analog streaming) to any workstation via the A/V network 30, as well as both digital streaming and the transfer of entire digital files to any workstation 40 via the data network 20. The present invention additionally supports real-time analog A/V file transfer simultaneously with either digital streaming or digital file transfer to any combination of workstations 40. The particular types of file transfer employed at any given moment are determined by application programs executing on the workstations 40 as well as premises and/or non-premises application servers coupled to the CMCE 10.

In addition to exchanging A/V signals with the workstations 40, the A/V network 30 can exchange A/V signals with presentation, conferencing, and/or computing resources located in one or more A/V conference rooms 45, where such resources may include cameras, monitors, televisions, microphones, and speakers. This in turn means that a group meeting held in an A/V conference room 45 can exchange A/V and/or multimedia information with individual workstations 40 or other A/V conference rooms 45, on a premises, campus, or remote basis.

4.4 Supporting Servers

The AVSS 100 provides novel A/V and/or multimedia functionality to various application programs, as described in detail below. In so doing, the AVSS 100 selectively leverages the capabilities of the supporting server systems 50, 60, 70. The e-mail system 50 preferably comprises conventional e-mail server hardware and software capable of creating, storing, and distributing e-mail messages with attached files between users or target destinations. The manners in which the AVSS 100 interacts with the e-mail system 50 to provide video attachments and other multimedia e-mail capabilities are described in detail below.

Many corporations or enterprises employ an intranet system, which comprises a private network upon which enterprise-related information is distributed and/or exchanged in accordance with conventional internet protocols. An intranet system leverages readily-available, low cost internet software tools to efficiently provide employees or enterprise members with access to enterprise-wide information. Such enterprise-wide information may include corporate communications documents or bulletins; training materials; product and/or project information; personnel directories; and member- or employee-specific data maintained within an enterprise database, where access to such data is granted only for authorized members. The intranet server system 60 comprises conventional hardware and software that provide information sharing or distribution services to employees or authorized members within a corporation or organization, where such information sharing occurs in accordance with a conventional internet protocol suite (i.e., TCP/IP). Details concerning the manners in which the AVSS 100 interacts with the intranet server system 60 to facilitate A/V and/or multimedia information sharing are provided below.

The internet gateway/firewall system 70 comprises hardware and software that implement a conventional internet firewall security and File Transfer Protocol (FTP) gateway system, for exchanging messages and A/V or multimedia files between the AVSS 100 and the public internet 80. Specific AVSS functionality in this regard is described in detail below.

4.5 AVSS Architecture

The AVSS 100 comprises a repository for A/V file storage and processing resources, to which application programs executing on premises, campus, and/or remote CMCE elements have shared access. In the present invention, application programs initiate or generate service requests directed to the AVSS 100 in response to user actions. Such application programs may be executing on premises, campus, or remote workstations 40, as well as computers coupled to an enterprise intranet or the public internet. Service requests comprise an appeal for either a) A/V resource or service allocation; or b) AN resource or service state information. The AVSS 100 receives the service requests via the data network 20, and establishes message-based service sessions with the A/V network 30, workstations 40, supporting servers 50, 60, 70, and/or one or more campus-based or remote CMCE elements to provide A/V and/or multimedia services in accordance with such requests. Messages generated during a service session may comprise state information, control commands, and confirmations. The structure and functionality of the AVSS 100, and the manners in which the AVSS 100 processes service requests and generates messages, are described in detail hereafter.

As shown in FIG. 3, the AVSS 100 comprises an internal network 110, at least one Audio/Video Storage Cell (AVSC) 120, and an Audio/Video Server Manager (AVSM) 160. The internal network 110 couples each AVSC 120, the AVSM 160, the data network 20, the intranet server 60, and the internet gateway/firewall system 70. In addition, the AVSM 160 supports coupling to each AVSC 110 via a dedicated subnet 112, as further described below. Moreover, an analog line 14 couples each AVSC 110 to the A/V network 30.

Each AVSC 120 serves as an A/V file repository, as well as a repository for shared A/V processing resources, including encoders, decoders, and possibly transcoders. The AVSM 160 coordinates the activities of the AVSCs 120, and manages processes both internal and external to the AVSS 100 to carry out requests generated by either premises, campus, or remote CMCE elements. The structure and functionality of each AVSC 120 and the AVSM 160 are described in detail below.

The internal network 110 comprises a conventional high-bandwidth network that facilitates high-speed transfer of A/V files between a) individual AVSCs 120; b) AVSCs 120 and the data network 20; and c) AVSCs 120 and the intranet server system 60 or the internet gateway/firewall system 70. The internal network 110 additionally serves as the medium by which service requests and messages are exchanged between the AVSM 160 and the data network 20. The bandwidth of the internal network 110 is sufficient to carry service requests, control messages, file transfers, and the file streaming capacity of the composite AVSS 100. In one embodiment, the internal network 110 may be implemented as a portion of the data network 20.

The dedicated subnet 112 provides for the exchange of messages and control signals between the AVSM 160 and individual AVSCs 120. In the event that the AVSS 100 utilizes few AVSCs 120, such messages and control signals can be carried by the internal network 110, eliminating the need for the subnet 112. As the AVSS 100 is scaled, however, use of the subnet 112 is desirable to minimize internal network loading.

4.5.1 AVSC Architecture

Figure 5:
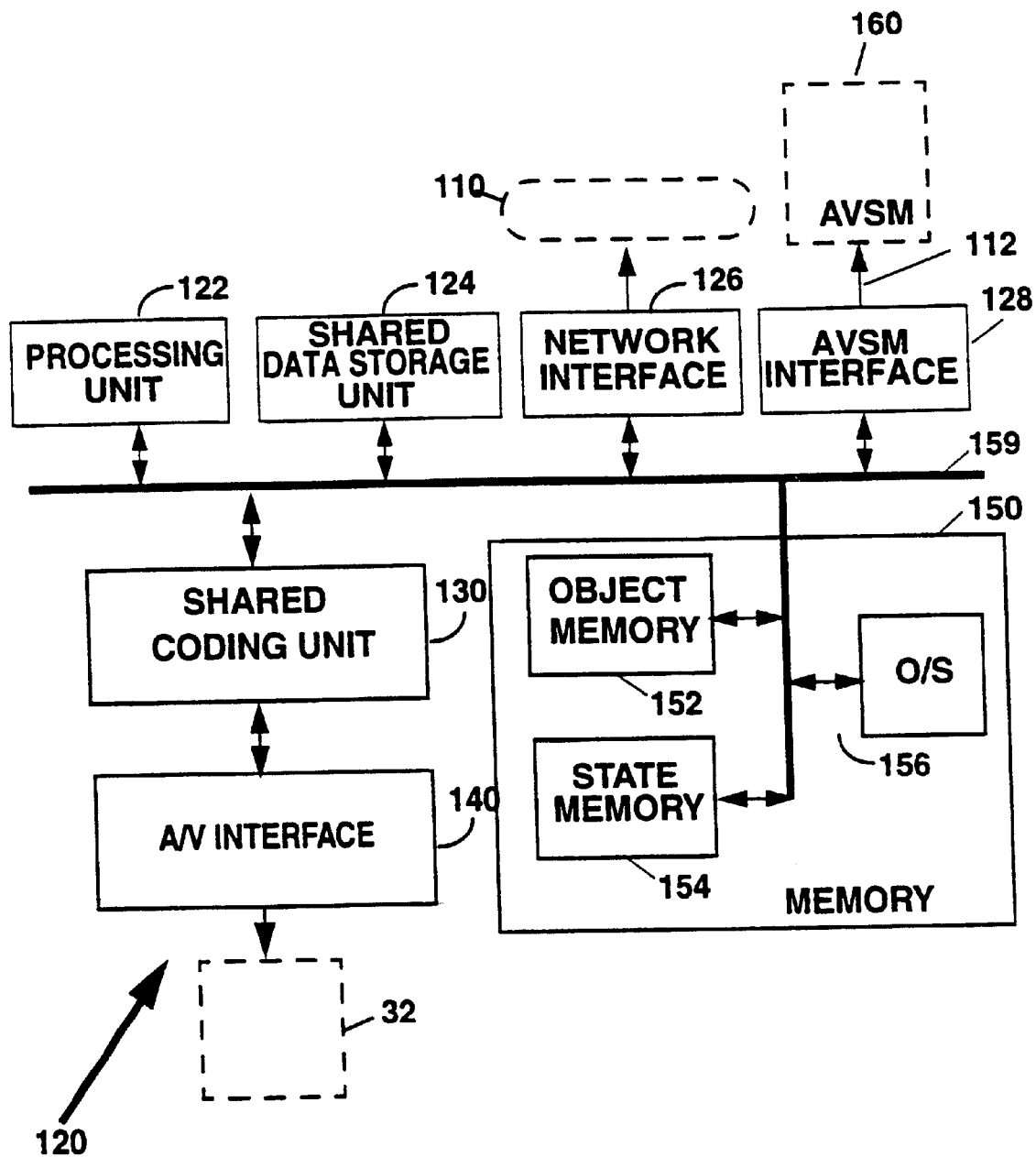
FIG. 5 is a block diagram of an Audio/Video Storage Cell (AVSC) constructed in accordance with the present invention is shown.

As previously indicated, each AVSC 120 provides A/V file storage and AN processing resources that are shared by other CMCE elements. FIG. 5 is a block diagram of an AVSC 120 constructed in accordance with the present invention. The AVSC 120 comprises a processing unit 122, a shared data storage unit 124, at least one network interface 126, an AVSM interface 128, at least one shared coding unit 130, at least one A/V interface unit 140, and a memory 150 that includes an AVSC object memory 152, an AVSC state memory 154, and an operating system 156. With the exception of the A/V interface unit 140, each AVSC element is coupled to a common AVSC bus 159. The A/V interface unit 140 serves as an interface between each shared coding unit 130 and the A/V switch 32. Finally, the network interface 126 and the AVSM interface 128 couple the AVSC 120 to the AVSS internal network 110 and subnet 112, respectively.

The processing unit 122 comprises a conventional high-performance processor for executing program instructions stored within the memory 150. The network interface 126 comprises conventional network interface circuitry for managing data exchanges between the AVSC 120 and the internal network 110. In like manner, the AVSM interface 128 comprises conventional network interface circuitry for managing the exchange of messages and control signals between the AVSC 120 and the AVSM 160. The operating system 156 preferably comprises conventional, real-time multitasking operating system software such as Windows NT (Microsoft Corporation, Redmond, Wash.) or real-time Unix.

The AVSC object memory 152 stores a plurality of AVSC software objects that direct AVSC hardware allocation and resource locking; A/V file encoding, decoding, and transcoding operations; and file management operations such as file replication, transfer, and deletion, as described in detail below. The AVSC objects also maintain the contents of the AVSC state memory 154, which includes the following information:

1) encoder/decoder/transcoder resource capability and current status/utilization;
2) current storage device capacity and utilization;
3) a time-stamped and indexed request queue, for both incoming and outgoing requests;
4) a time-stamped and indexed message queue, for both incoming and outgoing messages;
5) a time-stamped and indexed file transfer event queue; and
6) an AVSC event log, specifying standard time-stamped events, as well as occurrences of encoder, decoder, transcoder, storage device, and/or network faults.

To minimize the amount of hardware required to meet any particular A/V file storage and/or multi-user A/V file access performance requirements, premises A/V file storage hardware should be shared or centralized rather than localized at each workstation 40. Centralization of data storage hardware also maximizes system-wide utilization and administration efficiency due to statistical averaging, and can also improve fault-tolerance. The shared data storage unit 124 comprises at least one high-capacity disk drive for storing A/V files and data, as well as a corresponding disk drive controller. Within a CMCE 10 having a premises analog signal distribution network, A/V file storage resources are fully AVSC-based rather than workstation-based. In AVSS implementations having more than one AVSC 120, multiple copies of any given A/V file may be stored across different AVSCs 120, as described in detail below, to improve the system's response in accessing commonly accessed files. Further, when an AVSS 100 employs a single AVSC 120, multiple copies of any given A/V file could be stored across multiple 1) shared data storage units 124 within the AVSC 120; and/or 2) storage devices coupled to the AVSC 120. From an external perspective, the AVSS 100 operating in this manner provides centralized A/V file storage, while A/V files are distributed internally amongst the shared data storage units 124 across the set of AVSCs 120.

Each shared coding unit 130 comprises at least one instance of encoding, decoding, and/or transcoding resources. For shared coding units with more than one encoder and/or decoder, a multichannel version of the A/V interface 140 will be required (or, alternatively multiple A/V interfaces 140 can be provided for a single coding unit 130. In some embodiments, transcoding may be done in software by the Processing unit. In other embodiments, a dedicated hardware transcoder may be used—such an instance of 130 would not require an AV interface 140. The present invention can support essentially any encoding format, including MPEG-based, RealMedia, and NetShow formats. In one embodiment, the AVSC 120 uses a given encoding format as a default format, for example, MPEG1 encoding that is tunable within a compression performance range of approximately 1.1 to 3 Mbps. The particular encoding format employed at any given time is an application-dependent and/or user-dependent parameter, as further described below.

The creation and recording of an A/V file typically requires a single encoding session, which may be stopped or paused and restarted as necessary. Since an A/V file is likely to be played back multiple times, either in repeated or concurrent sessions, decoding is likely to be a much more frequently requested operation than encoding. Across the set of AVSCs 120 within the AVSS 100, one or more shared coding units 130 may support different encoding, decoding, and/or transcoding session options. For example, the hardware within the shared coding unit 130 in any particular AVSC 120 could support, for example, any one of the following:

1) one encoding session or one decoding session, mutually exclusive;
2) one encoding session concurrent with one decoding session;
3) multiple concurrent encoding and decoding sessions;
4) multiple concurrent decoding sessions; or
5) one or multiple transcoding sessions, in conjunction with any of the above.

In addition, any AVSC 120 could support one of the above either mutually exclusive of or concurrent with file transfer to or from the shared data storage unit 124.

In general, at least one AVSC 120 is capable of concurrently supporting both A/V file encoding and decoding sessions, as well as multiple sessions simultaneously. Additionally, each AVSC 120 is highly scalable relative to the number of encoding, decoding, and transcoding resources required to meet evolving AVSS implementation needs. Furthermore, each AVSC 120 can support essentially any type of encoding, decoding, and/or transcoding resource without architectural modification, thereby readily accommodating A/V processing resource evolution over time. Thus, a wide variety of shared coding unit embodiments exist, examples of which are described hereafter.

Figure 6:
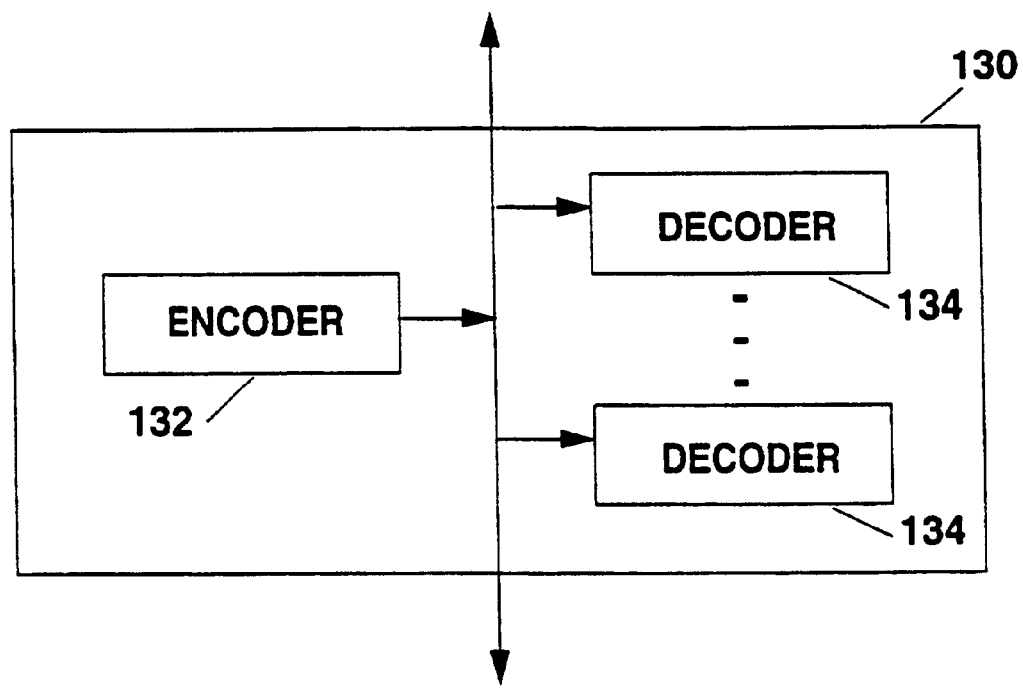
FIG. 6 is a block diagram of a first embodiment of a shared coding unit of the present invention.

Referring now to FIG. 6, a block diagram of a first embodiment of the shared coding unit 130 is shown. In the first embodiment, the shared coding unit 130 comprises at least one encoder 132, plus a set of decoders 134 capable of supporting multiple simultaneous decoding sessions. This requirement can be met through the use of a plurality of mutually-exclusive decoders 134, or one or more concurrent-capable decoders 134.

Figure 7:
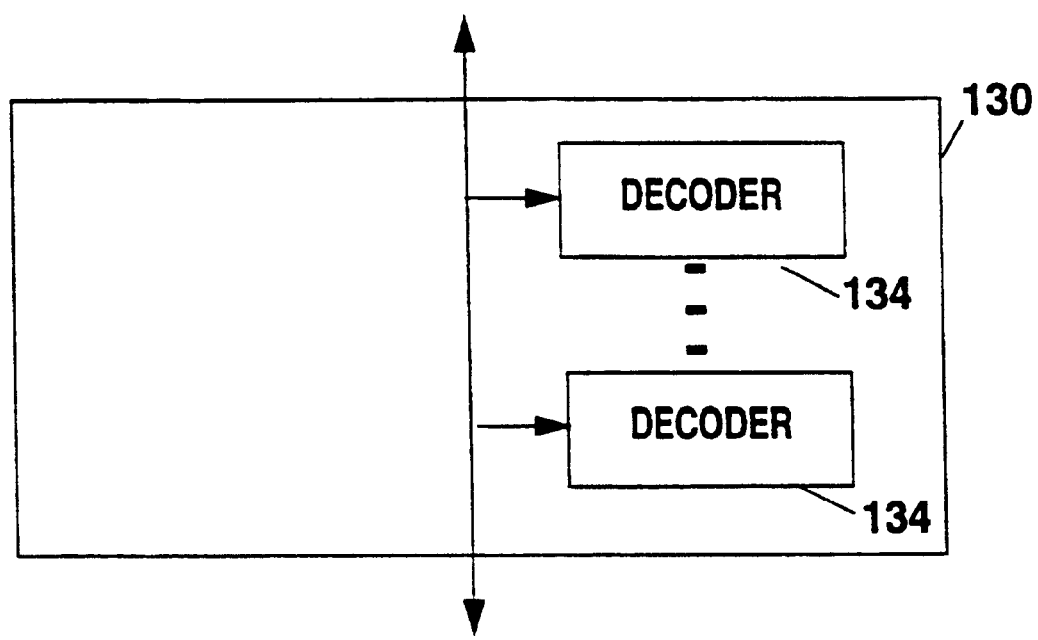
FIG. 7 is a block diagram of a second embodiment of the shared coding unit.

Referring also now to FIG. 7, a block diagram of a second embodiment of the shared coding unit 130 is shown. In the second embodiment, the shared coding unit 130 comprises a set of decoders 134 capable of supporting multiple concurrent decoding sessions. As in the example embodiment, the set of decoders 134 can be implemented via multiple mutually-exclusive decoders 134, or at least one concurrent-capable decoder 134. In the second embodiment, the AVSC 120 in which the set of decoders 134 reside(s) is dedicated exclusively to fulfilling decoding requests, which in turn implies that at least one encoder 132 would be present within another AVSC 120.

Figure 8:
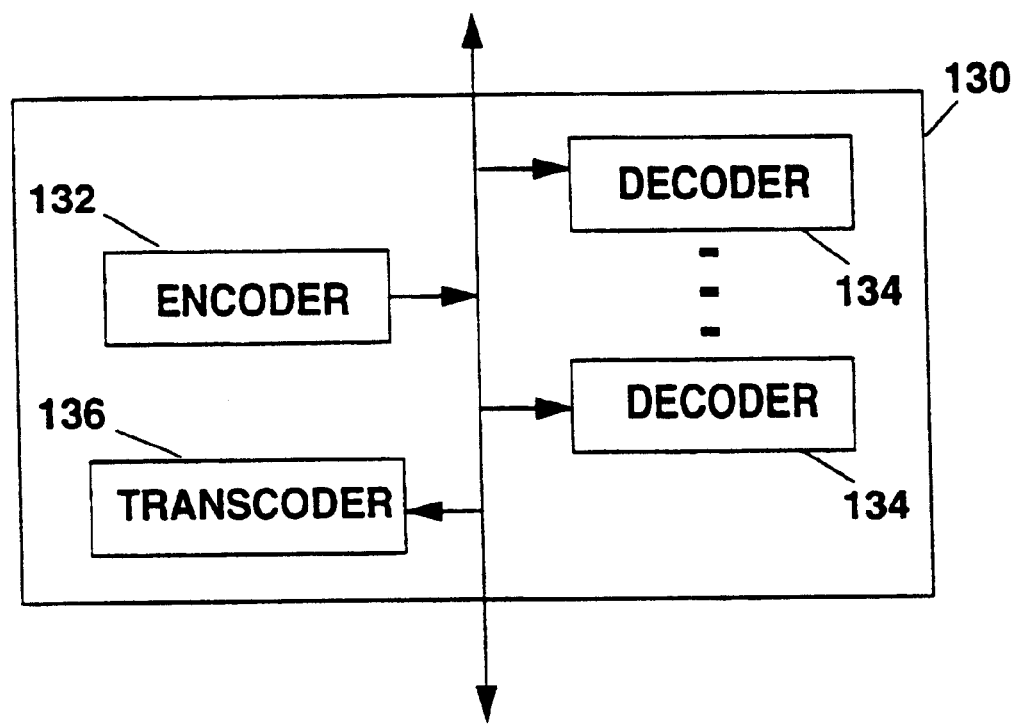
FIG. 8 is a block diagram of a third embodiment of the shared coding unit.

Those skilled in the art will understand that A/V files may be encoded in accordance with a variety of formats. Thus, at times, transcoding may be required to convert an A/V file into a different format than that which was utilized to record the A/V file. Referring now to FIG. 8, a block diagram of a third embodiment of the shared coding unit 130 is shown, which comprises at least one encoder 132, at least one decoder 134, and a transcoder 136. When an AVSC 120 includes one or more transcoders 136, the present invention preferably provides for real-time transcoding, such that playback of A/V files requiring format conversion can occur without sequential full-file conversion delays.

In a manner analogous to that for the shared data storage unit 124, encoding, decoding, and transcoding resources are AVSC-based rather than workstation-based in the present invention. From an external perspective, the AVSS 100 provides centralized encoding, decoding, and transcoding resources, while internally the aforementioned resources are distributed amongst one or more AVSCs 120. This pooled resource organization maximizes encoding, decoding, and transcoding resource utilization efficiency, while minimizing the number of such resources required to meet any given performance requirements.

In an exemplary embodiment, an AVSC 120 is implemented as a personal computer server having a Pentium II (Intel Corporation, Santa Clara, Calif.) or generally-equivalent microprocessor, 128 Megabytes of Random Access Memory (RAM), an Optibase MovieMaker encoder and an Optibase VideoPlex decoder (Optibase Inc., San Jose, Calif.), a network interface card, and an UltraWide and Fast SCSI 18 Gigabyte or larger disk drive for storing A/V and related files.

4.5.2 AVSM Architecture

The AVSM 160 comprises hardware and software that manages or coordinates the processing of requests received from premises-based, campus-based, or remote CMCE elements. The processing of such requests may result in the creation, recording/encoding, storage, distribution, decoding/playback, archival, or deletion of A/V or multimedia files in the context of conference recording, telephone answering, e-mail, document generation, document publishing, or other applications as described in detail below. Those skilled in the art will understand that many architecturally varying embodiments are possible. The embodiment described below provides an enabling architectural example.

Figure 9:
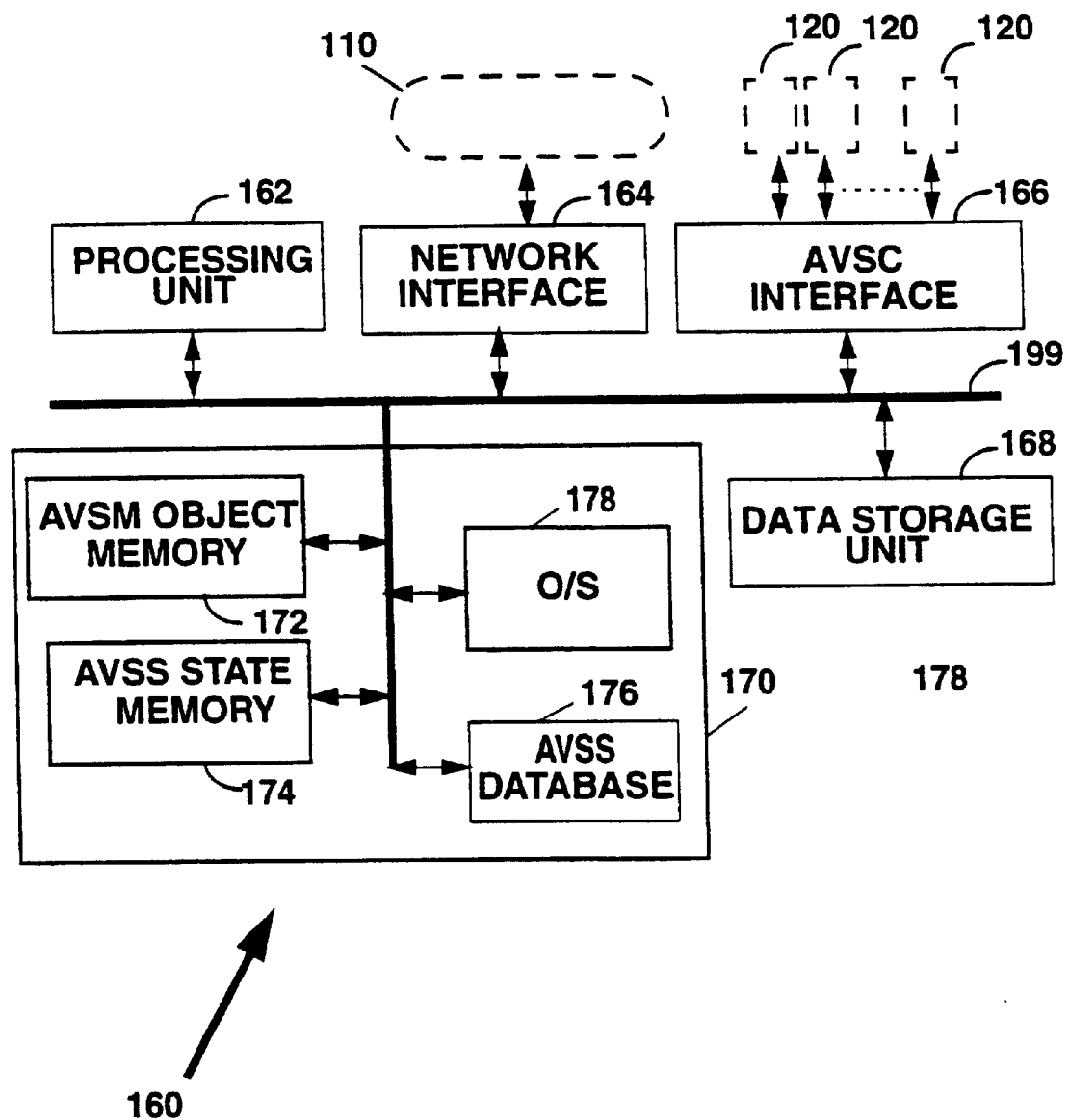
FIG. 9 is a block diagram of an Audio/Video Server Manager (AVSM) constructed in accordance with the present invention.

The AVSM 160 comprises a network-based multitasking computer. FIG. 9 is a block diagram of an AVSM 160 constructed in accordance with the present invention. The AVSM 160 comprises a processing unit 162, a network interface 164, an AVSC interface unit 166, a data storage unit 168, and a memory 170 wherein an AVSM object memory 172, an AVSS state memory 174, an AVSS database memory 176, and an operating system 178 reside. Each element within the AVSM 160 is coupled to a common AVSM bus 199.

The processing unit 162 comprises a conventional high-performance processor for executing stored program instructions, and the data storage unit 168 comprises at least one disk drive. The network interface 164 and the AVSC interface unit 166 comprise conventional network interface circuitry for managing communication with the internal network 110 and AVSCs 120, respectively. The operating system 178 comprises a conventional multitasking operating system such as Windows NT.

The AVSM object memory 172 stores a plurality of AVSM software objects that perform or manage the AVSS services and resource management operations described in detail below, which include a) the establishment of user request processing sessions; b) allocation of AVSC resources and associated resource locking; c) establishment of A/V network communication couplings; d) user application interfacing and message routing; e) inter- and intra-AVSS file transfer initiation; and f) administrative operations as described in detail below. AVSM objects also maintain the contents of the AVSS database, which is stored in the AVSS database memory 176 and/or upon the data storage unit 168.

The AVSS database stores a variety of information that defines a) the AVSS communications environment; b) the nature and capabilities of the shared AVSC resources; c) administrative parameters and usage data; and d) characteristics of the A/V files stored on the AVSCs 120. Relative to the AVSS communications environment, the information the AVSS database stores includes the following:

1) the number and types of file transfer channels, including digital file transfer channels arising from AVSC couplings to the internal network 110 and the data network 20, plus analog file transfer channels corresponding to AVSC couplings to the A/V network 30;
2) a premises AVSS host name and port identifier;
3) one or more non-premises AVSS host names and port identifiers, plus connection setup information associated with each non-premises AVSS 100;
4) A/V network configuration parameters;
5) supporting server system configuration parameters;
6) a user identification (ID) or name for each user within the premises group to which the AVSS 100 belongs, plus password information corresponding to each user ID; and
7) communication preferences corresponding to each user ID, such as preferred encoding format and/or A/V file delivery format.

Relative to shared AVSC resources, the AVSS database includes the following information:

1) the number, types, and capacities of the storage resources within each AVSC 120; and
2) the number, types, and capabilities of the encoding, decoding, and transcoding resources within each AVSC 120.

The administrative parameters that reside within the AVSS database include a maximum allowable A/V file size, and a maximum allowable A/V file age. The maximum allowable A/V file age may be defined in relation to an A/V file's creation time and date, or relative to a most-recent access. The usage data includes an event statistics file that details event occurrence frequencies, such as a number of users that have accessed the AVSS 100 in a given time interval; a number of times an A/V file has been accessed; a most-recent access date and time for an A/V file; and an amount of time spent performing A/V file playback operations during a particular time interval.

For each unique A/V file stored on the AVSCs 120, the AVSS database stores a file parameter table that includes the following information:

1) a filename;
2) a file password;
3) a user ID indicating file authorship;
4) a file ownership or access privilege list, by user ID, which includes an access expiration date and time as well as recent access history (date and time) associated with the user ID;
5) A/V encoding format;
6) time and date of most-recent modification;
7) file size;
8) file playback duration;
9) file age;
10) location of each copy of the file across the AVSCs 120;
11) a list identifying and locating any AVSS-resident multimedia synchronization files associated with the A/V file; and
12) a list specifying any non-AVSS target servers to which the file has been published, as described in detail below.

For each premises group user ID, the AVSM objects could also maintain a user-specific file list in the AVSS database. In such an embodiment, the user-specific file list includes the name of each A/V file for which the user ID is specified in the file's access privilege list, and indicates whether the user ID is specified in the file's authorship data.

AVSM objects additionally maintain the contents of the AVSS state memory 174 to reflect current resource, request, and message status across all currently-active request processing sessions. The contents of the AVSS state memory 174 include the following:

1) a current user list that specifies user IDs corresponding to currently logged-in users;
2) a list of currently-active request processing sessions;
3) a time-stamped and indexed request queue identifying currently-pending requests, for both incoming and outgoing requests;
4) currently-available capacity and utilization for each AVSS storage resource;
5) current encoding/decoding/transcoding resource utilization; and
6) an AVSM event log specifying session time-out occurrences; application errors; AVSC faults; network faults; changes in the current user list and currently-active session list; changes in storage resource utilization and available storage space; and changes in encoding, decoding, and/or transcoding resource utilization. The contents of the AVSM event log are used to update the event statistics file.

In an exemplary embodiment, the AVSM 160 is implemented as a personal computer server having a Pentium II or generally-equivalent processor, a network interface card, 128 Megabytes of RAM, and a 10 Gigabyte or larger hard disk drive. Those skilled in the art will understand that the AVSM 160 could be implemented using a hardware/software platform that is essentially identical to that used for implementing an AVSC 120.

4.5.3 Scaling Hierarchy

The present invention can be scaled to provide enhanced performance and/or additional capabilities. Two types of scaling are possible, namely, numerical and evolutionary scaling. Numerical scaling implies the incorporation of additional hardware elements, while evolutionary scaling implies replacement of existing hardware elements with higher-performance or more "technologically evolved" hardware. The architectures described herein flexibly accommodate numerical and/or evolutionary scaling across several interrelated hierarchical performance boundaries or levels, which include the following:

4.5.3.1 Bus and processor throughput—the capabilities of the bus and, processor within an AVSC 120 or AVSM 160 respectively define one type of AVSC or AVSM performance boundary. For example, bus throughput considerations limit the amount of bandwidth available for transferring information between elements within any given AVSC 120 or AVSM 160. Through a hardware platform upgrade, which is an evolutionary scaling, this performance boundary can be surpassed or extended.

4.5.3.2 Shared data storage unit throughput and capacity—the data transfer rate and storage capacity of the shared data storage unit 124 within any particular AVSC 120 define another performance boundary. This boundary can be surpassed by the inclusion of additional data storage devices within the shared data storage unit 124, and/or the use of higher-performance data storage devices. The performance gain achieved through numerical or evolutionary scaling in this case is dependent upon the bus throughput boundary described above.

4.5.3.3 Shared coding unit throughput and capabilities—the A/V file processing capabilities of the shared coding unit 130 within any given AVSC 120 also define a performance boundary. The incorporation of additional encoding, decoding, and/or transcoding resources within a shared coding unit, and/or the use of higher-performance A/V processing resources, results in the extension of this boundary. Those skilled in the art will understand that higher-performance resources in this case would likely perform essentially-simultaneous encoding, decoding, and/or transcoding operations on multiple execution threads. Those skilled in the art will additionally recognize that the performance gain achieved through numerical or evolutionary scaling here is dependent upon the aforementioned bus throughput boundary.

4.5.3.4 Collective AVSC capabilities and throughput—the overall A/V file processing performance and capabilities of the set of AVSCs 120 within the AVSS introduce another performance boundary, which can be surpassed through the incorporation of additional AVSCs 120 into the AVSS, and/or the use of higher-performance AVSCs 120. Those skilled in the art will understand that increasing the performance of any given AVSC 120 involves surpassing one or more of the previously-described performance boundaries.

4.5.3.5 Internal network bandwidth—the data transfer capabilities or loading limitations of the AVSS internal network 110 introduce another performance boundary, which can be surpassed through evolutionary scaling.

4.5.3.6 Collective networked AVSS performance and capabilities—the performance and capabilities of an entire AVSS group coupled via a campus and/or wide-area network also introduces a performance boundary that can be readily surpassed through numerical and/or evolutional scaling in accordance with performance requirements relative to cost constraints.

Those skilled in the art will recognize that just as a system can be scaled upward relative to performance, it can also be scaled downward, which might occur, for example, when cost constraints are of paramount importance. The architecture of the present invention, however, can provide high A/V and/or multimedia processing performance while leveraging the capabilities of readily-available, low-cost technology.

4.6 Functional Partitioning Between AVSM and AVSCs

The types of functions performed by the AVSM 160 are partitioned relative to those performed by the AVSCs 120 to ensure consistent operability across essentially any internal AVSS implementation, particularly in view of numerical and evolutionary scalability. As a result, the AVSM 160 can support a continually-evolving range of AVSC implementations without modification.

The AVSM 160 provides centralized management of AVSS functionality. The AVSM 160 receives AVSS service requests and control messages from user applications. In response to service requests, the AVSM 160 establishes request processing sessions, as described in detail below. The AVSM generates a session handle to uniquely identify each such session. Exemplary AVSS service requests include the following:

1) login {user ID, password};
2) create and encode A/V file {session handle file name, file password, plus other parameters described below};
3) fetch and decode A/V file {session handle, file name, file password};
4) delete A/V file {session handle file name, file password};
5) copy A/V file {source address, source session handle, target address, target session handle plus other parameters described below}; and
6) move A/V file {source address, source session handle, target address, target session handle plus other parameters described below}.

Other types of AVSS service requests include requests for sending or receiving streams; retrieving or distributing files; and performing administrative and diagnostic operations. Control messages received from user applications include acknowledgments; error codes; and interactive control requests such as start, stop, pause, reverse, and/or fast forward commands issued during the recording, playback, and/or editing of A/V files.

In response to AVSS service requests, the AVSM 160 may directly perform one or more functions, and/or issue a set of high-level requests to its associated AVSCs 120 in accordance with AVSC capabilities and availability. In terms of directly-performed functions, the AVSM 160 establishes and manages request processing sessions with user applications; allocates A/V file names and tracks A/V file location and usage information; allocates AVSC resources to request processing sessions based upon AVSC capabilities and availability; allocates AVSC resources to file copy and move transactions; forwards file copy and move requests to campus or remote systems in the event that an A/V file does not reside upon one of the premises AVSCs 120; and issues requests to the AN network 30 to establish AN communication and perform A/V network services (such as conferencing) for user applications.

Any given AVSC 120 that receives a high-level request from the AVSM 160 carries out the request by performing a set of operations in accordance with its own methods and constraints. In this manner, the AVSM 160 may be designed to avoid "micro-managing" the details of AVSC 120 operation. Depending upon the nature of a high-level request, an AVSC 120 may allocate and lock an encoding, decoding, or transcoding resource; allocate file storage space; execute an encoding, decoding, or transcoding procedure; perform a file transfer or copy operation to or from a local or remote target destination or source; delete a file; or report request processing, message, storage device, and/or encoding, decoding, or transcoding resource status to the AVSM 160.

4.7 AVSS Services

The AVSM 160 manages or provides a variety of AVSS services, including session management, file management, device management, and administrative services. Details of such services and the manners in which they are implemented are described hereafter.

4.7.1 Session Management Services

From the perspective of application programs executing on user workstations 40 or other computers coupled to the CMCE 10, the premises AVSM 160 provides access to services associated with premises, campus, and/or wide-area AVSS resources. Any given application program typically generates one or more graphical windows plus menus and control, list, dialog, and/or other graphical boxes that form a portion of a Graphical User Interface (GUI), as described in detail below. The application program is responsive to selections that a user graphically indicates, in a manner well understood by those skilled in the art.

Particular user selections indicate that the user requires AVSS-related services. In response to such selections, the application program issues service requests to the associated premises AVSM 160. Upon receiving a service request, the AVSM 160 establishes a request processing session to provide or oversee the provision of the required service. During the session, the AVSM 160 may directly perform one or more operations, and/or the AVSM 160 may generate one or more requests directed to premises AVSCs 120, the premises A/V network manager 34, and/or campus or remote AVSMs 160. Additionally, premises, campus, or remote CMCE elements involved in the session may generate requests directed to each other and/or the application program.

Figure 10:
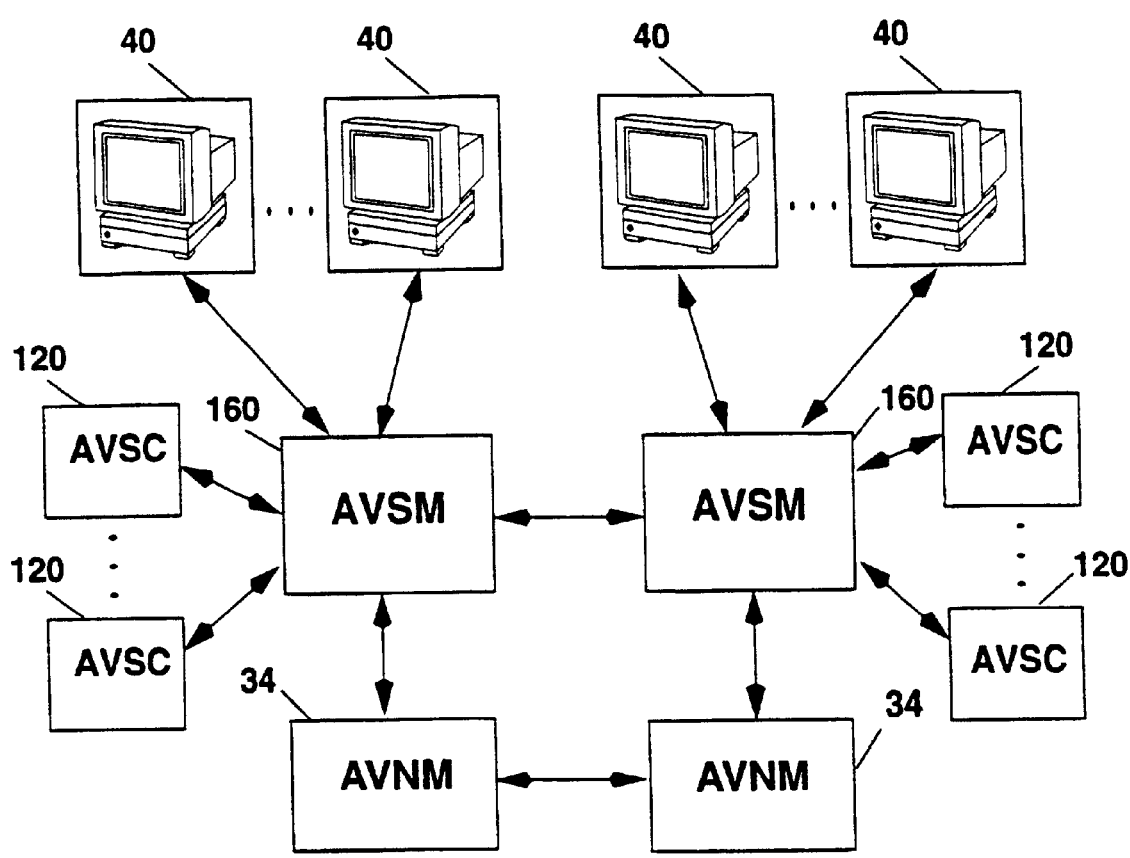
FIG. 10 is a block diagram illustrating client-server session communication in one embodiment of the present invention.

FIG. 10 is a block diagram illustrating session communication protocols utilized in one embodiment of the present invention. Essentially any number of instances of a wide variety of application programs communicate with their corresponding premises AVSM 160 via an AVSM client protocol. A given premises AVSM 160 communicates with its associated AVSCs 120 via an AVSC client protocol, and the premises A/V network manager 34 via an A/V network client protocol. Cross-premises AVSM-to-AVSM communication is based upon an AVSM peer protocol, while analogous A/V network manager communication is based upon an A/V network peer protocol.

Prior to gaining access to A/V processing resources or services, a workstation user must execute an AVSS access program, which issues a login request to the AVSM 160. As described in detail below, the login request includes a user ID, which establishes the user's identity to the AVSM 160 for purposes of file ownership and access permission checking. The user ID also provides the AVSM 160 with the A/V network port information necessary for establishing any A/V network connections required. In one embodiment, the, login request additionally includes password information, which may be encrypted. When a user no longer requires access to A/V processing resources or services, the user may utilize the AVSS access program to issue a logout request to the AVSM 160, which results in removal of the corresponding user ID from the current user list within the AVSS state memory 174.

Following a successful login, an application program executing on the user's workstation 40 may issue a request to the AVSM 160 for A/V processing resources and/or A/V file management services. Upon receipt of a request, the AVSM 160 establishes a session by performing any necessary file access authorization operations as described below; generating a session handle that uniquely identifies the session; adding the session handle to the currently-active session list in the AVSS state memory 174; identifying and allocating appropriate AVSC resources; identifying and allocating appropriate A/V network resources; and issuing a session identification message to the requesting client, where the session identification message includes the session handle. After session establishment, the AVSM 160 manages the session by directly performing operations, and/or issuing or routing requests, control messages, and/or status messages to AVSCs 120, the A/V network manager 34, other AVSMs 160, and/or the application program. The AVSM 160 terminates the session by deallocating resources, issuing a termination message or reply to the application program, and deleting the session handle from the currently-active session list. The AVSM 160 supports at least three types of sessions, namely, 1) viewer tool sessions; 2) maintenance tool sessions; and 3) administrative tool sessions. The characteristics of each of these session types, as well as the operations undertaken by the AVSM 160 in support thereof, are described in detail hereafter.

4.7.1.1 Viewer Tool Sessions

Herein, a viewer tool comprises an application program that controls A/V file recording as well as real-time analog or digital streaming A/V file delivery or viewing via one or more graphical windows, menus, and control, dialog, or other boxes that facilitate user input. The AVSM 160 establishes a viewer tool session when a viewer tool application executing on a workstation 40 or other computer issues a request specifying that either real-time (or near-real-time) analog or digital streaming delivery of an A/V or multimedia file is required (i.e., when a user needs to view an A/V file). Real-time analog or digital streaming delivery is required, for example, during A/V file recording, editing, and/or playback, and involves A/V signal delivery to a display device (such as a workstation monitor or television) under the direction of the viewer tool application program.

To initiate a viewer tool session, the AVSM 160 determines whether the request received from the viewer tool application specifies an existing A/V or multimedia file. If so, the AVSM 160 performs file access authorization operations, as described in detail below, to verify whether the viewer tool user should be granted access to the file. If the file access authorization operations are unsuccessful, the AVSM 160 issues a reply to the requesting viewer tool application indicating proper access authorization does not exist, and the viewer tool session ends.

Upon successful completion of the file access authorization operations, the AVSM 160 generates a session handle, and adds it to the currently-active session list. The AVSM 160 next identifies an AVSC 120 that includes A/V processing resources capable of performing the operations required by the viewer tool application. In one embodiment, the AVSC selection is performed in accordance with the resource allocation operations described in detail below. For the creation (i.e., recording) of a new A/V or multimedia file, the AVSM 160 selects an AVSC 120 upon which sufficient storage space and an appropriate type of encoder exist. For the playback or editing of an existing A/V or multimedia file, the AVSM 160 selects an AVSC 120 upon which a copy of the file resides and appropriate decoding or transcoding resources are present.

After identifying an appropriate AVSC 120, the AVSM 160 sends a request to the AVSC 120 to allocate the resources required for performing the operation(s) required by the viewer tool application program. In one embodiment, the AVSM 160 subsequently issues a request to the AV network manager 34 to establish any required A/V network connections. In an alternate embodiment, the viewer tool application program issues a request to the A/V network manager 34 to establish such connections. After AVSC selection/resource allocation and A/V network connection establishment, the AVSM 160 issues a session identification message containing the session handle to the viewer tool application, which indicates that the viewer tool session can proceed.

During the viewer tool session, the AVSM 160 routes control messages received from the viewer tool application to the selected AVSC 120, thereby facilitating AVSC performance of open-file, play, adjust-playback-rate, stop, seek, pause, rewind, fast-forward, record, save-file, or other operations as supported by the viewer tool application program The AVSM 160 may additionally issue status messages to the viewer tool application, which can include video frame numbers and/or running or elapsed time. In one embodiment, the AVSM 160 polls the AVSC 120 for status information, and forwards it to the viewer tool application program.

A multimedia file comprises one or more types of files and/or references to files, where such files may include textual, graphical, image, audio, and/or video information as well as commands or event sequences for generating or rendering such information. The multimedia file may further include temporal correlation data specifying one or more manners in which its constituent files and/or file references are associated in time. In the context of the present invention, a multimedia file comprises one or more omnifiles, where an omnifile is defined as a metafile plus a corresponding pointer file. The metafile includes one or more of the following types of files:

1) A/V files;
2) audio-only files;
3) video-only files;
4) bitmap files;
5) postscript files;
6) graphics files;
7) text files;
8) application files; and
9) synchronization files.

The synchronization files associate events or commands occurring within the context of one or more application programs with particular time references, which may be A/V file frame numbers. Synchronization files can include application startup event files, text event files, window event files, graphics rendering event files, and shareboard event files, as further described below. In one embodiment, a synchronization file can include a priority level for each command or event specified therein. The various files that comprise the metafile may be stored across one or more workstations 40, AVSCs 120, servers, or other computers coupled to the CMCE 10; The pointer file associated with a metafile contains pointers or references to each element within the metafile.

In one embodiment, the synchronization files are stored on AVSCs 120. In the event that the viewer tool session involves multimedia file recording, the AVSM 160 transfers application program synchronization information or commands received from the viewer tool application to the AVSC 120 such that the synchronization information can be saved in a synchronization file. For multimedia file playback and/or editing, the AVSM 160 requests the synchronization file from the appropriate AVSC 120. To ensure temporal consistency during playback operations, the AVSM 160 polls the AVSC 120 allocated to serving the current viewer tool session for frame number or time-based A/V file data, and issues synchronization messages to the viewer tool application at appropriate times or intervals, in accordance with a currently-specified playback frame rate or speed. The synchronization messages contain event information, commands, and command priority levels specified within the synchronization file. Upon receipt of a synchronization message, the viewer tool application executes commands specified therein, or facilitates the execution of such commands via their transfer to other application programs, thereby regenerating application events and/or the presentation of textual, graphics, image, or other multimedia content information at appropriate times while A/V file playback occurs.

The AVSM 160 could alternatively transfer the synchronization file to the viewer tool application, poll the AVSC 120 for frame-number or time-based A/V file data, and issue frame or time status messages to the viewer tool. The viewer tool application could then execute or issue the appropriate commands to facilitate multimedia synchronization upon receipt of frame or time status messages that correspond to frame numbers or times specified within the synchronization file. In other embodiments, the synchronization files themselves could be stored on the AVSM 160 rather than on AVSCs 120, or the synchronization files could normally reside upon the user workstation 40.

In one embodiment, in the event that the viewer tool session involved A/V file or multimedia file editing and file edits or changes were saved while maintaining the filename, the AVSM 160 performs modification propagation operations as described in detail below to ensure that the file changes propagate to each copy of the A/V file stored on the AVSCs 120.

The operations described above pertain to within-premises viewer tool sessions. Non-premises viewer tool sessions occur in an analogous manner. In one embodiment, in the event that a viewer tool application requires real-time/near real-time analog or digital streaming A/V file delivery from a non-premises AVSS 100, the viewer tool application issues a request to the appropriate non-premises AVSM 160. In response, the non-premises AVSM 160 establishes a viewer tool session in the manner described above, such that analog A/V signals are exchanged via the premises workstation 40, the premises codec gateway 38, the second WAN 39, and the non-premisescodec gateway 38 that serves the non-premises AVSS 100.

Figure 11:
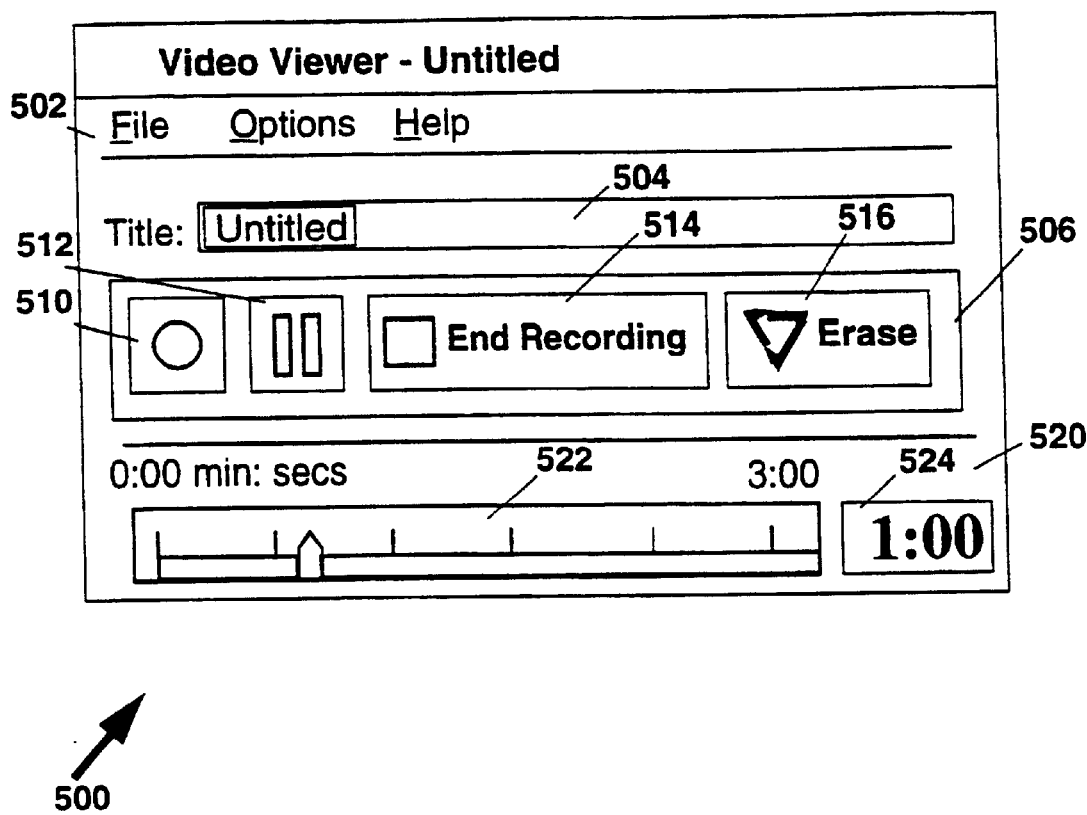
FIG. 11 is a block diagram showing an exemplary recording control Graphical User Interface (GUI).

A viewer tool provides a workstation user with a Graphical User Interface (GUI) for controlling A/V file recording and playback operations. FIG. 11 is a block diagram showing an exemplary recording control GUI 500. The recording control GUI 500 comprises a graphical window that includes a menu bar 502, a title box 504, a recording control panel 506, and a time panel 520. The menu bar 502 provides a workstation user with access to conventional types of submenus, including file, options, and help submenus. User-selectable operations from within the options submenu include login and change-password operations. User-selectable operations from within the file submenu include the following:

1) New—opens a new A/V file for recording, in the manner described below;
2) Open—invokes a browser tool that facilitates opening and subsequent playback of an existing A/V file, as described below;
2) Save—saves an A/V file with a given filename;
3) Properties—facilitates entry and editing of properties associated with the A/V file being recorded, such as encoding type and a natural language title; and
4) Exit—terminates the viewer tool session.

The title box 504 identifies the current title of an A/V file under consideration. The recording control panel 506 provides a set of user-selectable buttons for controlling recording operations. These buttons include a start recording button 510; a pause recording button 512; a stop or end recording button 514, and an erase or discard recorded information button 516. The time panel 520 graphically indicates a current recording length or time via the provision of a slider bar 522 and a time box 524.

Figure 12:
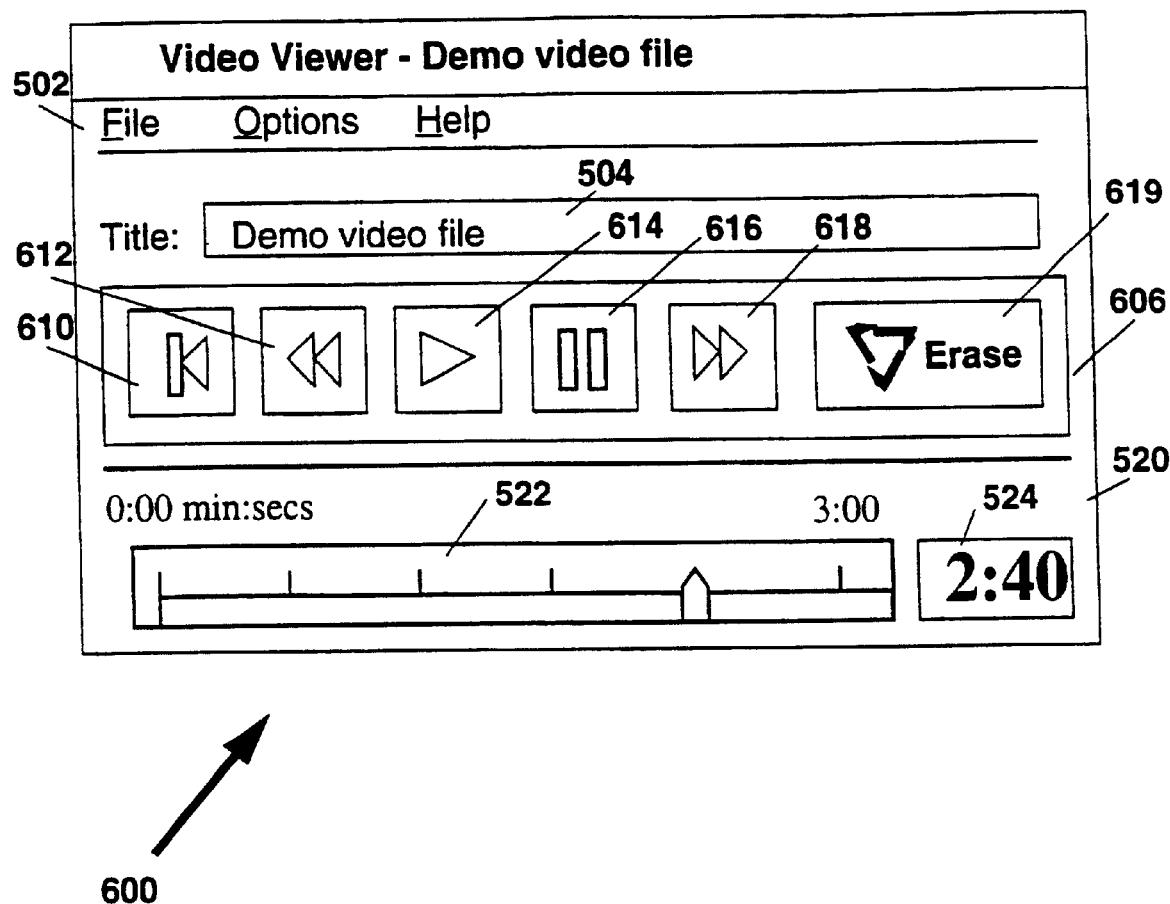
FIG. 12 is a block diagram showing an exemplary playback control GUI.

FIG. 12 is a block diagram showing an exemplary playback control GUI 600. For ease of understanding, common elements shown in FIGS. 11 and 12 are denoted with common reference numbers. The playback control GUI 600 comprises a graphical window that includes a menu bar 502, a title box 504, a playback control panel 606, and a time panel 520. The menu bar 502 enables user to select from among the operations described above with reference to FIG. 11. Similarly, the title box 504 indicates the current title of the A/V file under consideration. The playback control panel 606 includes a plurality of user-selectable buttons that facilitate playback control operations, including a rewind to beginning button 610; a skip back button 612 that facilitates moving or jumping backward to an earlier position within an A/V file, where the earlier position corresponds to a predetermined or user-definable time increment, for example. 3 seconds; a playback start button 614; a playback pause button 616; a skip forward button 618 that facilitates moving or jumping backward to a later position within an A/V file, where the later position corresponds to a predetermined or user-definable time increment, for example, 3 seconds; and an erase file button 619. In a manner analogous to that for the recording control GUI 500, the time panel 520 graphically indicates a current playback length or time via the provision of a slider bar 522 and a time box 524. Those skilled in the art will understand that the recording and playback control GUIs 500, 600 provide workstation users with a graphical interface that is visually consistent with controls found on common devices such as Video Cassette Recorders (VCRs).

Figure 13:
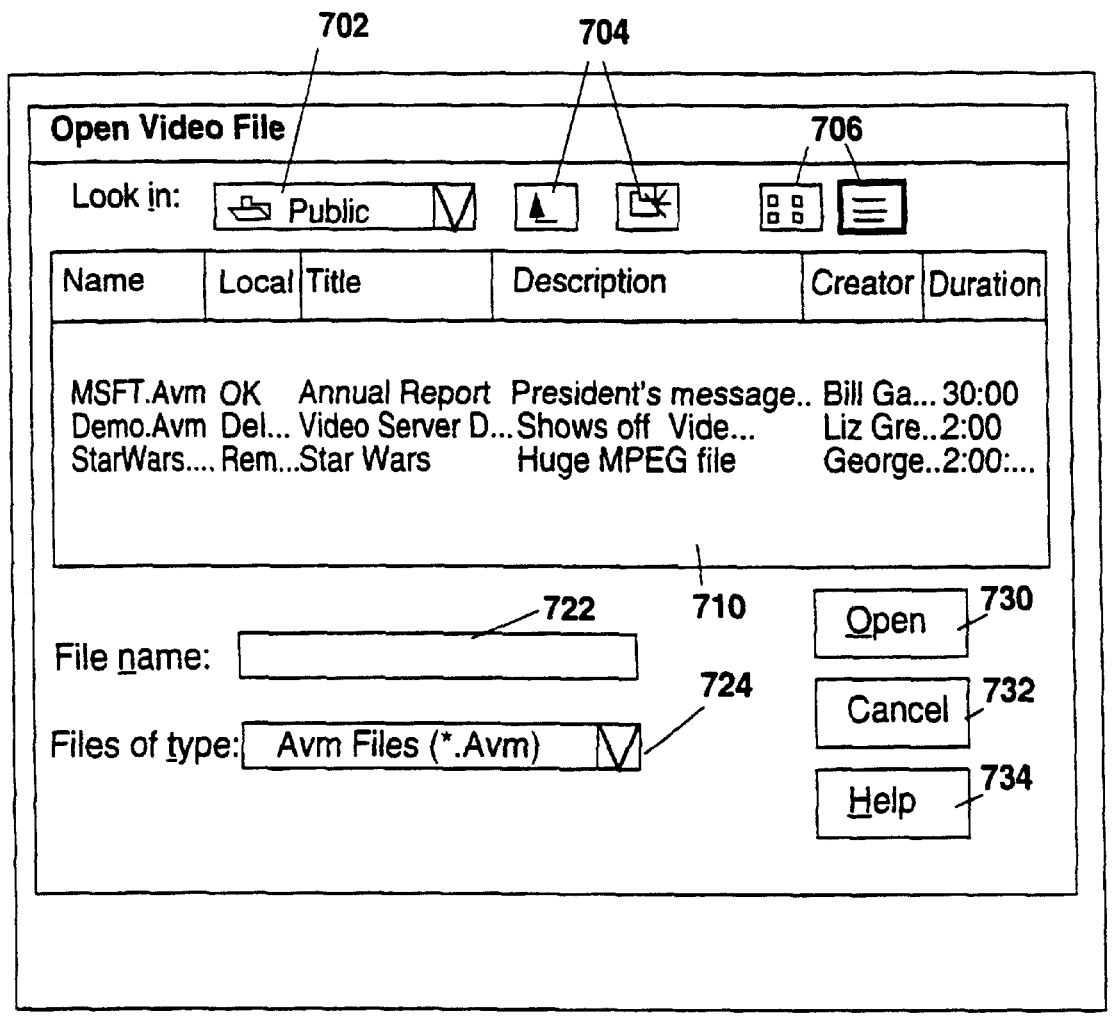
FIG. 13 is a block diagram showing an exemplary browsing control GUI.

In response to certain submenu selections, such as Open within the file submenu, the viewer tool transfers control to or invokes functionality within or associated with a browsing or administrative tool to provide a workstation user with a GUI for browsing and selecting A/V files and/or performing A/V file administration operations as described in detail below. FIG. 13 is a block diagram showing an exemplary browsing control GUI 700. The browsing control GUI 700 comprises a dialog box that includes a file source listbox 702 and file source control buttons 704; display format control buttons 706; a file information listbox 710; a file name box 722; a file type listbox 724; and operation control buttons 730, 732, 734. The file source listbox 702 and associated file source control buttons 704 facilitate user-identification of a file source from which A/V files can be selected for consideration. The display format control buttons 706 facilitate user-selection of file information display formats, where available display formats include display-by-icon and display-by-attributes. For each A/V file for which the workstation user is identified as an owner, the file information listbox 710 displays file information in accordance with the selected file parameter display format. Such information can include a filename; a file location; a natural language title; a description; file authorship; and playback duration. The file name box 722 facilitates user-entry of a specific filename, and the file type listbox 724 facilitates browsing operations directed to files of a specific type. Finally, the operation control buttons include an open button 730, the selection of which results in the opening of a specified or selected A/V file for playback operations; a cancel button 732; and a help button 734.

4.7.2 Maintenance Tool Sessions

The AVSM 160 establishes a maintenance tool session in response to a request that specifies that one or more user-based file maintenance operations are required. In the context of the present invention, a maintenance tool comprises an application program executing on a user workstation 40 or other computer, and which generates one or more graphical windows, menus, and/or boxes that facilitate particular A/V file maintenance operations in response to user input. In one embodiment, the user input may be in the form of text, graphical selections, or graphical drag-and-drop sequences.

As described in detail below, the AVSM 160 supports many file management operations, a subset of that comprises file maintenance operations that are directly available to workstation users. In one embodiment, the file maintenance operations include file access list maintenance; file expiration date maintenance; file renaming; file transfer in the form of either copying or moving; file deletion; user-specific file listing; user-specific archival operations; and file attribute queries. Each of these operations is described in detail below in the context of AVSM file management operations. Those skilled in the art will recognize that the file maintenance operations could include additional or fewer types of operations in another embodiment.

The AVSM 160 initiates a maintenance tool session by performing A/V file access authorization operations as described in detail below. If access authorization is unsuccessful, the AVSM 160 terminates the session. Otherwise, the AVSM 160 generates a session handle, adds it to the currently-active session list, and issues a session identification message to the maintenance tool application. The AVSM 160 determines whether access to one or more campus and/or remote AVSMs 160 is required to process the file maintenance request, and, if so, issues requests to allocate the required campus and/or remote resources. Once such resources are allocated, the campus and/or remote AVSMs 160 issue a reply to the premises AVSM 160 specifying AVSC network address information if required. The AVSM 160 subsequently determines what premises AVSCs 120 are required to process the file maintenance request, and issues requests to the premises AVSCs 120 to allocate the appropriate resources and begin performing the required operation.

During the performance of file maintenance operations, the AVSM 160 issues status requests to premises and/or non-premises AVSCs 120, which reply with status information. The AVSM 160 then sends status messages to the file maintenance tool application accordingly. Such status messages may indicate, for example, a percentage of the operation that has been completed or an estimated amount of time remaining until completion. Once the file maintenance operation is complete, the AVSM 160 issues a session termination reply to the maintenance tool.

Some file maintenance operations, such as A/V file renaming or copying, may be requested within the context of a viewer tool session. That is, one or more aspects of maintenance tool functionality may be incorporated into a viewing tool. In such situations, the AVSM 160 performs or oversees the performance of the file maintenance operation within the context of the viewer tool session, in a manner essentially identical or analogous to that described for the file maintenance tool session. Moreover, in one embodiment, a maintenance tool may provide for the invocation of a particular viewer tool in response to user input, in which case the AVSM 160 establishes a viewer tool session as a result.

4.7.3 Administrative Tool Sessions

Herein, an administrative tool comprises an application program that generates, presents, and/or manages administrative information on a workstation-based or other display device in response to user input. The AVSM 160 establishes an administrative tool session in response to a request for user-accessible information stored in the AVSS database. Such information may include, for example, user account and password information, or particular data within the event statistics file.

Upon receiving an administrative information request, the AVSM 160 generates a session handle, and adds it to the currently-active session list. The AVSM 160 then transfers data corresponding to the request to the administrative tool. Upon receiving the data, the administrative tool generates and/or presents administrative information to the user. If administrative data is user-modifiable, as could be the case for user passwords, the AVSM 160 changes the data within the AVSS database in response to a request received from the administrative tool. Some administrative data may be non-user-modifiable, such as current AVSS utilization; AVSS usage history for the user, which may include average session length, by session type; and/or current charges billed to the user.

4.7.4 File Management Services

As indicated above, the AVSM 160 provides or oversees the provision of a variety of file management services. A subset of the file management services comprise the user-accessible file maintenance operations, while other file management services are performed by the AVSM 160 on an internal-only basis. In one embodiment, the file management services include the following:

4.7.4.1 Access Authorization Services

AVSM software objects maintain the access privilege list within each A/V file's parameter table in the AVSS database. The access privilege list comprises a list of user IDs that specifies which users "own" the A/V file, where ownership implies basic access rights to the A/V file. The extent of A/V file access rights may depend upon whether a user falls into a particular category, such as the A/V file's author or other category as detailed below. In one embodiment, an A/V file access request generated by a client application program includes a user ID, a filename, and a password. Upon receiving such a request, the AVSM 160 determines whether the user ID associated with the request is specified within the A/V file's access privilege list. If so, the AVSM 160 proceeds with processing the file access request. If the user ID is not specified within the access privilege list, the AVSM 160 compares the password specified within the A/V file access request with that in the file parameter table. If the passwords match, the AVSM 160 adds the user ID to the access privilege list, and proceeds with request processing operations. Otherwise, the AVSM 160 issues a reply containing an error code to the client application program to indicate that A/V file access has been denied.

In one embodiment, the presence of a reserved user ID in an A/V file's access privilege indicates that the file may be accessed by any user, that is, the file is generally or publicly accessible. One embodiment of the present invention also provides for an administrative "super-user" defined to have essentially unlimited access privileges for any A/V file. In response to a request for A/V file access received from an application program associated with the super-user, the AVSM 160 proceeds with request processing operations.

4.7.4.2 Access List Maintenance

In response to an access list maintenance request received from a client application program, the AVSM 160 selectively adds user IDs to or deletes user IDs from an A/V file's access permission list. The AVSM 160 performs access list maintenance operations only for users having a user ID specified in the access permission list, subject to the whether a user is the A/V file author, an owner, or a super-user. The AVSM 160 allows an A/V file author or a super-user to modify the access permission list as required. The AVSM 160 permits any given A/V file owner that is not the file's author to remove their user ID from the access permission list.

In one embodiment, the AVSM 160 adds the user ID of a user who authors an A/V file to the A/V file's access permission list by default. The AVSM 160 may add other user IDs to the access permission list in response to client application program requests. For example, an A/V- or multimedia-enabled e-mail application program as described in detail below allows message authors to include an A/V or multimedia file as a MIME-based message attachment. The AVSM 160 adds the user ID corresponding to each message recipient to the A/V file's access permission list, as directed by the e-mail application program. The AVSM 160 may also or alternatively add a message recipient's user ID to the access permission list in response to an A/V file access request specifying a user ID, a filename, and a valid password.

4.7.4.3 User-Specific File Listing

An application program associated with or executing on behalf of a user may issue a file listing request to the AVSM 160. In turn, the AVSM 160 performs a directory sort operation, and replies to the application program with a list identifying each A/V file for which the user is specified as an owner in the file's access permission list. In an alternate embodiment in which the AVSM 160 maintains a user-specific file list in the AVSS database as described above, the AVSM 160 could reply to the application program with data from the user-specific file list.

The application program may subsequently display a set of filenames for which the user is specified as an owner. In one embodiment, the file listing request may indicate that data for publicly-available files is also required. If so, the AVSM 160 provides such data to the requesting application program.

4.7.4.4 User-Specific File Archival

An application program may additionally issue a file archival request to the AVSM 160, where the file archival request identifies one or more A/V files owned by the user associated with the requesting application program for which archival operations are required. The AVSM 160 subsequently manages archival operations in which the identified A/V files or copies thereof are stored in a premises or non-premises user ID-based archive. The archival operations include one or more file transfer services as detailed below.

4.7.4.5 Attribute Query

In response to an attribute request received from an owner of an A/V file, the AVSM 160 provides attribute information for the A/V file, such as file author, size, encoding type, playback duration, current file age, time and date the owner last accessed the file, file expiration date (i.e., access expiration date) for the owner, and/or date of most-recent modification.

4.7.4.6 File Transfer Services

Figure 14:
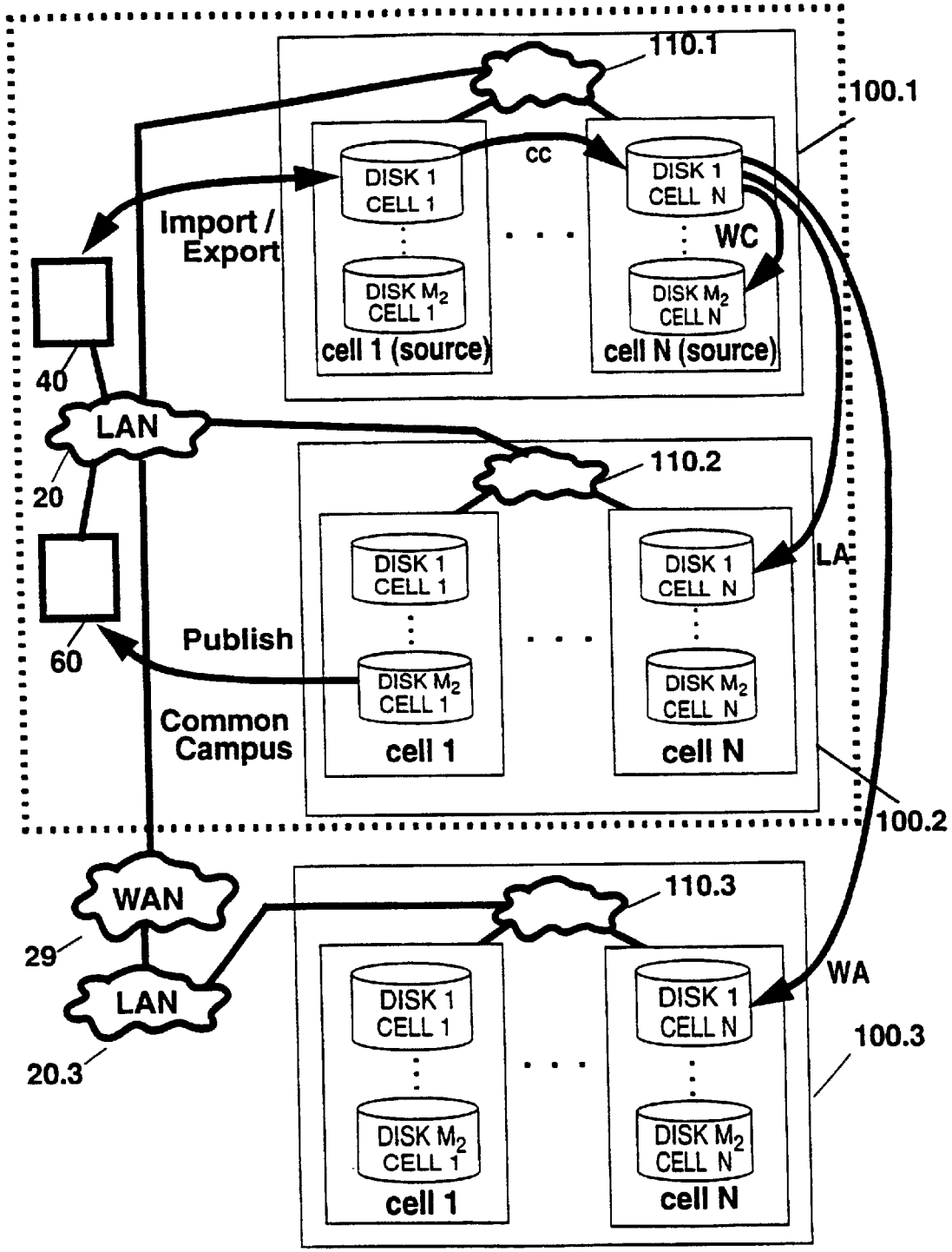
FIG. 14 is a block diagram of an exemplary networked AVSS organization.

File transfer services supported by the AVSM 160 include a) A/V file copy and/or move (i.e., relocate) operations to and/or from a target destination or source; b) file import or export operations between a workstation 40 or other computer and an AVSC 120; and c) digital file publishing operations between an AVSC 120 and a server external to the AVSS 100 in which the AVSC 120 resides. With regard to A/V file copy or move operations, the target destination or source may be premises-, campus-, or wide-area-based. Since any given AVSS 100 may be linked to another AVSS 100 via a LAN or a WAN, both intra- and inter-AVSS file transfers are possible in the context of the present invention. FIG. 14 is a block diagram of an exemplary networked AVSS organization. In the exemplary networked AVSS organization, a first AVSS 100.1 through kth AVSS 100.2 serve a common campus, and hence are coupled to a common data network 20. A remote AVSS 100.3 is coupled to the common data network 20 via a WAN 29. Those skilled in the art will recognize that the exemplary networked AVSS organization shown in FIG. 14 can be generalized to accommodate essentially any required network organization or geographic scaling.

Each AVSS 100 in FIG. 14 includes a set of AVSCs 120, where each AVSC 120 includes a number of disk drives or other devices for storing A/V files. The number of AVSCs 120 can vary from one AVSS 100 to another, as can the number and type of storage devices from one AVSC 120 to another. Relative to intra-AVSS file transfers, A/V files can be transferred from one storage device to another either a) within the same AVSC 120, that is, "within cell" (WC); or b) across different AVSCs 120 in the same AVSS 100, or "cell to cell" (CC). In terms of A/V file transfers directed from an AVSC storage device within one AVSS 100 to an AVSC storage device within another AVSS 100, such transfers can occur either a) within the common campus, or local area (LA); or b) on a wide area (WA) basis, between a common campus AVSS 100 and the remote AVSS 100.

In response to a request that requires a cell-to-cell or within-cell A/V file transfer, the AVSM 160 selects and allocates a source and a destination premises AVSC 120, and issues a request to the one of the selected AVSCs 120 to perform the required transfer. In one embodiment, the request may specify a copy-from, move-from, copy-to, or move-to operation. After the file transfer is complete, the AVSC 120 that fulfilled the request issues a reply to the AVSM 160.

If a file transfer request requires A/V file transfer between a premises and a non-premises AVSS 100, the premises AVSM 160 issues a request to the non-premises AVSM 160 to obtain network address information for an associated non-premises AVSC 120 that can participate in fulfilling the request. Upon receiving such information from the non-premises AVSM 160, the premises AVSM 160 selects and allocates an appropriate premises AVSC 120, and issues a request to the premises AVSC 120 to perform the required file transfer operation. If the file transfer request specifies a copy-to or move-to operation, the A/V file will be transferred from the premises AVSC 120 to the non-premises AVSC 120 accordingly. If the file transfer request specifies a copy-from or move-from operation, the A/V file will be copied or moved from the non-premises AVSC 120 to the premises AVSC 120, respectively. After the file transfer is complete, the premises AVSC 120 issues a reply to the premises AVSM 160. The premises AVSM 160 then issues a notification to the non-premises AVSM 160 to indicate that the file transfer session is complete.

FIG. 14 also shows a workstation 40 coupled to the common data network 20. File import operations involve the transfer of a digital file from a workstation 40 or other computer to an AVSC 120, while file export operations involve the transfer of a digital file from an AVSC 120 to a workstation 40 or other computer. In response to a file import request received from a client application program, the AVSM 160 selects and allocates an available AVSC 120 having sufficient storage space, and issues a request to the AVSC 120 to retrieve the file from the workstation 40 or other computer from which the import request originated. Similarly, in response to a file export request specifying an A/V file, the AVSM 160 selects and allocates an AVSC 120 upon which a copy of the file resides, and issues a request to the AVSC 120 to transfer the file to the workstation 40 or other computer from which the export request originated. Upon completion of file transfer operations corresponding to an import or/and export request, the AVSC 120 issues a reply to the AVSM 160.

File publishing operations involve the transfer of a digital file from an AVSC 120 to a server. The server may be essentially any computer system external to the AVSS 100 in which the AVSC 120 resides, for example, an intranet server system 60 or a server coupled to the internet 80. FIG. 14 also shows an intranet server system 60 coupled to the common data network 20. In response to a publish file request that specifies a filename, a target file format, and a network or IP address of a server, the AVSM 160 selects and allocates an AVSC 120 upon which a copy of the file resides. The AVSM 160 then issues a publish request to the AVSC 120, which performs any necessary file format conversion, and transfers the file to the specified server. Upon completing the transfer, the AVSC 120 issues a reply to the AVSM 160.

In general, an AVSC 120 can directly perform both A/V file encoding, decoding, and/or transcoding operations, as well as file transfer operations. Any particular AVSC 120 will have a maximum number of simultaneously-active file transfers it can perform while still delivering high-quality encoding, decoding, or transcoding performance. Thus, file transfer needs must be balanced against encoding, decoding, and/or transcoding needs. Typically, encoding, decoding, and/or transcoding operations are given higher priority than file transfer operations. In one embodiment, an administrative application program facilitates defining a first-priority and a second-priority AVSC bus and disk bandwidth partition. The first-priority bandwidth partition is reserved for performing encoding/decoding/transcoding operations, while the second-priority partition is reserved for file transfer operations. As file transfer requests are allocated to an AVSC 120, it services them immediately using bandwidth within the second-priority partition. If the AVSC 120 receives a file transfer request that it cannot immediately service, the AVSC 120 places the request into the request queue within its state memory 154. Requests in this queue are served as more bandwidth becomes available within the second-priority partition. In one embodiment, the request queue is implemented as a First-In, First-Out (FIFO) queue in a conventional manner. The request queue could alternatively be implemented as a prioritized queue, and/or as a queue from which requests are serviced in accordance with current resource availability. Alternatively, requests that cannot be immediately serviced could be terminated and a reply sent back indicating resources are not currently available thereby allowing the AVSM 160 and/or client application to look for some other means to service the request.

4.7.4.7 File Replication

An A/V file should be present upon multiple AVSCs 120 to ensure that the file can be independently accessed by a reasonably large number of users at any given time. Thus, after A/V file creation (i.e., after a new A/V file has been created and saved), or after the transfer of a new A/V fife onto one of the premises AVSCs 120, the AVSM 160 initiates file replication operations. During the file replication operations, copies of the A/V file are stored on a plurality of premises AVSCs 120. In one embodiment, copies of associated multimedia synchronization files are also replicated.

The particular file replication strategy employed at any given time depends upon several factors, including the number of premises AVSCs 120 present; the performance capabilities of each AVSC 120; AVSS internal network bandwidth; and/or current user demand for AVSC resources. In an AVSS 100 employing a single AVSC 120, file replication may not be performed, or limited file replication may occur between separate storage devices on the AVSC 120. For an AVSS having a small number of AVSCs 120—for example, three AVSCs 120 serving approximately 100 users—full replication may be performed. In this case, the AVSM 160 automatically oversees the copying of a new A/V file to each AVSC 120 within the AVSS 100. The copying operations are performed in the manner described above for cell-to-cell file transfer operations. In general, the A/V file is not replicated to a non-premises AVSC 120 in the absence of an application-level request to do so.

Depending upon the performance capabilities of each AVSC 120, as well as the number of premises AVSCs present, full replication may significantly limit AVSC availability for performing other operations. Thus, for an AVSS 100 employing a medium to somewhat large number of premises AVSCs 120—for example, five AVSCs 120 serving a few hundred to several hundred users—the AVSM 160 manages partial file replication operations. During the partial file replication operations, the AVSM 160 oversees A/V file copying to a subset of the premises AVSCs 120, where the copying operations are performed in the manner described above for cell-to-cell file transfer. The A/V file is not generally replicated to a non-premises AVSC unless an application program issues a request requiring such replication. The selection of a particular AVSC 120 as a member of the aforementioned subset may be based upon the number of A/V files, available file storage space, or the number of decoders and transcoders residing upon the AVSC 120.

At some point, partial replication becomes untenable as the number of premises AVSCs 120 within the AVSS 100 becomes very large. In such situations, a subset of the AVSCs 120 are utilized as streaming A/V file servers, and the other AVSCs function as staging points for encoding, decoding, and/or transcoding operations. In one embodiment, the AVSM 160 manages file replication operations for the streaming A/V file servers in a manner analogous to that described above.

4.7.4.8 File Renaming

In response to a name change request, the AVSM 160 changes an A/V file's name as specified in the corresponding file parameter table, and subsequently oversees modification propagation operations as detailed below to change the name of each copy of the A/V file stored across the premises AVSCs 120. In one embodiment, the AVSM 160 permits a name change only if requested by an application program corresponding to a super-user. The AVSM 160 may further permit a name change request for the A/V file's author in the event that the author is currently the sole A/V file owner.

4.7.4.9 File Deletion

In response to a file deletion request, the AVSM 160 directs the deletion of each copy of the A/V file from the premises AVSCs 120 by issuing a delete request to each AVSC 120 upon which a copy of the A/V file resides. In one embodiment, the AVSM 160 permits file deletion only if requested by an application program associated with a super-user. The AVSM 160 may further permit A/V file deletion by the A/V file's author in the event that the author is currently the sole A/V file owner. In one embodiment, the AVSM 160 additionally deletes or oversees the deletion of any multimedia synchronization files associated with the deleted A/V file. Additionally, the AVSM 160 may issue deletion requests to non-premises AVSM 160 and servers 60 and 80 to which it has transferred the A/V file.

4.7.4.10 Modification Propagation

As previously indicated, multiple copies of any given A/V file may reside upon the premises AVSCs 120. The AVSM 160 may permit a given user, such as a super-user or an A/V file's author, to edit or change the file's name or contents after its creation. Each premises copy of the A/V file must be updated to reflect such modification. Thus, in one embodiment, after an A/V filename or contents change, the AVSM 160 issues a sequence of copy-to requests to the AVSC 120 upon which the modified file resides to ensure name and contents consistency between the A/V file copies stored on the AVSCs 120. In an alternate embodiment, the AVSM 160 could issue copy-from requests. Additionally, the AVSM 160 may issue file modification requests to non-premises AVSM 160 and servers 60 and 80 to which it has transferred the A/V file.

4.7.4.11 Expiration Operations

An A/V file's access privilege list includes for each user ID an expiration date and/or time past which the user ID expires and is no longer valid for obtaining file access. For each A/V file parameter table in the AVSS database, the AVSM 160 determines whether any user IDs specified in the access privilege list have expired. If so, the AVSM 160 removes the expired user IDs from the access privilege list. Once no unexpired user IDs remain in the access privilege list, the AVSM 160 issues a file deletion request to each AVSC 120 upon which a copy of the A/V file resides. After each such AVSC 120 has deleted the A/V file, the AVSM 160 deletes the A/V file parameter table from the AVSS database. Alternatively, the AVSM 160 may log expired files and require deletion by an application program associated with a super-user.

4.7.4.12 Database Consistency Operations

The AVSM 160 periodically performs consistency checks to ensure that the file parameter tables within the AVSS database 136 accurately reflect the current premises AVSC file environment. In one embodiment, the AVSM 160 periodically queries each premises AVSC 120 to obtain data for each A/V file stored thereupon, where such data may include an A/V file's name, size, age, encoding format, storage location or address, or other information. In the event that an AVSC 120 returns a filename that is not specified in the AVSS database, the AVSM 160 generates a file parameter table corresponding to the filename, and adds it to the AVSS database. If no AVSC 120 returns a particular filename specified in the AVSS database, the AVSM 160 deletes the corresponding file parameter table from the AVSS database. If the file data returned by an AVSC 120 indicate a discrepancy in file size, age, encoding format, or other information, the AVSM 160 may update the AVSS database accordingly. The AVSM 160 may additionally log any discrepancies, as well as the type of action(s) undertaken in response to each discrepancy. Finally, if a particular AVSC 120 returns a filename specified in the AVSS database, but for which the file parameter table indicates that the file is not stored on this AVSC 120, the AVSM 160 updates the file parameter table with the storage location of the A/V file upon the AVSC 120 in question.

4.7.5 Device Management Services

The AVSM 160 additionally performs device management services, which include AVSC scheduling and allocation services. AVSS resource scheduling and allocation is subject to several: interacting resource constraints, which include the following:

1. AVSM multiple-thread resources (i.e., simultaneous use by multiple sessions):
    a. CPU capacity:
        i. encode session management
        ii. decode session management
        iii. file transfer session management
    b. Bus capacity
    c. Networking port capacity
2. AVSC multiple-thread resources (i.e., simultaneous use by multiple sessions):
    a. CPU capacity:
        i. encode session management
        ii. decode session management
        iii. file transfer session management
        iv. stream session management
        v. audio-video stream multiplexing processes
        vi. audio-video stream demultiplexing processes
        vii. encode session processes
        viii. decode session processes
        ix. file transfer processes
        x. send stream processes
        xi. receive stream processes
    b. Bus capacity
    c. Disk controller/disk bus (e.g. SCSI) capacity
    d. Disk read/write/seek capacity
    e. Networking port capacity
3. AVSC single-threaded resources (i.e., can be used by only one session at a time):
    a. encoder hardware and corresponding encode session(s)
    b. decoder hardware and corresponding decode session(s)

Any type of session has a specific number of specific resources required to execute the session. Some embodiments may grant service requests without regard to details of the current utilization of the resources; however, this may result in underutilization of the resources or in unacceptable performance shortcomings or failure modes if the resource capacities are exceeded. One embodiment would base request acceptance on the needs of the request in view of the available unused capacity of the system. An example of how this can be accomplished is described hereafter.

In some cases, resource requirements may be exact. In other cases, resource requirements may be in the form of upper bounds, estimated averages, or averages biased upwards to provide safety margins. These session-type resource usage estimates may or may not include additional "padding" to allow for processing overhead (task switching, paging, etc.). In the absence of padding in the session-type resource usage estimates, overhead can be provide for by either

- reducing the maximum value of available resource to a value that safely accounts for worse-case incurred overhead at full operating capacity, or
- introducing a specific linear or nonlinear overhead function dependent on the number of various sessions active or projected within the AVSS 100.

Some of the resource usage estimates could be firm fixed values; for example:

- each "encode" session could be designed to require a fully dedicated encoder hardware subsystem;
- each "encode" session could be designed to allocate a fixed block of disk memory (said size dependent on the application) and attempts to record beyond this would be prevented; or
- every "decode" session will have knowledge of the exact the file size It may be more likely, however, that resource usage estimates would not be firm; for example:

- all active encode sessions could share a slightly smaller pool of encoders; and
- all encode session requirements could be handled with averages and attempts to record beyond this would be allowed.

To further illustrate an example of resource allocation process, the following table provides an example framework for resource requirements for several different types of sessions. Other embodiments of course may have different session types and resource requirements.

Each type of resource, or group of resources, has a finite maximum performance value that can be provided by the AVSM 160 or AVSC 120 environments within the AVSS 100.

This finite maximum value will be termed a "capacity bound."

$M_{SM}^{MAX}$=AVSM CPU session management maximum capacity
$M_B^{MAX}$=AVSM Bus maximum capacity
$M_N^{MAX}$=AVSM Networking port maximum capacity
$C_{SM}^{MAX}$=AVSC CPU session management maximum capacity
$C_P^{MAX}$=AVSC CPU process maximum capacity
$C_B^{MAX}$=AVSC Bus maximum capacity
$C_{DC}^{MAX}$=AVSC Disk Controller/disk bus maximum capacity
$C_{RW}^{MAX}$=AVSC Disk read/write/seek maximum capacity
$C_N^{MAX}$=AVSC Networking port maximum capacity
$C_{EH}^{MAX}$=AVSC Encoder hardware maximum capacity
$C_{DH}^{MAX}$=AVSC Decoder hardware maximum capacity The amount of resource required by a potential combination of granted sessions would be determined, in many cases, by the sum of the total allocated resource estimates. Overhead can be included, for example, via the incorporation of a plurality of overhead constants that include the following:

$M_{SM}^{OH}$=AVSM CPU session management overhead
$M_B^{OH}$=AVSM Bus overhead
$M_N^{OH}$=SM Networking port overhead
$C_{SM}^{OH}$=AVSC CPU session management overhead
$C_P^{OH}$=AVSC CPU process overhead
$C_B^{OH}$=AVSC Bus overhead
$C_{DC}^{OH}$=AVSC Disk Controller/disk bus overhead
$C_{RW}^{OH}$=AVSC Disk read/write/seek overhead
$C_N^{OH}$=AVSC Networking port overhead Overhead may also be treated as a linear function of the number of various session types. Incorporation of overhead results in the supportable operating states forming a lattice of points within a convex hull defined by the intersection of

| | | Type of Session | | | | | |
|---|---|---|---|---|---|---|---|
| Type of Resource | | Encode | Decode | Put File | Get File | Send Stream | Receive Stream |
| AVSM CPU capacity | Encode session management | $M_{SM}^E$ | | | | | |
| | Decode session management | | $M_{SM}^D$ | | | | |
| | file xfr session management | | | $M_{SM}^{PF}$ | $M_{SM}^{GF}$ | | |
| | stream session management | | | | | $M_{SM}^{SS}$ | $M_{SM}^{RS}$ |
| AVSM Bus capacity | | $M_B^E$ | $M_B^D$ | $M_B^{PF}$ | $M_B^{GF}$ | $M_B^{SS}$ | $M_B^{RS}$ |
| AVSM Networking port capacity | | $M_N^E$ | $M_N^D$ | $M_N^{PF}$ | $M_N^{GF}$ | $M_N^{SS}$ | $M_N^{RS}$ |
| AVSC CPU capacity | encode session management | $C_{SM}^E$ | | | | | |
| | decode session management | | $C_{SM}^D$ | | | | |
| | file xfr session management | | | $C_{SM}^{PF}$ | $C_{SM}^{GF}$ | | |
| | stream session management | | | | | $C_{SM}^{SS}$ | $C_{SM}^{RS}$ |
| | multiplexing processes | $C_{MP}^E$ | | | | | |
| | demultiplexing processes | | $C_{MP}^D$ | | | | |
| | encode session processes | $C_{CP}^E$ | | | | | |
| | decode session processes | | $C_{CP}^D$ | | | | |
| | file transfer processes | | | $C_{TP}^{PF}$ | $C_{TP}^{GF}$ | | |
| | send stream processes | | | | | $C_{SP}^{SS}$ | |
| | receive stream processes | | | | | | $C_{SP}^{RS}$ |
| AVSC Bus capacity | | $C_B^E$ | $C_B^D$ | $C_B^{PF}$ | $C_B^{GF}$ | $C_B^{SS}$ | $C_B^{RS}$ |
| AVSC Disk controller/disk bus capacity | | $C_{DC}^E$ | $C_{DC}^D$ | $C_{DC}^{PF}$ | $C_{DC}^{GF}$ | $C_{DC}^{SS}$ | $C_{DC}^{RS}$ |
| AVSC Disk read/write/seek capacity | | $C_{RW}^E$ | $C_{RW}^D$ | $C_{RW}^{PF}$ | $C_{RW}^{GF}$ | $C_{RW}^{SS}$ | $C_{RW}^{RS}$ |
| AVSC Networking port capacity | | $C_N^E$ | $C_N^D$ | $C_N^{PF}$ | $C_N^{GF}$ | $C_N^{SS}$ | $C_N^{RS}$ |
| AVSC hardware | encoder hardware | $C_{EH}^E$ | | | | | |
| | decoder hardware | | $C_{DH}^D$ | | | | | hyperplanes defined by the resource capacity bound inequalities. For example, with:

| | |
|---|---|
| $n^E$ = | number of encoding sessions |
| $n^D$ = | number of decoding sessions |
| $n^{PF}$ = | number of put file transfer sessions |
| $n^{GF}$ = | number of get file transfer sessions |
| $n^{SS}$ = | number send streaming sessions |
| $n^{RS}$ = | number of receive streaming sessions | then the supportable operating states in an implementation could be given by the following constraints:

For each AVSM 160 (typically one per AVSS 100),
AVSM CPU capacity (session management)

$$[n^E M_{SM}^E + n^D M_{SM}^D + n^{PF} M_{SM}^{PF} + n^{GF} M_{SM}^{GF} + n^{SS} M_{SM}^{SS} + n^{RS} M_{SM}^{RS}] + M_{SM}^{OH} \leq M_{SM}^{MAX}$$

AVSM bus capacity:

$$[n^E M_B^E + n^D M_B^D + n^{PF} M_B^{PF} + n^{GF} M_B^{GF} + n^{SS} M_B^{SS} + n^{RS} M_B^{RS}] + M_B^{OH} \leq M_B^{MAX}$$

AVSM Networking port capacity:

$$[n^E M_N^E + n^D M_N^D + n^{PF} M_N^{PF} + n^{GF} M_N^{GF} + n^{SS} M_N^{SS} + n^{RS} M_N^{RS}] + M_N^{OH} \leq M_M^{MAX}$$

For each AVSC 120 (at least one, typically multiple, per AVSS 100):

AVSC CPU capacity (session management):

$$[n^E C_{SM}^E + n^D C_{SM}^D + n^{PF} C_{SM}^{PF} + n^{GF} C_{SM}^{GF} + n^{SS} C_{SM}^{SS} + n^{RS} C_{SM}^{RS}] + C_{SM}^{OH} \leq C_{SM}^{MAX}$$

AVSC CPU processes capacity:

$$[n^E C_{MP}^E + n^D C_{MP}^D + n^E C_{CP}^E + n^D C_{CP}^D + n^{PF} C_{TP}^{PF} + n^{GF} C_{TP}^{GF} + n^{SS} C_{SP}^{SS} + n^{RS} C_{SP}^{RS}]$$

$$+ C^{OH} \leq C_{CP}^{MAX}$$

AVSC Bus capacity:

$$[n^E C_B^E + n^D C_B^D + n^{PF} C_B^{PF} + n^{GF} C_B^{GF} + n^{SS} C_B^{SS} + n^{RS} C_B^{RS}] + C_B^{OH} \leq C_B^{MAX}$$

AVSC Disk controller/disk bus capacity:

$$[n^E C_{DC}^E + n^D C_{DC}^D + n^{PF} C_{DC}^{PF} + n^{GF} C_{DC}^{GF} + n^{SS} C_{DC}^{SS} + n^{RS} C_{DC}^{RS}] + C_{DC}^{OH} \leq C_{DC}^{MAX}$$

AVSC Disk read/write/seek capacity:

$$[n^E C_{RW}^E + n^D C_{RW}^D + n^{PF} C_{RW}^{PF} + n^{GF} C_{RW}^{GF} + n^{SS} C_{RW}^{SS} + n^{RS} C_{RW}^{RS}] + C_{RW}^{OH} \leq C_{RW}^{MAX}$$

AVSC Networking port capacity:

$$[n^E C_N^E + n^D C_N^D + n^{PF} C_N^{PF} + n^{GF} C_N^{GF} + n^{SS} C_N^{SS} + n^{RS} C_N^{RS}] + C_N^{OH} \leq C_N^{MAX}$$

AVSC hardware:

$$[n^E C_{EH}^E] \leq C_{EH}^{MAX}$$

$$[n^D C_{DH}^D] \leq C_{DH}^{MAX}$$

Here it is assumed that each encode session is represented with either a fixed or an average amount of disk capacity. Depending upon design choices, one embodiment may enforce a per-session file size limit, while another embodiment may permit file size overruns.

Upon receiving one or more requests for services, the AVSM 160 would, for example, perform the following evaluations:

serialize any multiple pending requests so the following evaluations are done fully separately in sequence for each pending request;

check if accepting the new request would not exceed the AVSM's own capacity requirements; and check all AVSCs 120 within that AVSS 100 to see if at least one AVSC 120 could accept the new request without exceeding the AVSM's own capacity requirements (this could be done via either the AVSM's own image of the AVSC states or by polling at least one AVSC 120).

If more than one AVSC 120 can support the request:

select one according to a conventional procedure such as first available, round robin, or operating lifetime;

allocate the session to the AVSC 120, ensuring directly or indirectly notification of the requesting application and the invocation of appropriate network connections; or otherwise, deny the request.

Clearly there are many other possible implementations. The range of possible implementations could also include methods for ensuring that no single type of application or type of session monopolizes the AVSS 100 at the exclusion of other types of applications or sessions. In the previous illustrative example, this could be accomplished by adding further inequalities to the list above. For example, the total number of file transfer sessions can be limited by adding the constraint.

$$n^{PF} + n^{GF} \leq n^{F:MAX}$$

whered $n^{F:MAX}$ is the maximum number of simultaneous file transfers allowed.

The device management services additionally include AVSC validation operations, through which the AVSM 160 queries each AVSC 120 to determine the number, type, and capabilities of the AVSC's storage, encoding, decoding, and transcoding resources. The AVSM 160 uses the query results to update the AVSS database if needed, and further logs any discrepancies as well as the types of operations undertaken in response.

4.7.6 Administrative Services

The AVSM 160 also performs or manages the performance of administrative services that include system performance and utilization monitoring; system diagnostics; event capture operations; billing operations; password maintenance operations; and user maintenance operations.

Figure 15:
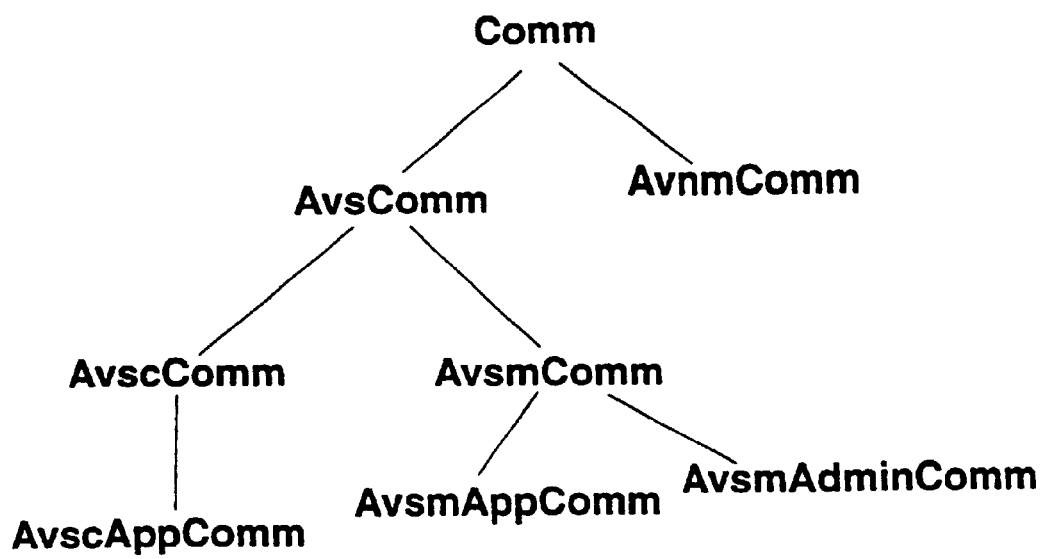
FIG. 15 is a representation of a communication class hierarchy in the present invention.
Figure 15:

4.8 Software Architecture and System Interface 4.8.1 Communication Class Hierarchy In the present invention, the manners in which AVSS-external and AVSS-internal clients may access AVSM, AVSC, and A/V network manager functionality are defined by a set of software communication class hierarchies. FIG. 15 is a block diagram showing a high-level AVSS communication class hierarchy 200 for one embodiment of the present invention. As shown in FIG. 15, the base class for this hierarchy is referred to as "Comm," which serves as a basis for AVSS-external and AVSS-internal client communication. The Comm class also serves as a basis for external and internal A/V network manager client communication, and is described in detail in U.S. Pat. No. 5,617,539.

Several subclasses derived from the Comm class encapsulate particular aspects of AVSS functionality for AVSS-external and AVSS-internal client access. These subclasses include the following:

1) AvnmComm—the AvnmComm class provides access to functionality supported through its parent class, as well as client access to A/V network manager services.

1) AvsComm—the AvsComm class provides access to AVSS functionality that includes login authorization; A/V encoding, decoding, and transcoding; file transfer between AVSCs 120; file importing and exporting; file and directory management; and AVSC configuration and status reporting.

2) AvscComm—the AvscComm class provides access to the functionality supported through its parent class, and in addition provides client and server access to additional AVSC-related services as detailed below.

3) AvscAppComm—the AvscAppComm class provides a client interface for accessing file import and export services.

4) AvsmComm—the AvsmComm class provides access to the functionality supported through its parent class, and in addition provides client and server access to the AVSM file and device management services described above.

5) AvsmAppComm—the AvsmAppComm class provides event handlers that support client application program access to AVSS services.

6) AvsmAdminComm—the AvsmAdminComm class provides AVSS-external and AVSS-internal clients access to AVSS administrative functionality.

4.8.2 AVSM Class Relationship

Figure 16:
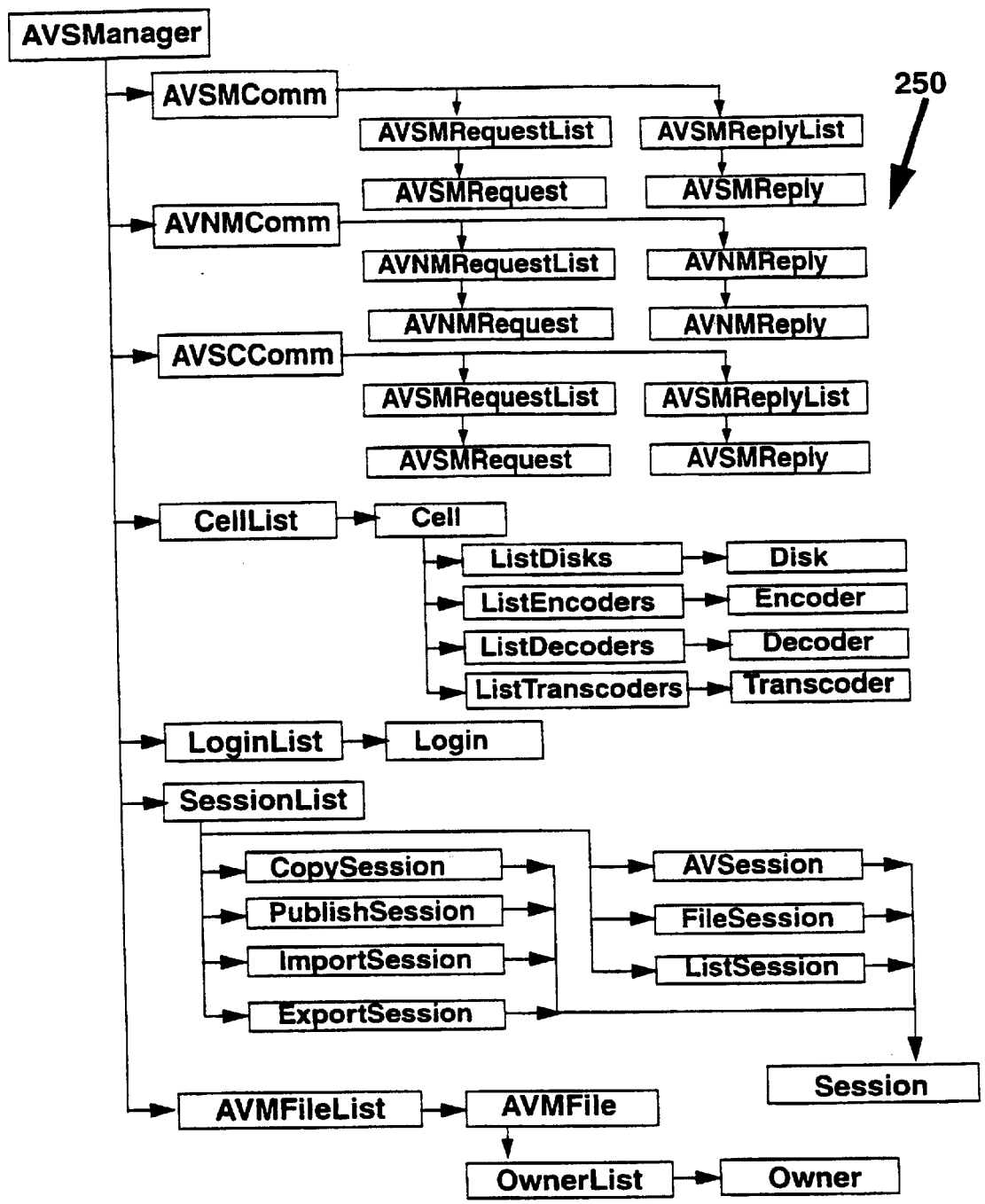
FIG. 16 is a representation of an AVSM class relationship in the present invention.

The classes of AVSM objects resident within the AVSM object memory 172 have a hierarchical class relationship. FIG. 16 is a block diagram of an AVSM class relationship 250 organized in accordance with one embodiment of the present invention. The AVSMManager class comprises comprises a container class for supporting session establishment, session management, and session termination operations. The AVSMManager class further includes parameters and methods for facilitating AVSM operation, i.e., implementing the AVSM 160. The AVSMManager class also contains parameters specifying AVSS operational characteristics, such as AVSC session limits. plus port and connection information for premises AVSCs 120, the A/V network manager 34, and known non-premises AVSSs 100. In one embodiment, the AVSMManager class includes methods that facilitate communication between lower-level classes within the AVSM class hierarchy 250.

An AVSMComm class provides a software infrastructure for implementing a server interface that manages client interactions, where clients include user application programs and/or a non-premises AVSS 100. The AVSMComm class also provides a basis that allows the AVSM 160 to behave as a client relative to non-premisesAVSSs 100. The AVSM-Comm class comprises methods for retrieving requests, building objects that are subclassed according to request type, and dispatching requests. The AVSMComm class further comprises methods for receiving replies, building objects subclassed according to reply type, and issuing replies. The AVSMComm class includes a reference to an AVSMRequestList class and an AVSMReplyList class.

The AVSMRequestList class facilitates the implementation of a queue for requests received from AVSS-external clients, as well as a queue for requests directed to non-premises AVSSs 100. The AVSMRequestList class comprises a reference to an AVSMRequest class, which comprises request parameters as well as methods for accessing data associated with a request. In one embodiment, the AVSMRequest class is subclassed according to request type.

Thus, a request queue may include a first reference to an AVSMOpenRequest object that corresponds to an A/V file open request received from a client; and a second reference to an AVSMPlayRequest object that corresponds to an A/V file playback request received from a client.

The AVSMReplyList class facilitates the implementation of a queue for replies directed from the AVSM 160 to external clients, as well as a queue for replies received from non-premises AVSSs 100. The AVSMReplyList class comprises a reference to an AVSMReply class, where the AVSMReply class comprises reply parameters as well as a set of methods for accessing data associated with a reply. In a manner analogous to that for the AVSMRequest class, the AVSMReply class may be subclassed in accordance with reply type.

An AVNMComm class provides a software infrastructure for implementing an A/V network client interface that includes parameters and methods for issuing requests to and receiving replies from the A/V network manager 34. The AVNMComm class includes a reference to an AVNMRequestList class and an AVNMReplyList class. The AVNMRequestList class facilitates the implementation of a queue for requests directed to the A/V network manager 34, and comprises a reference to anAVNMRequest class. The AVNMRequest class includes parameters corresponding to a request directed to the A/V network manager 34, as well as methods for accessing data associated with the request. The AVNMRequest class may be subclassed in accordance with the type of request directed to the A/V network 30. The AVNMReplyList class facilitates the implementation of a queue for replies received from the A/V network manager 34, and includes a reference to an AVNMReply class. The AVNMReply class comprises parameters associated with replies received from the A/V network manager 34, as well as methods for accessing any data associated therewith. The AVNMReply class may be subclassed in accordance with the types of a replies that may be received from the A/V network manager 34.

An AVSCComm class comprises a software infrastructure for implementing an AVSC client interface, and comprises parameters and methods for issuing requests to and receiving replies from AVSCs 120. The AVSCComm class includes a reference to an AVSCRequestList class, which facilitates implementation of a queue for requests directed to AVSCs 120. The AVSCRequestList class includes a reference to an AVSCRequest class, which includes parameters and methods for generating requests directed to an AVSC 120, and which may be subclassed in accordance with the types of requests that may be directed to AVSCs 120. The AVSCComm class also includes a reference to an AVSCReplyList class, which facilitates implementation of a queue for replies received from AVSCs 120. The AVSCReplyList class includes a reference to an AVSCReply class, which comprises parameters and methods associated with receipt of AVSC replies. The AVSCReply class may be subclassed in accordance with AVSC reply types.

A CellList class serves as a basis for a list that describes each premises AVSC 120. The CellList includes a reference to a Cell class, which provides a basis for describing an AVSC 120. The Cell class includes parameters that specify a network address, bandwidth capabilities, and a number of simultaneous requests that the AVSC 120 can process. The Cell class further includes references to a ListDisks class, a ListEncoders class, a ListDecoders class, and a ListTranscoders class.

The ListDisks class facilitates creation of a list that references a Disk class, which supports an AVSC storage device description. The Disk class contains parameters that include such information as device transfer rate, seek time, and available storage space. The Disk class additionally contains methods for accessing and modifying such parameters.

The ListEncoders class facilitates the implementation a list that references an Encoder class, which supports an AVSC encoder description. Encoder class parameters include such information as encoder type, bandwidth and I/O limitations, supported media formats, and input signal characteristics. The Encoder class additionally contains methods for accessing and modifying these parameters.

The ListDecoders class facilitates the implementation of a list that references a Decoder class, which supports an AVSC decoder description. Decoder class parameters include such information as decoder type, bandwidth and I/O limitations, supported media formats, and output signal characteristics. The Decoder class additionally contains methods for accessing and modifying the Decoder class parameters.

The ListTranscoders class facilitates the implementation of a list that references a Transcoder class, which supports an AVSC transcoder description. Transcoder class parameters include such information as transcoder type, bandwidth and I/O limitations, supported media formats, and input/output signal characteristics. The Transcoder class additionally contains methods for accessing and modifying the Transcoder class parameters.

A LoginList class provides an implementation basis for a list describing currently logged-in users. The LoginList class references a Login class that supports a user description via parameters that include a user ID, a privilege level, a login date and time stamp, and a set of channel handles currently allocated to the user ID, where each channel handle corresponds to AVSC resources allocated to processing user requests as described in detail below.

A SessionList class serves as basis for a list that describes currently active sessions. The SessionList class references a Session class, which provides a foundation for describing any particular session. The Session class is subclassed according to session type, where the subclasses include CopySession, PublishSession, ImportSession, ExportSession, AVSession, FileSession, and ListSession classes.

The CopySession class provides a framework for describing and tracking a file copy operation between two AVSCs 120. The CopySession class includes parameters such as IP or network addresses for the AVSCs 120 involved, a source and a destination filename, and channel handles corresponding to resources reserved on the AVSCs 120 for performing the file copy operation. In one embodiment, the CopySession class parameters also include a flag that specifies whether a copy operation or a transfer operation is required, where the transfer operation comprises file copying followed by deletion of the file from an origin AVSC 120. The CopySession class further includes methods for accessing its parameters.

The PublishSession class comprises parameters and methods that describe and monitor A/V and/or multimedia document publishing operations, through which AN and/or multimedia files may be copied to non-AVSS servers. PublishSession class parameters include IP or network addresses plus login data for a target or destination server, as well as a filename. PublishSession class methods includes data conversion and data transfer methods. The PublishSession class may be subclassed in accordance with particular media formats, where such subclasses include parameters such as destination server type and transcoding requirements. Exemplary subclasses include a NetShowPublish class and a RealMediaPublish class.

The ImportSession class comprises parameters and methods that describe and monitor the reading of A/V file data into a target AVSC 120 from a source client application (or source workstation 40 or other computer upon which the client application is executing), and includes parameters specifying the target AVSC's IP or network address and an AVSC channel handle. The ExportSession class provides a basis for writing A/V file data from the AVSC 120 into a target client application program (or target workstation 40 or other computer upon which the client application program is running), and includes parameters specifying the source AVSC's IP or network address and an AVSC channel handle.

The AVSession class comprises parameters and methods for initiating and managing A/V operations, which may include record, play, stream-in, stream-out, pause, resume, status, and stop operations.

The FileSession class comprises parameters and methods that facilitate writing data to and reading data from an AVSC 120. The ListSession class comprises parameters and methods that facilitate the generation of a list that specifies files and file attributes stored upon one or more AVSCs 120.

An AVMFileList class provides a basis for implementing the AVSM file parameter list within the AVSS database. The AVMFileList includes a reference to an AVMFile class, which includes parameters describing an A/V file, such as filename, file author or creator, a file title and description, file size, encoding type, and playback duration. The AVMFile class further includes a reference to an OwnerList class, which in turn references an Owner class. The Owner class provides a basis for describing an A/V file owner, and includes parameters such as user ID, a last access date and time, and an ownership expiration date. The OwnerList class includes methods for adding and deleting owners.

Those skilled in the art will understand that the AVSM class hierarchy 250 can be readily modified or extended to provide or accommodate access to additional types of AVSM functionality.

4.8.3 AVSC Class Relationship

Figure 17:
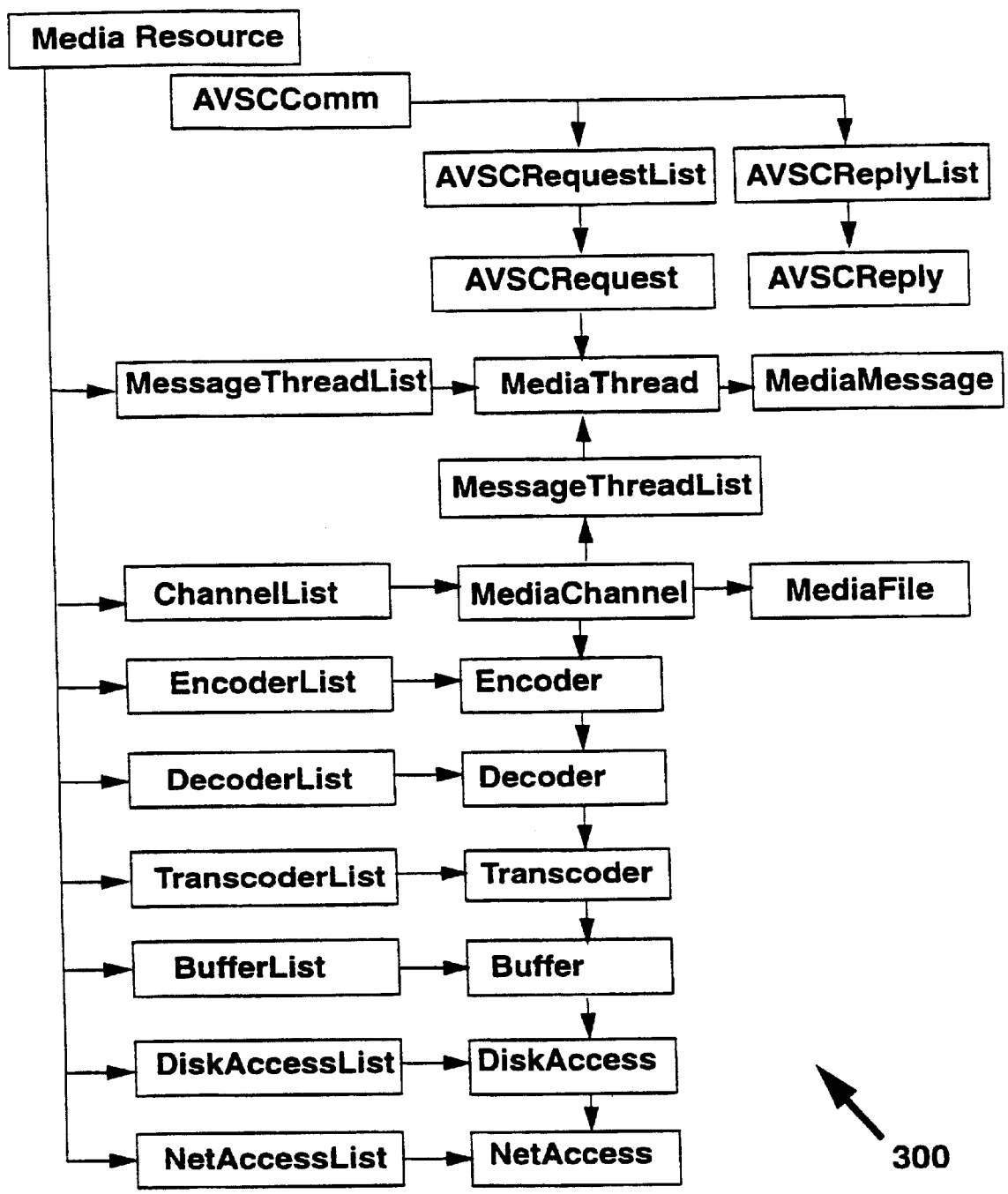
FIG. 17 is a representation of an AVSC class relationship in the present invention.

In a manner similar to that for the AVSM objects, the AVSC objects resident within the AVSC object memory 152 are hierarchically interrelated. FIG. 17 is a block diagram of an AVSC class relationship 300 organized in accordance with one embodiment of the present invention. In the-AVSC class relationship 300, a MediaResource class serves as a container class for implementing multithreaded AVSC functionality, and includes methods for thread management. An AVSCComm class provides a software infrastructure for implementing an AVSC communication port. The AVSCComm class provides a basis for implementing a server that receives requests and issues replies, as well as a client that issues requests and receives replies. Typically, an AVSC 120 will act as a server the majority of the time; however, the AVSC 120 may act as a client during AVSC-to-AVSC file copy or transfer operations. The AVSCComm class comprises parameters and methods for retrieving requests, building objects that are subclassed according to request type, and dispatching requests. In one embodiment, request dispatch occurs via the creation of a thread of execution corresponding to a request. The AVSCComm class includes references to an AVSCRequestList class and an AVSCReplyList class.

The AVSCRequestList class provides a basis for implementing a request queue, and references an AVSCRequest class. The AVSCRequest class facilitates request description, and May be subclassed in accordance with request type. The AVSCReplyList class provides a basis for implementing a reply queue, and references anAVSCReply class, which may be subclassed according to reply type.

A MessageThreadList class facilitates implementation of a list of threads that are currently active within the AVSC 120, and references a MediaThread class. The MediaThread class provides a framework for implementing a thread of execution that processes and fulfills a request. The MediaThread class includes thread parameters such as a thread ID and thread state information. The parameters may further include a filename, a password, and an IP or network address. The MediaThread class references a MediaMessage class. The MediaMessage class comprises parameters and methods that direct thread execution, and is subclassed according to thread type.

In the context of the AVSC class relationship 300, a "channel" comprises a group of resources allocated for performing a particular type of operation, such as an A/V file playback or record operation. A ChannelList class facilitates the implementation of a list that identifies or describes a current set of channels within the AVSC 120. The ChannelList class references a MediaChannel class, which comprises a container class for representing a channel. The MediaChannel class selectively includes references to an Encoder class, a Decoder class, a Transcoder class, a Buffer class, a DiskAccess class, and a NetAccess class. The Encoder class provides a basis for describing and controlling an encoder within the AVSC 120, and includes parameters specifying encoder type, supported quality levels, whether the encoder is busy or available, and methods that communicate with a set of software drivers that control encoder hardware. The Decoder class serves as a basis for describing and directing the operation of a decoder within the AVSC 120, and includes parameters specifying decoder type, supported quality levels, availability, and methods that communicate with software drivers that control decoder operation. Similarly, the Transcoder class serves as a basis for describing and directing the operation of a transcoder within the AVSC 120, and includes parameters specifying transcoder type, supported source and target coding formats, availability, and methods that communicate with software drivers that control transcoder operation. The Buffer class comprises parameters and methods that facilitate the implementation of memory and/or disk buffers, where such parameters may include buffer type, size, and fill level, and such methods may include program instructions for reading from and writing to the buffer. Finally, the NetAccess class serves as a basis for managing data exchange between the AVSC 120 and the AVSS internal network 110. Each of the Encoder, Decoder, Buffer, DiskAccess, and NetAccess classes may be subclassed in accordance with the particular nature of the resources to which they correspond.

The MediaChannel class also includes a reference to a MediaFile class, which serves as a wrapper for providing an interface to particular functionality and AVSC resources allocated for the channel. The MediaChannel additionally includes a reference to a MessageThreadList class, which facilitates implementation of a list that identifies threads currently active within the scope of the channel.

An EncoderList class within the AVSC class relationship 300 serves as a basis for implementing a list that identifies the encoders within the AVSC 120. The EncoderList class includes a reference to the aforementioned Encoder class. Similarly, a DecoderList class serves as a basis for implementing a list identifying the decoders within the AVSC 120. The DecoderList class includes a reference to the Decoder class. A TranscoderList class facilitates implementation of a list identifying the transcoders within the AVSC 120. The TranscoderList class also references the Transcoder class. A BufferList class facilitates implementation of a list that indicates buffer allocation within the AVSC 120, and includes a reference to the Buffer class. A DiskAccessList class facilitates implementation of a list specifying allocation of storage devices within the AVSC 120, and includes a reference to the Disk class. Finally, a NetAccessList class facilitates implementation of a list of allocated network access resources, and includes a reference to the NetAccess class.

As with the AVSM class relationship 250, those skilled in the art will understand that the AVSC class relationship 300 can be readily modified or extended to provide or accommodate access to additional types of AVSC functionality.

4.9 Client and Server Communication

In the present invention, an AVSSexternal or AVSSinternal client requiring a service accessed via an instance of a target object calls for the service by issuing a request. In response, the target object may perform one or more portions of the required service, act as a client and issue one or more requests to other objects, and/or issue one or more messages. Upon service completion, the target object issues a reply. Thus, from a hierarchical perspective, the issuance of a high-level request may give rise to the issuance of one or more lower-level requests and replies, followed by the issuance of a high-level reply. Each such request and reply in one embodiment of the present invention is exchanged in accordance with a conventional Internet Protocol (IP) suite, in a manner readily understood by those skilled in the art.

4.10 AVSM Request Categories

The requests understood by the AVSM 160 span several categories, which in one embodiment include the following:
4.10.1 External Client to AVSS Requests Requests that may be used by AVSS-external clients requiring access to AVSS services include the following:

a) Login—initiates a login session with the AVSS 100 and provides user information and associated A/V network service information to the AVSM 160, where the user information includes a user ID and a password.

b) Logout—terminates user interaction with the AVSS 100.

c) GetFileLinits—returns current administered and physical limits on the length of an A/V file to be encoded.

d) AcquireAVChannel—establishes a session by reserving particular AVSC resources for performing specified types of operations, such as encoding, decoding, transcoding, and/or streaming. Specifies a source AVSC resource and at least one destination AVSC resource to flexibly support multiple modes of operation, which include the following:

1) Playback mode—facilitates playback of an A/V file residing upon an AVSC storage device to a user workstation 40, where such playback can occur at a specified speed or playback rate. Source resource=disk, destination resource=decoder.

2) Preview mode—facilitates recording setup and record preview operations involving a user workstation 40 (i.e., A/V signal "loop through" without storage of A/V signals to disk). Source resource=encoder, destination resource=decoder.

3) Record mode—facilitates A/V signal recording from a user workstation 40 to generate an A/V file upon an AVSC storage device. Source resource=encoder, destination resource=disk.

4) Playback-while-recording mode—facilitates A/V signal recording from a user workstation 40 with simultaneous A/V signal playback to the user workstation 40. Source resource=encoder, destination resources disk and decoder.
5) Broadcast-to-network mode—facilitates broadcast of A/V signals from a user workstation 40 to a network (i.e., the AVSS internal network 110 or the data network 20). Source resource=encoder, destination resource= network.
6) Broadcast-and-playbackinode—facilitates A/V signal broadcast from a user workstation 40 to a network, with simultaneous A/V signal playback to the user workstation 40. Source resource=encoder, destination resources=network and decoder.
7) Broadcast-while-recording mode—facilitates broadcast to a network while performing A/V signal recording from a user workstation 40 to an AVSC storage device. Source resource=encoder, destination resources=disk and network.
8) Broadcast-with-record-and-playbackmode—facilitates broadcast to a network while recording A/V signals from a user workstation 40 to AVSC storage device and simultaneously playing A/V signals back to the user workstation 40. Source resource=encoder, destination resources=network, disk, and decoder.
9) Stream-in-to-disk mode—facilitates receiving a data stream from a network to an AVSC storage device. Source resource=network, destination resource=disk.
10) Stream-in-to-playback mode—facilitates data streaming from a network to a user workstation 40 via AVSC decoder. Source resource=network, destination resource=decoder or transcoder.
11) Stream-in-to-playback-with-save mode—facilitates data streaming from a network to a user workstation 40, and saves data being streamed in to an AVSC storage device. Source resource=network, destination resource=decoder or transcoder and disk.
12) Stream-out-to-network mode—facilitates data streaming from an AVSC storage device to a network at a specified streaming rate. Source resource=disk, destination resource=network.
13) Stream-out-to-network-andplayback-mode facilitates data streaming from an AVSC storage device to a network at a specified streaming rate with simultaneous A/V signal playback to the user workstation 40. Source resource=disk, destination resource=network and decoder Those skilled in the art will understand that a buffer resource upon an AVSC may be included as an intermediate destination resource for several types of operational modes, for example, those involving streaming. Those skilled in the art will additionally understand that many other modes of operation exist, for which a session may be established and resources may be reserved in a manner analogous to that described above. When appropriate (i.e., depending upon the specified mode of operation), the AcquireAVChannel request also specifies parameters such as a filename and password; A/V file encoding type; and/or a minimum frame count that indicates an amount of storage space that must be available upon a storage device. After successful resource reservation, a reply corresponding to AcquireAVChannel (i.e., an AcquireAVChannelReply) returns a session handle to a requesting client.

e) AcquireDataChanmel—establishes a session and reserves AVSC resources for particular types of file transfer operations, including copy-to, copy-from, file query, and file listing operations. This request includes parameters specifying a mode such as read-only or read-write, as well as parameters such as a filename, password, and a minimum amount of storage space that must be present upon an AVSC storage device. After AVSC resource reservation, a reply corresponding to AcquireDataChannel returns a session handle.

f) AcquireAVFileImportChannel—establishes a session for importing an A/V file into the AVSS 100 and returns a session handle and the network or IP address of the AVSC 120 that will initially receive the A/V file.

g) AcquireAVFileExportChannel—establishes a session for exporting an A/V file from the AVSS 100 to the client and returns the network or IP address of the AVSC 120 upon which the file is stored, plus a session handle.

h) AcquirePublishChannel—establishes a session for publishing an A/V file from an AVSC 120 to one or more non-AVSS target servers. Parameters specified include a filename and password, as well as target server type. A reply associated with this request returns a session handle.

i) PublishFile—publishes a file to a non-AVSS target server. Specified parameters include a filename and password, a target server network or IP address, and target server login and password information.

j) RequestPublishLocations—given a specified filename and password, returns known non-AVSS target server identification and network or IP address to which a file has previously been published, as indicated by the AVSS database.

k) DeletePublishedFile—given a specified filename, file password, and non-AVSS target server network or IP address or target server type, deletes file's publication references for target server or target server types from the AVSS database. If target server login, login password, and any delete authorization information is also specified, DeletePublishedFile additionally attempts to delete the published file from the target server itself.

l) ReleaseAVChannel—releases the resource or resources obtained through the AcquireAVChannel, AcquireAVFileImportChannel, AcquireAVFileExportChannel, and AcquirePublishChannel requests, and deletes a corresponding session handle.

m) AVSMStatusRequest—returns status information to a client during file copy, import, export, and publishing operations when a valid session handle is specified, where such status information may include a number of bytes transferred or an estimated amount of time remaining until operation completion.

n) GetAVFileAttributes—returns attributes for an A/V file, including application program-defined attributes. Certain restrictions may exist with regard to which attributes may be returned. For example, only a super-user and the file author may be allowed to view a complete owner list. A user may be allowed to view file attributes if the user is specified as an owner for the file, and any attributes returned are specific to that user.

Super-users and the file authors can access the following operations in one embodiment:

o) SetAVFileAttributes—sets the mutable attributes of an A/V file, including application program-defined attributes.

p) AddOwner—causes the AVSM 160 to add a specified user ID to the access privilege list corresponding to an A/V file.

q) RemoveOwner—causes the AVSM 160 to remove a specified user ID from the access privilege list corresponding to an A/V file.

r) RequestAVFile—requests an A/V file from a non-premises source AVSS 100. If AV file is present within the domain of the AVSM 160 that receives this request, a file transfer procedure retrieves the A/V file from the non-premises source AVSS 100.

4.10.2 Client to AVSC via AVSM Requests

Many of the requests the AVSM 160 issues to an AVSC 120 are variants of those sent to the AVSM 160 by client application programs. Requests that the AVSM 160 may receive from external clients and forward or pass to an AVSC 120 for servicing include the following:

a) Open—depending upon a mode specifier that indicates whether an A/V file is to be operated upon relative to A/V resource processes (MEDIA mode) or file transfer processes (DATA mode), opens or creates an A/V file and prepares it for encoding, decoding, and/or transcoding, streaming in, or streaming out (MEDIA mode), or data transfer (DATA mode). Upon completion of this request, a reply is issued that includes a session handle.

b) Close—closes a file associated with a specified session handle.

c) Read—for a file opened in DATA mode, reads a specified number of bytes from the file and transfers them to the requesting client.

d) Write—for a file opened in DATA mode, transfers and writes a specified number of bytes to the file.

e) Seek—for a file opened in DATA mode, positions the file at a specified byte. For a file opened in media mode, positions the file at a specified frame.

f) Play—causes the AVSC 120 to signal a decoder to begin processing a file and feeding the output to the A/V network 30. Parameters include playback speed or rate as well as direction and processing length indicators that allow this request to implement fast-forward, rewind, or similar operations.

g) Record—causes the AVSC 120 to signal an encoder to begin saving A/V input to the file. A record length limitation may be specified.

h) StreamIn—causes the AVSC 120 to stream data from the AVSS internal network 110 into a buffer, data storage, and/or decoding resource, in accordance with resources reserved for a particular channel.

i) StreamOut—causes the AVSC 120 to stream data from a buffer, data storage, and/or encoding resource to the AVSS internal network 110 at a specified data rate, in accordance with resources reserved for a particular channel.

j) Stop—causes suspension of a current encoding, decoding, transcoding, or streaming process.

k) Status—returns current file mode and frame number if in MEDIA mode or byte position if in DATA mode.

4.10.3 AVSM to AVSC Requests

Requests the AVSM 160 issues to a target AVSC 120 in relation to A/V file access and file transfer include the following:

a) AcquireChannel—requests the AVSC 120 to create a channel reserving a specified encoder, decoder, and/or transcoder for use by an AVSS client. This request may additionally be used to reserve file transfer bandwidth for impending file transfer or streaming operations. Request completion results in the return of a channel handle that may be used to identify the allocated resources in subsequent operations.

b) ReleaseChannel—indicates to the AVSC 120 that the resources associated with a specified handle are no longer required and shall be released.

c) SetMediaSetup—sets or updates configuration information for the target AVSC 120. This request is typically employed in the event that the AVSC's hardware configuration has been modified.

d) GetMediaSetup—returns configuration and usage information for the target AVSC 120.

e) GetDriveInfo—returns information about a specified storage device.

f) GetMediaStatus—returns current AVSC utilization and state information.

g) Rename—renames a specified file.

h) Delete—deletes a specified file.

i) CopyTo—initiates the transfer of a specified file to a specified destination AVSC 120.

j) CopyFrom—initiates the transfer of a specified file from a specified source AVSC 120.

4.10.4 AVSC to AVSM Requests

An AYSC 120 may send informational requests to its managing AVSM 160 to indicate state changes associated with file transfer operations, A/V operation completion, and/or general hardware status. Such informational requests include the following:

a) PlayEnd—indicates that a current play operation has completed, due to end-of-file or a play-length being reached.

b) RecordEnd—indicates that a current record operation has completed.

c) HardwareError—indicates a hardware failure associated with a specified encoder, decoder, transcoder, or storage device.

4.10.5 AVSM to AVSM Requests

In addition to receiving external requests from client application programs, a premises AVSM 160 may receive requests from a non-premises AVSM 160. Typically, such requests correspond to file transfer operations, and include the following:

a) RequestAVFileSource—issued by the premises AVSM 160 to the non-premises AVSM 160 upon receipt of a "RequestAVFile" from a client. The non-premises AVSM 160 returns i) the network or IP address of an AVSC 120 that can serve as a file transfer source; ii) attributes for a specified A/V file: and iii) a channel handle.

b) NotifyAVFileSource—sent upon successful completion of an A/V file transfer between a premises and a non-premises AVSC 120, and includes the user ID and source channel handle, such that the non-premises AVSM 160 can release source AVSC resources that had been reserved for the file transfer.

4.10.6 AVSM Administration Requests

Several requests, some of which may be accessible only to a super-user, may be used to perform AVSS configuration and administrative operations, and include the following:

a) SetPrivileged—establishes a super-user session, through which the super-user can access many administrative functions. This request requires a password.

b) GetAVSMLogInfo—returns information stored in the AVSM event log.

c) ClearAVSMLogInfo—clears the AVSM event log.

d) SetAVSMLogLevel—specifies types of requests and events to log, as well as a level of detail for logging, and a maximum AVSM event log size.

e) ListAVSCs—returns a list of AVSCs 120 managed by the AVSM 160.

f) GetAVSCInfo—returns configuration and utilization information for a particular AVSC 120.

g) GetAVSCLogInfo—returns information stored in the AVSC event log, message queue.

h) ClearAVSCLogInfo—clears a specified AVSC's event log.

i) SetAVSCLogLevel—indicates to a specified AVSC 120 types of requests and events to log, as well as a level of detail for logging, and a maximum AVSC event log size.

j) SetAVNMInfo—updates A/V network manager information maintained within the AVSM 160.

k) AddAVSC—adds configuration information corresponding to a newly-added premises AVSC 120 to the AVSS database. Configuration information for the new AVSC 120 is obtained by querying the AVSC 120.

l) RemoveAVSC—removes information corresponding to an AVSC 120 no longer in the premises group from the AVSS database.

m) ListAVSSs—returns a network or IP address for each non-premises AVSS 100 about which the AVSM 160 is aware.

n) GetAVSSInfo—returns routing and/or connection setup information for a particular non-premises AVSS 100 known to the AVSM 160.

o) SetAVSSInfo—sets routing and/or connection setup information for a specified non-premises AVSS 100. In one embodiment, this information pertains to the host AVSM 160 for the specified AVSS 100.

p) AddAVSS—adds a specified non-premises AVSS 100 to those known to the AVSM 160. In one embodiment, routing and connection information for the newly-added AVSS 100 is specified through SetAVSSInfo.

q) RemoveAVSS—removes a non-premises AVSS 100 from those know to the AVSM 160.

r) SetAVFileLimits—sets a maximum A/V file length allowed during encoding operations.

Those skilled in the art will recognize that an AVSS could support additional or fewer requests in an alternate embodiment.

4.11 AVSC Request Categories

The AVSC 120 provides support for a variety of requests, including those in the following categories:

4.11.1 Allocation and Authorization Requests a) AuthorizationResource—ensures that a client requesting services provided by the AVSC 120 is either an AVSM 160 or a client providing a valid channel handle.

b) AllocateChannel—creates a channel to which specified resources are allocated, and returns a channel handle.

c) ChangeChannel—for a channel identified by a channel handle, adds or deletes specified resources to or from channel, respectively.

d) ReleaseChannel—for a channel identified by a channel handle, frees channel resources (i.e., channel resources are returned to "not busy" or "not allocated" status), removes channel from channel list, and releases channel handle.

4.11.2 File Management Requests a) CopyFromChannel—establishes a copy session with a source AVSC 120 and performs file copy operations.

b) CopyToChannel—establishes a copy session with a target AVSC 120 and performs file copy operations.

c) RenameChannel—renames a specified file.

d) DeleteChannel—deletes a specified file.

e) FindFilesFirstChannel—performs file directory operations, returning first k files.

f) FindFilesNextChannel—performs file directory operations, returning next n files.

g) GetFileInfoChannel—opens a specified file and returns information about the media content of the file; this request may be employed, for example, to validate file import operations or for consistency checking.

h) PublishDigitalFileChannel—performs format conversion, login operations, and file copy operations to publish a specified file to another server in a specified format.

4.11.3 Media Requests a) OpenChannel—opens a specified A/V file on a specified channel.

b) ReadChannel—reads from an A/V file on a specified channel.

c) WriteChannel—writes to an A/V file on a specified channel.

d) PlayChannel—plays an A/V file on a specified channel at a specified frame rate.

e) StreamInChannel—streams an A/V file into a specified channel.

f) StreamOutChannel—streams an A/V file from a specified channel at a specified data rate.

g) RecordChannel—records an A/V file on a specified channel.

h) PauseChannel—pauses A/V file operations on a specified channel.

i) StopChannel—stops A/V file operations on a specified channel.

j) ResumeChannel—resumes A/V file operations on a specified channel.

k) SeekChannel—moves to a given position within an A/V file on a specified channel.

l) StatusChannel—returns information about current status of operations on a specified A/V file, including current frame or position within the file, on a specified channel.

m) CloseChannel—closes an A/V file on a specified channel.

4.11.4 Administrative Requests a) InitializeResource—resets hardware, rebuilds lists, and reallocates objects.

b) GetMediaSetupResource—returns information about encoders, decoders, transcoders, and storage devices within the AVSC 120.

c) SetMediaSetupResource—sets information about encoders, decoders, transcoders, and/or storage devices within the AVSC 120.

d) GetMediaStatusResource—returns current status of AVSC resources, including a number of channels open; a number of encoders, decoders, transcoders in use; storage device usage and available storage space; and buffer and internal network usage.

e) HangupResource—performs failure recovery or system violation recovery operations.

f) ShutdownResource—performs shutdown operations, after which AVSC 120 can be reinitialized.

4.12 Request Sequence Examples

The description that follows details the flow of requests and replies generated in response to exemplary AVSS-external requests corresponding to several operational categories, which are defined as follows:

4.12.1 Session Establishment and Resource Reservation

Figure 18:
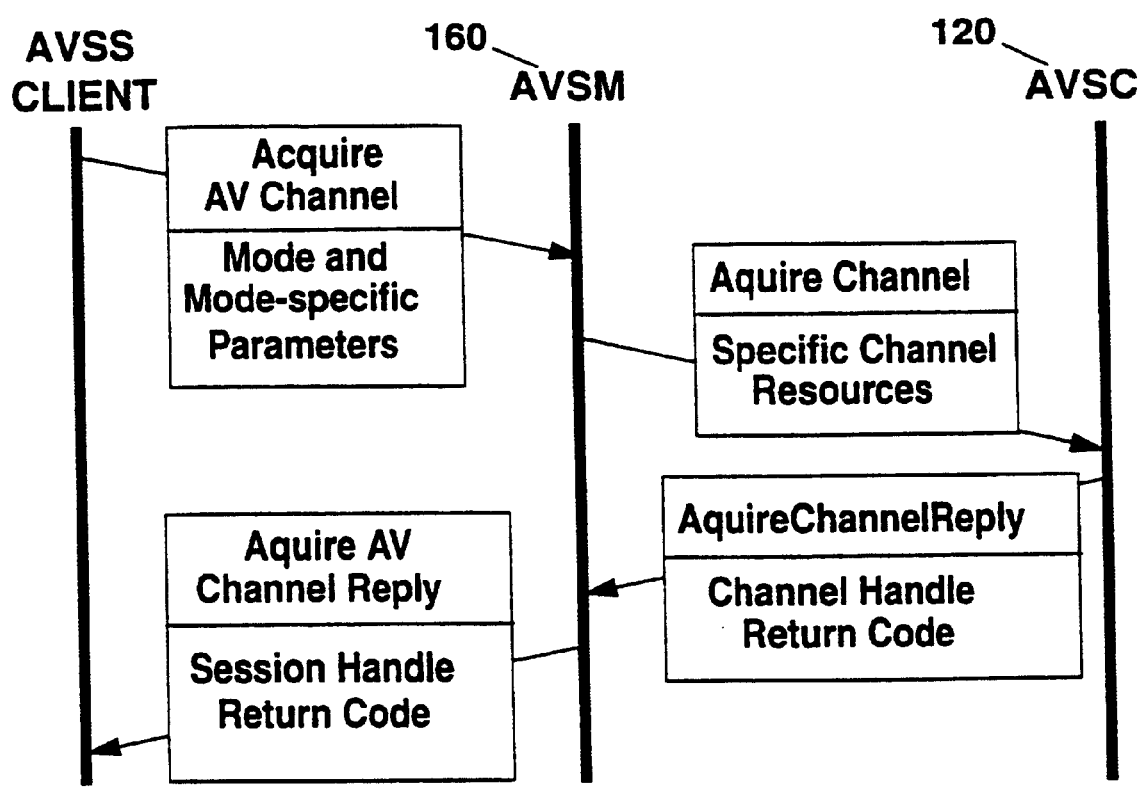
FIG. 18 is an exemplary request sequence diagram corresponding to AVSC channel acquisition.

FIG. 18 is an exemplary request sequence diagram for the AcquireAVChannel request described above. In FIG. 18, and AVSS client (i.e., a client application program) issues an AcquireAVChannel request specifying a mode and mode-specific parameters to its premises AVSM 160. The AVSM 160 determines a set of AVSC resources required to fulfill the channel acquisition request, and identifies an appropriate AVSC 120. The AVSM 160 then issues an AcquireChannel request to the AVSC 120, specifying a set of resources to be reserved for a channel. Upon reserving the resources, the AVSC 120 issues an AcquireChannelReply to the AVSM 160, which includes a channel handle and a return code that indicates whether resource reservation was successful. The AVSM 160 subsequently issues an AcquireAVChannelReply that includes a session handle to the client. The client may subsequently use the session handle to request particular operations in accordance with the types of AVSC resources associated with the channel handle. For any given client, the AVSM 160 may map one or multiple session handles to a single channel and handle. The AVSM 160 is responsible for mapping session handles to the appropriate channel handle during subsequent operations. Those skilled in the art will understand that analogous operations occur for each particular type of channel acquisition request described above.

4.12.2 A/V File Management

Since the AVSM 160 is responsible for maintaining the AVSS database, it must perform some processing in response to client requests affecting A/V files. Since the A/V files are physically stored upon the AVSCs 120, the AVSM 160 passes or forwards requests to the appropriate AVSC(s) 120 following such processing. In general, for AVSS clients requiring access to an A/V file, the AVSM 160 examines the AVSS database to determine whether a specified file exists, and upon whichAVSCs 120 the file resides. When an A/V file is created, the AVSM 160 adds a file parameter list to the AVSS database, and selects an available AVSC 120 to support an encoding session. The AVSM 160 issues a Record request to the selected AVSC 120, updates its internal data, and upon completion of the recording operation issues a RecordReply to the client.

Figure 19:
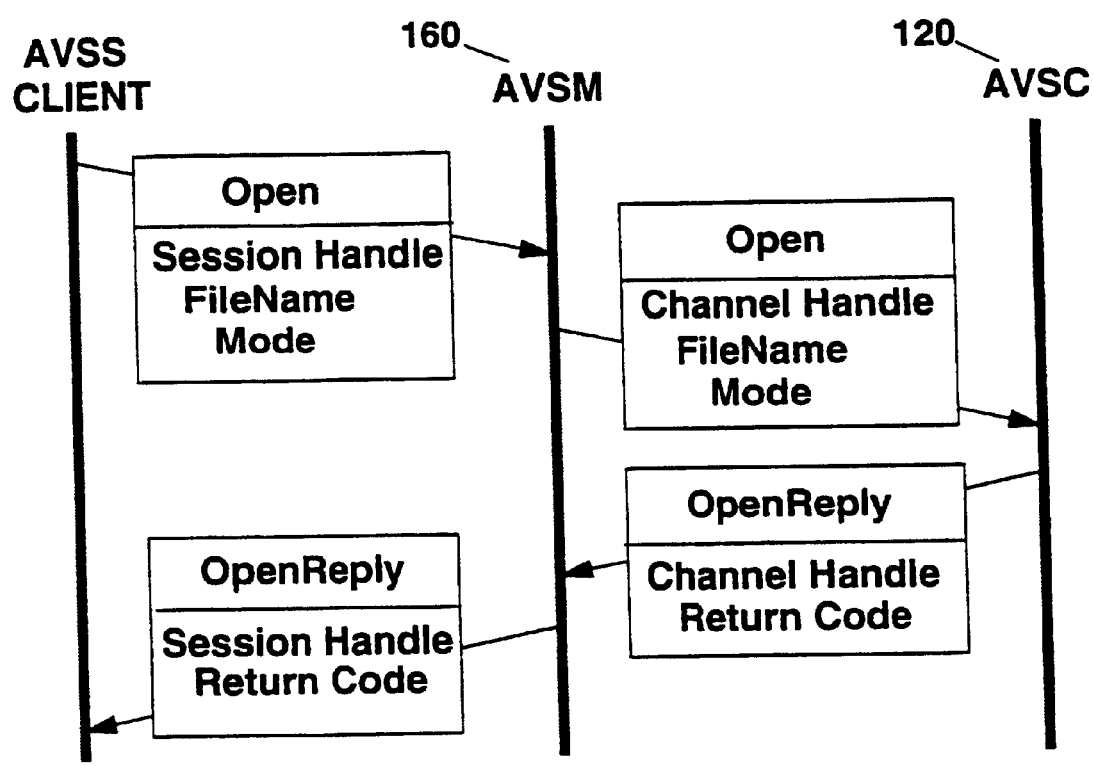
FIG. 19 is an exemplary request sequence diagram for an "Open" request.

FIG. 19 is an exemplary request sequence diagram for the "Open" request described above. In FIG. 19, an AVSS client (i.e., a client application program) issues an Open request specifying a session handle, a filename, and a mode (i.e., MEDIA, DATA read/write or read only) to its premises AVSM 160. The AVSM 160 subsequently maps the session handle to the appropriate AVSC channel handle, and forwards the open request to the AVSC 120 corresponding to the channel handle. After opening the A/V file, the AVSC 120 issues an OpenReply to the AVSM 160, which includes a channel handle and a return code that indicates whether the open operation was successful. The AVSC 160 in turn replies to the AVSS client with a session handle and a return code.

Figure 20:
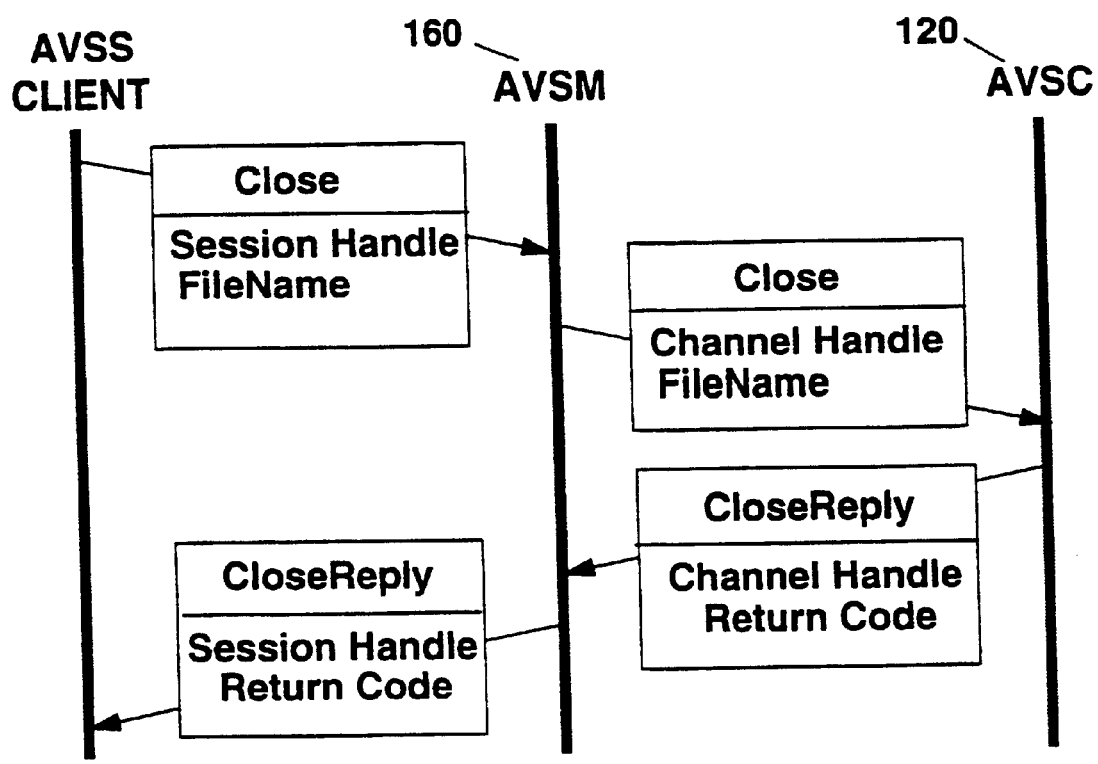
FIG. 20 is an exemplary request sequence diagram for a "Close" request.

FIG. 20 is an exemplary request sequence diagram for the above-mentioned "Close" request. In FIG. 20, an AVSS client issues a Close request that specifies a session handle and a filename to the AVSM 160. The AVSM 160 maps the session handle to the appropriate channel handle, and issues or forwards the close request specifying the channel handle and the filename to the appropriate AVSC 120. Upon completing the close operation, the AVSC 120 issues a close reply to the AVSM 160, which includes the channel handle and a return code. The AVSM 160 maps the channel handle to the appropriate session handle, and forwards the close reply to the AVSS client.

Figure 21:
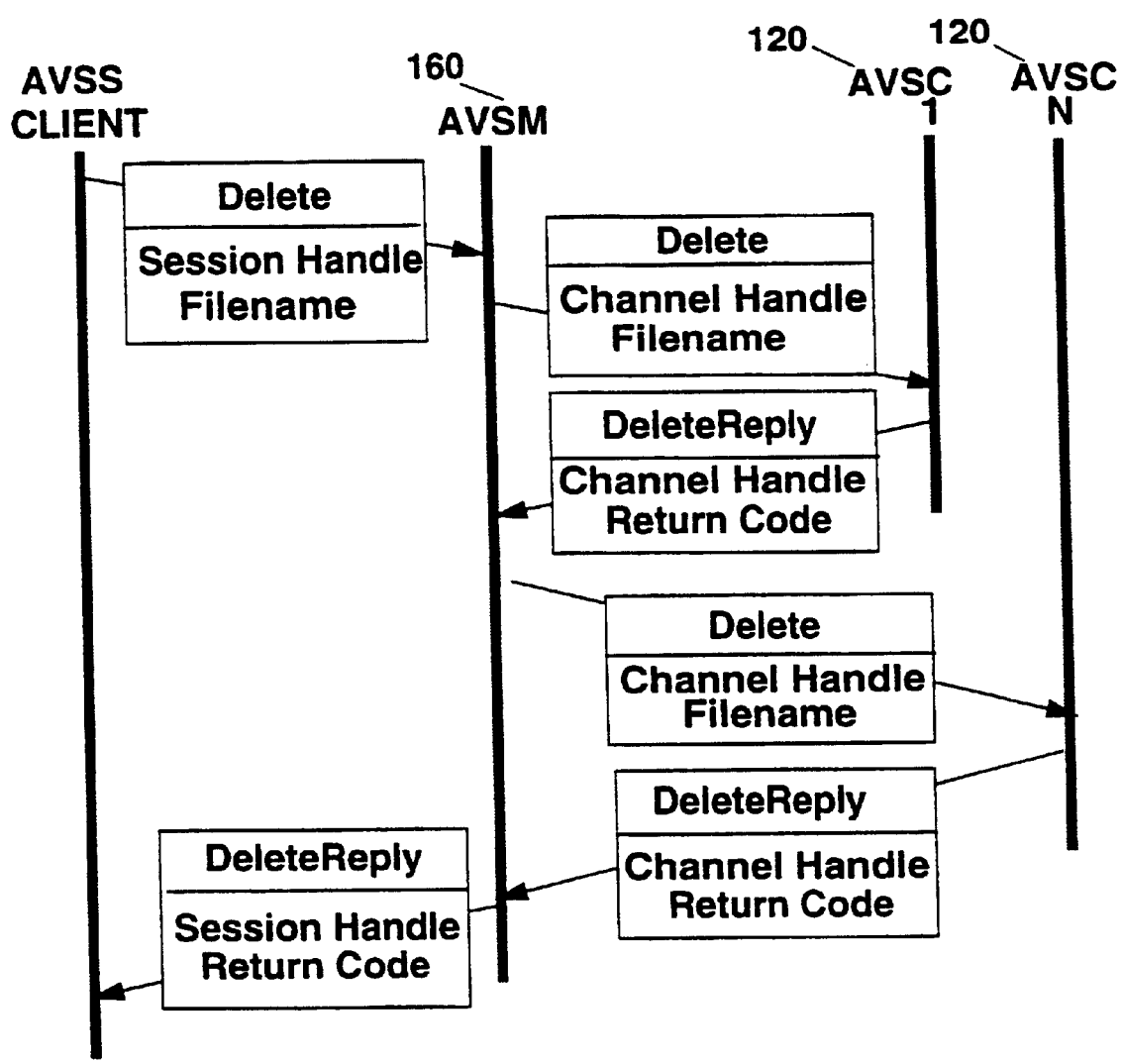
FIG. 21 is an exemplary request sequence diagram for a "Delete" request.

FIG. 21 is an exemplary request sequence diagram for an A/V file "Delete" request. In response to receipt of a delete request that specifies a session handle and a fully-qualified filename from an AVSS client, the AVSM 160 determines upon which AVSCs 120 copies of the A/V file reside. The AVSM 160 then maps the session handle to a first channel handle, and forwards the delete request to a first AVSC 120 upon which such a copy resides. Once the A/V file copy is deleted, the first AVSC 120 issues a DeleteReply to the AVSM 160. The AVSM 160 then maps the session handle to a second channel handle, and forwards the AVSS client's delete request to a second AVSC 120 upon which a copy of the A/V file resides. The second AVSC 120 performs the required delete operation, and issues a DeleteReply to the AVSM 160. The AVSM 160 continues this process by mapping the session handle to a next channel handle, and forwarding the AVSS client's delete request to a next AVSC 120 storing a copy of the A/V file after receiving a DeleteReply from an AVSC 120 that had just completed the delete operation, and so on, until copies of the A/V file no longer reside upon the AVSCs 120. After the relevant AVSCs 120 have deleted the appropriate A/V file copies, the AVSM 160 updates the AVSS database 176 to reflect the deletion, and issues a DeleteReply to the AVSS client.

4.12.3 Encoding, Decoding, or Transcoding Control

Figure 22:
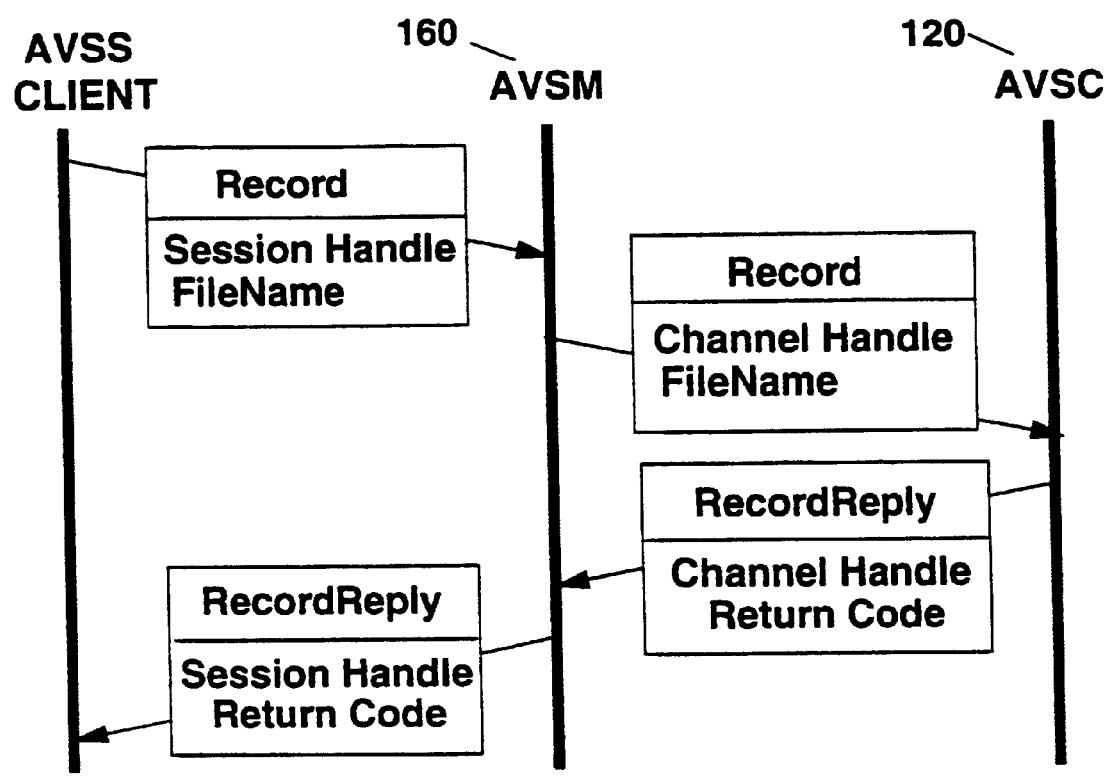
FIG. 22 is an exemplary request sequence diagram for a "Record" request.

FIG. 22 is an exemplary request sequence diagram for a "Record" request. Upon receiving a Record request from an AVSS client specifying a session handle and possibly a filename depending upon operational mode, the AVSM 160 maps the session handle to the appropriate channel handle. The AVSM 160 forwards the mapped record request to the AVSC 120, which issues commands to the encoder associated with the channel handle. When the recording session is complete, the AVSC 120 issues a RecordReply that specifies the channel handle and a return code to the AVSM 160. The AVSM 160 then maps the channel handle to a session handle, and forwards the RecordReply to the AVSS client, where the RecordReply includes the session handle and a return code.

4.12.4 File Transfer

Figure 23:
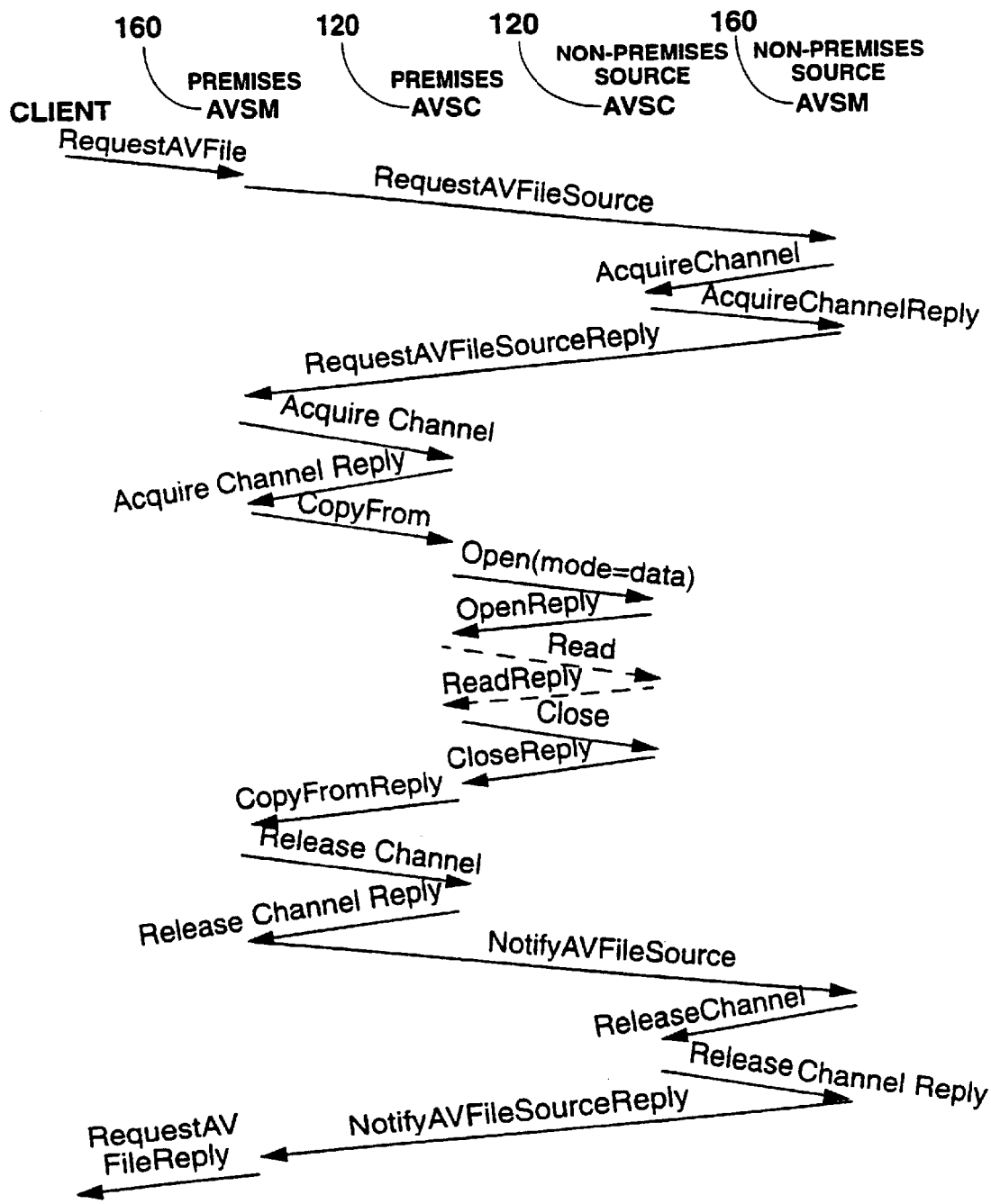
FIG. 23 is a exemplary request sequence diagram corresponding to a request for a file transfer from a non-premises AVSS.

Externally-generated file transfer requests may result in the generation of multiple intra-AVSS requests and replies, depending upon the location of the requested file. FIG. 23 is an exemplary request sequence diagram corresponding to a request for a file transfer from a non-premises AVSS 100. To take advantage of the file transfer capabilities of the AVSS 100, a client must have a source AVSM name or address as well as a filename. The client supplies these parameters to its premises AVSS 100 via a RequestAVFile request.

The premises AVSM 160 determines whether the required file is locally available, that is, whether it is stored upon one of the premises AVSCs 120. If not, the premises AVSM 160 issues a RequestAVFileSource request to the non-premises AVSS 100. Via an AcquireChannel request, the non-premises AVSM 160 allocates resources in an AVSC 120 that can serve as a source for the file transfer. After the non-premises AVSC 120 resources have been allocated, it replies to the non-premises AVSM 160 with an AcquireChannelReply. The non-premises AVSM 160 then replies to the premises AVSM 160 by issuing a RequestAVFileSourceReply that specifies the location or network or IP address and channel handle of the allocated non-premises AVSC 120.

The premises AVSM 160 issues an AcquireChannel request to allocate a channel and corresponding resources on a premises AVSC 120 for performing the file transfer operation, and in response receives an AcquireChannelReply that specifies a channel handle. The premises AVSM 160 then issues a CopyFrom request to the premises AVSC 120, where the CopyFrom request includes the source AVSC's location or address and channel handle. The premises AVSC 120 initiates the file transfer by issuing an Open request to the source AVSC 120, where the Open request specifies that the file is to be opened in DATA mode. Upon receiving an OpenReply from the source AVSC 120, the premises AVSC 120 issues a series of Read requests to the source AVSC 120, which result in the file transfer. For each such Read request, the source AVSC 120 performs a read operation and issues a ReadReply to the premises AVSC 120.

After the file has been transferred, the premises AVSC 120 issues a Close request to the source AVSC 120. The source AVSC 120 closes the file, and issues a CloseReply to the premises AVSC 120, which in turn issues a CopyFromReply to the premises AVSM 160. The premises AVSM 160 next issues a ReleaseChannel request to the premises AVSC 120 to release resources associated with the copy operation, after which the AVSC 120 issues a ReleaseChannelReply. The premises AVSM 160 subsequently updates the AVSS database 176 to reflect the presence of the new file. The premises AVSM 160 next sends a NotifyAVFileSource message to the non-premises or source AVSM 160 to indicate to the non-premises AVSM 160 that the transfer is complete. The non-premises AVSM 160 issues a ReleaseChannel request to the source AVSC 120, which releases resources reserved for the copy operation and generates a ReleaseChannelReply directed to the non-premises AVSM 160. The non-premises AVSM 160 then issues a NofityAVFileSourceReply to the premises AVSM 160. Finally, the premises AVSM 160 sends a RequestAVFileReply to the AVSS client that required the file transfer operation.

4.12.5 File Replication

Once a new A/V file resides upon an AVSC 120, the AVSM 160 may issue a series of requests to perform A/V file replication operations. In one embodiment, A/V file replication is required in the event that more than one owner is specified in the file's access privilege list. File replication would thus be performed, for example, after or as part of processing an "AddOwner" request received from a client application program. In another embodiment, A/V file replication is performed even if an A/V file has only one owner, such that a given A/V file resides upon at least two premises AVSCs 120. This approach would enhance system reliability or fault tolerance. In such an embodiment, file replication would occur, for example, following a file transfer operation as described above with reference to FIG. 23.

Figure 24:
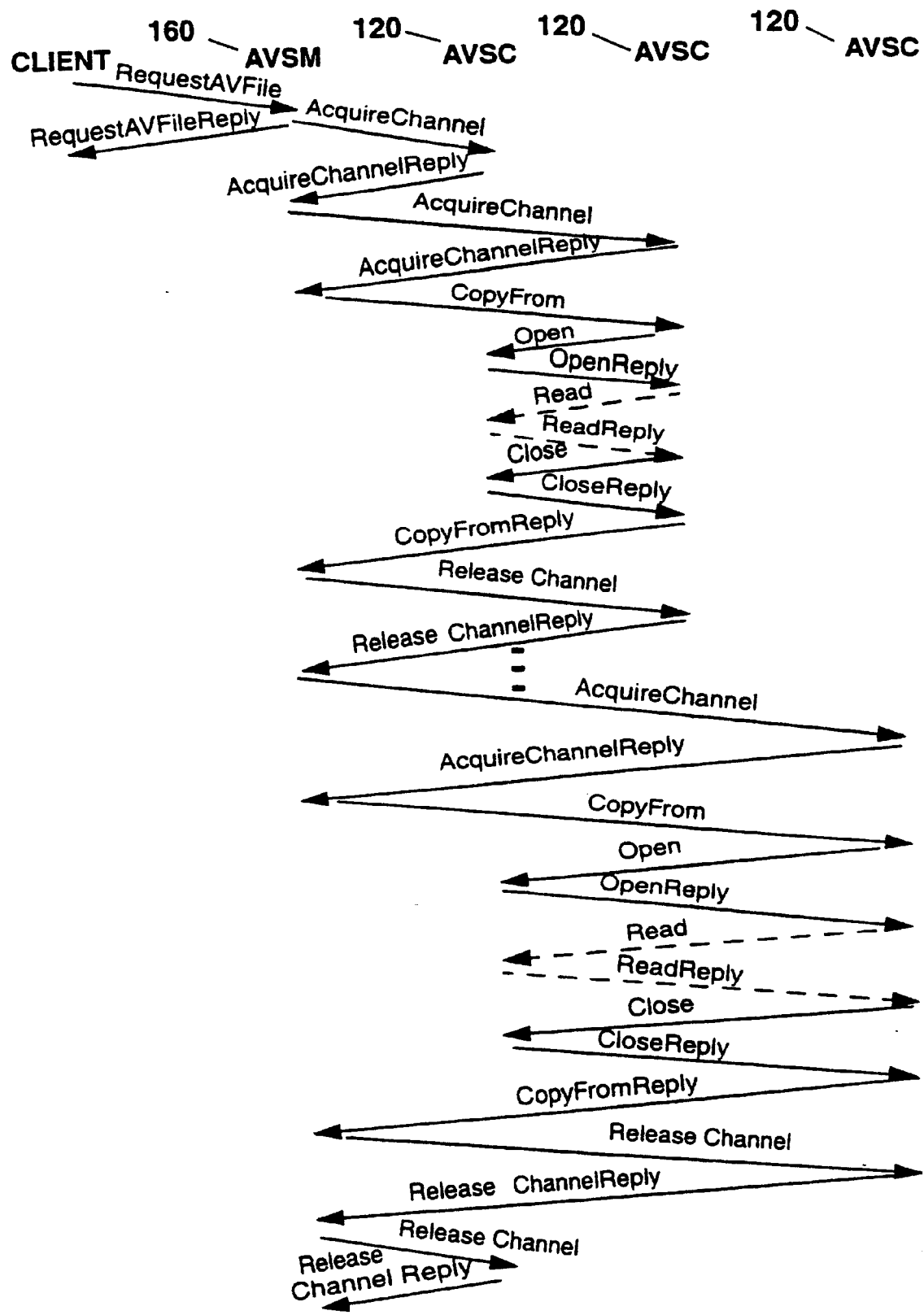
FIG. 24 is an exemplary request sequence diagram corresponding to file replication operations.

FIG. 24 is an exemplary request sequence diagram corresponding to file replication operations. The AVSM 160 could perform file replication operations, for example, following issuance of a RequestAVFile reply to an AVSS client indicating completion of file transfer operations as previously described. To initiate file replication operations, the AVSM 160 issues a first AcquireChannel request to the AVSC 120 upon which the file resides, that is, the source AVSC 120. After receiving an AcquireChannelReply, the AVSM 160 issues a second AcquireChannel request to a destination AVSC 120 to which the file will be copied. Once the AVSM 160 receives an AcquireChannelReply from the destination AVSC 120, it issues a CopyFrom request to this AVSC 120. The destination AVSC 120 then sends the source AVSC 120 an Open request. Upon receiving an OpenReply, the destination AVSC 120 send the source AVSC 120 a series of Read requests, which result in transfer of the file from the source to the destination AVSC 120. After the source AVSC 120 has responded to a given Read request, it issues a ReadReply to the destination AVSC 120. Upon responding to a last Read request and issuing a last ReadReply, the destination AVSC 120 sends a Close request to the source AVSC 120, which closes the file and issues a CloseReply to the destination AVSC 120. The destination AVSC 120 subsequently issues a CopyFromReply to the AVSM 160. The AVSM 160 then issues a ReleaseChannel request to the destination AVSC 120, and in turn receives a ReleaseChannelReply. According to the particular file replication strategy employed, the AVSM 160 may repeat the destination AVSC 120 selection, AcquireChannel, CopyFrom, and ReleaseChannel procedures described above for one or more other destination AVSCs 120. The AVSM 160 could also select either AVSC 120 upon which a copy of the file currently resides as the source AVSC 120. Once any given AVSC's role as a file source is completed, the AVSM 160 issues a ReleaseChannel request to that source AVSC 120, which in turn releases resources reserved for performing the copying operations and generates a ReleaseChannelReply directed to the AVSM 160. Those skilled in the art will understand that the file replication operations could be performed via CopyTo requests rather than CopyFrom requests.

4.12.6 AVSS Administration

Figure 25:
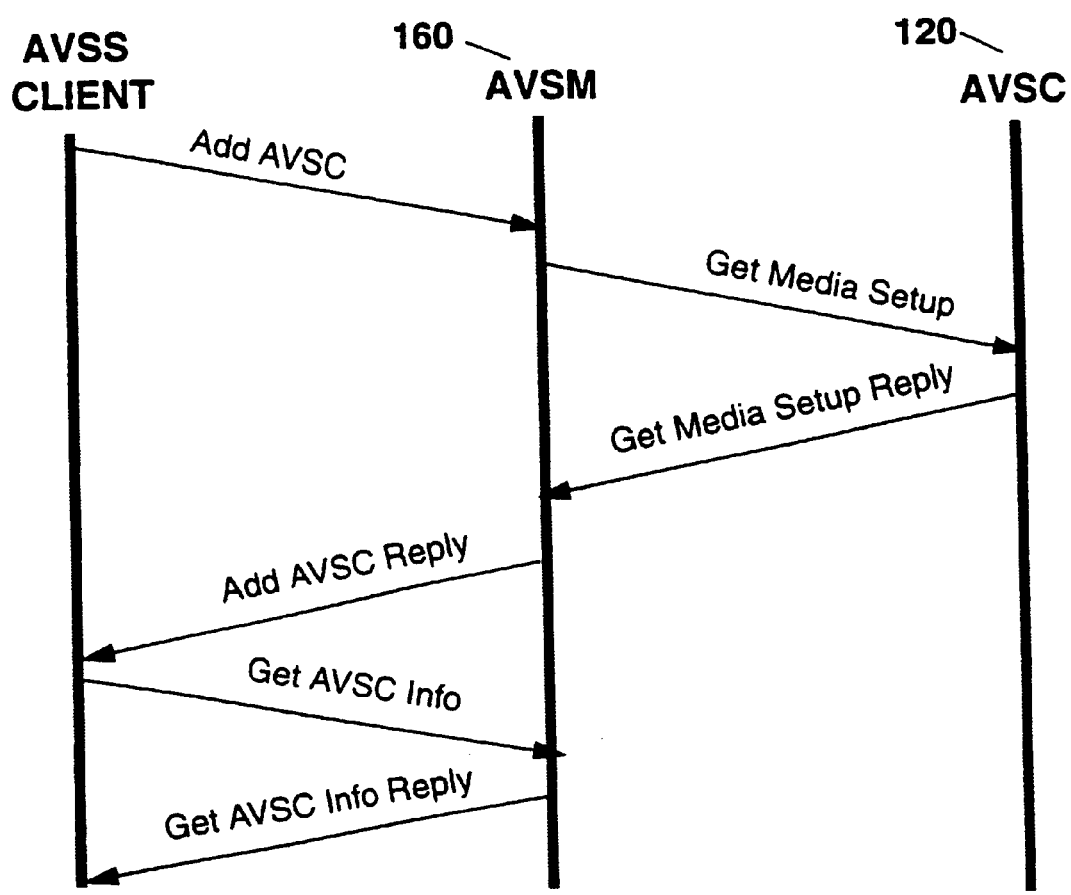
FIG. 25 is an exemplary request sequence diagram corresponding to particular AVSS administrative operations.

The AVSM 160 maintains data corresponding to AVSC 120 resources and their capabilities. The AVSM may query an AVSC 120 when requested, or as part of an AVSS database update when a new AVSC 120 has been added to the premises group. FIG. 25 is an exemplary request sequence diagram corresponding to new AVSC addition and AVSC query requests. In response to an authorized client's issuance of an AddAVSC request specifying an AVSC 120 and a network or IP address, the AVSM 160 issues a GetMediaSerup request to the AVSC 120. The AVSC 120 generates a GetMediaSetupReply, and provides data describing its resource types, capabilities, and characteristics to the AVSM 160. The AVSM 160 then issues an AddAVSCReply to the requesting client. In response to a GetAVSCInfo request from the client, the AVSM 160 provides data describing the AVSC's resource types, capabilities, and characteristics to the client via a GetAVSCInfoReply.

4.13 Application Program Interface

Figure 26:
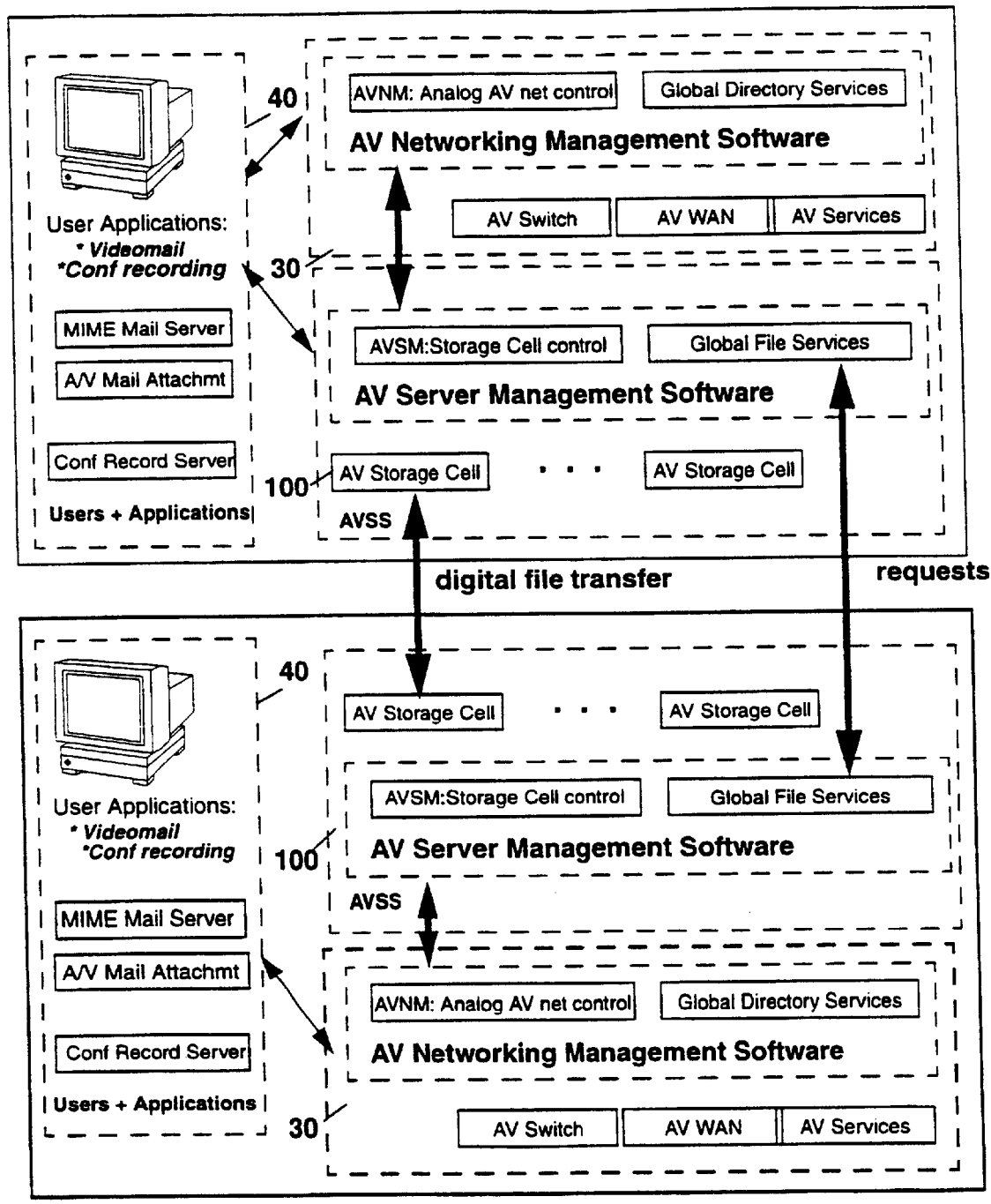
FIG. 26 is a block diagram showing client application programs communicating with the AVSM and A/V network manager.

Application programs executing on user workstations 40 or other computers act as clients relative to the AVSM 160, and may further act as clients relative to the A/V network manager 34. FIG. 26 is a block diagram showing client application programs communicating with the AVSM 160 and A/V network manager 34. In one embodiment, a typical application program comprises a user interface plus a set of software objects based upon or derived from the AVSMAppComm class hierarchy 250 described above. The application program thus serves as a software wrapper that can act as an AVSM client to provide access to particular types of AVSS functionality.

In response to particular user selections or actions, an application program issues requests to the AVSM 160. Based upon replies received from the AVSM 160, the application program selectively updates information presented to the user. Since a portion of the application program comprises objects corresponding to the AVSMAppComm, communication between the AVSM 160 and the application program occurs in a manner analogous to AVSM-to-AVSM communication. Additionally, since the AVSMAppComm can be readily extended or modified to reflect the evolution of AVSM functionality over time, new types of functionality can be readily accommodated with minimal application program modification.

4.14 Process and Data Primitives

The video storage server can support several types of applications. One of the ways that the several supported applications can share information, as well as cutting down on the coding required to embody the applications, is to share a set of common "primitive" elements between the several applications.

Primitives of the same class are combinable to achieve a specified result. One or more primitives may be combined to form new higher level primitives, which may in turn define yet another even higher level primitive, substantially ad infinitum. There are two broad classes of primitives: process primitives and data primitives.

Process primitives are invoked to perform an action. In turn, they may invoke other actions, including invoking other primitives. Typically process primitives establish AVSS sessions of some type, (for instance at least one of playing a file, getting file lists), present the user with a graphical interface, establish network connections, as well as other operations such as rendering synchronized graphics. Examples of process primitives taught by the principles of the present invention are viewers, browsers, and administrative processes.

Process primitives can be organized in a number of manners. A first manner is as a stand-alone process directly launched by a user. Alternatively, they may be launched from within another process, for instance a dynamic linked library or DLL. In this case, their thread of execution exists with the thread of execution of the launching process, and also terminates therewith. As a further alternative, process primitives may be launched by another process, as a separate process, whose thread of execution is not tied to the launching process. In this latter case, the termination of the launching process has no effect on the life of the process primitive.

There are several broad mechanisms for executing process primitives. One process primitive execution methodology implements the direct invocation of the process primitive by the application user. Another process primitive execution methodology is utilized where a target application, including but not limited to third-party software applications, has previously been taught how to display or act upon the receipt of a data primitive in the form of an attachment, MIME type, file type and so forth. The receipt of the data primitive causes the target application, for instance the MIME compliant software application or the operating system, to launch a process primitive associated with the data primitive. Yet another methodology for executing process primitives, especially those process primitives directly accessed by third-party software, is simply to install the process primitive as a plug-in to that software.

Data primitives refer to a number of specifically formatted file types in the context of their usage by process primitives or other related processes. Data primitives include, but are not necessarily limited to: audio-video files; audio-only files, video-only files; bitmap files; application files; postscript files; graphics files; text files; and synchronization files. Included in synchronization files are a number of time-stamped event file types including, but again not limited to: graphics event files; shareboard event files; window event files; application startup event files; and text event files. The time-stamps in the file signal when to take certain defined actions, thereby enabling the temporal synchronization of the information of one file with respect to another.

Figure 27:
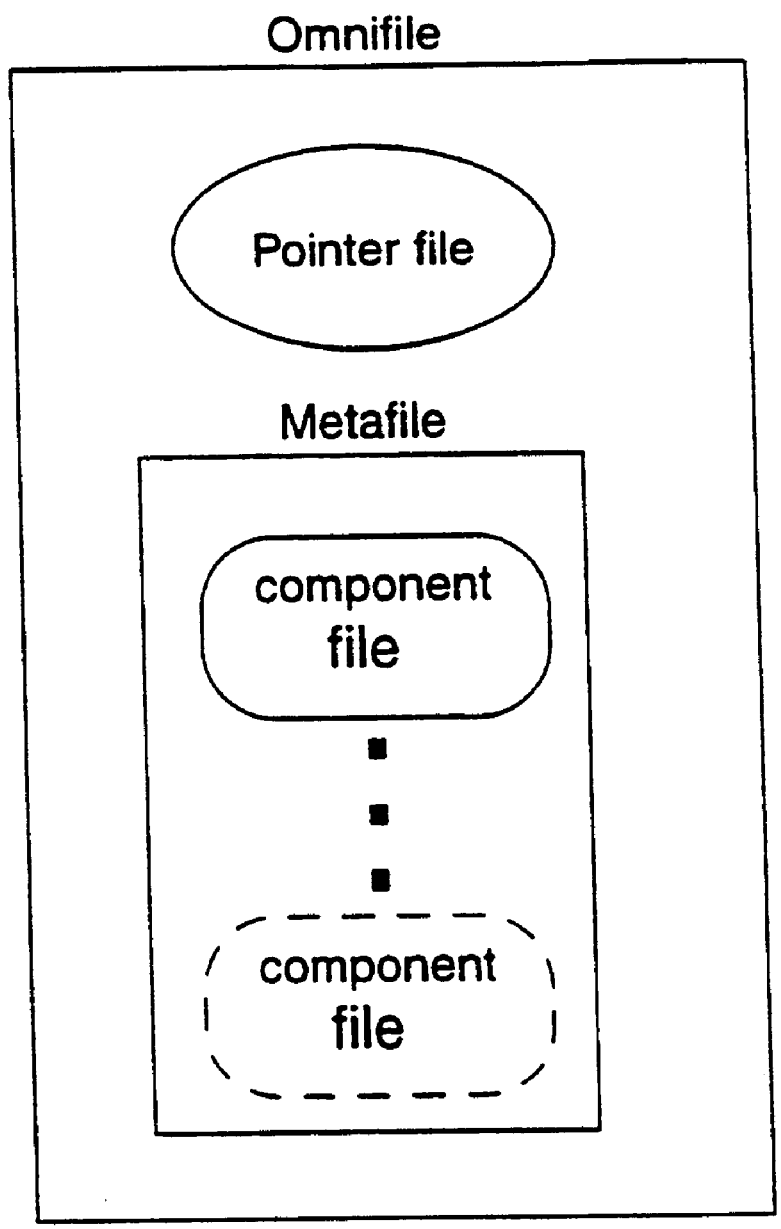
FIG. 27 is an overview of the file hierarchy.

A metafile is an abstraction representing a combination of one or more externally stored data primitives which together comprise all externally stored ("out-of-band") information comprising a particular AV or multimedia segment (such as a message). Associated with the metafile is a pointer file, which includes all referencing information for the various component files of the metafile (file names, permission keys, file system, etc.). One or more pointer files and their associated metafiles can be conceptually grouped to form a virtual aggregate file called an omnifile. The omnifile therefore must be in some fashion transferred successfully from one environment to another in order for authored information to be completely replayed in the new environment. This can be done in a number of ways as will be clear to one skilled in the art. One such embodiment is shown at FIG. 27.

In common practice, the term "multimedia file" as been used to refer to an aggregate of all types of media files and external reference file pointers. Multimedia files, like metafiles and indeed like other primitives, are hierarchical: they are combinable into other files to perform a certain task, for instance as a multimedia file in any of a number of standard formats. Metafiles, as defined herein, are allowed to be distributed across several file systems and do not include pointer files. In contrast, multimedia files can include pointer files and all of their component media files are stored together, Omnifiles do include pointer files but again are a virtual object spanning potentially several vile systems and thus also differ from multimedia files.

An application implementing the principles of the present invention specifically takes some of the file types of interest, and creates a MIME type associated with them. It then enables the teaching of some third party browsers including, but not limited to, Netscape® or Microsoft Internet Explorer®, or some e-mail packages including Eudora® how to handle the MIME types. Accordingly, many of the third-party application types supported by the present invention are taught how to handle the multimedia files, omnifiles, metafiles, audio-video files, and pointer files of the present invention. Therefore, when a third party application receives one of these file types taught by the present invention, it knows how to invoke the proper process primitive.

Figure 28:
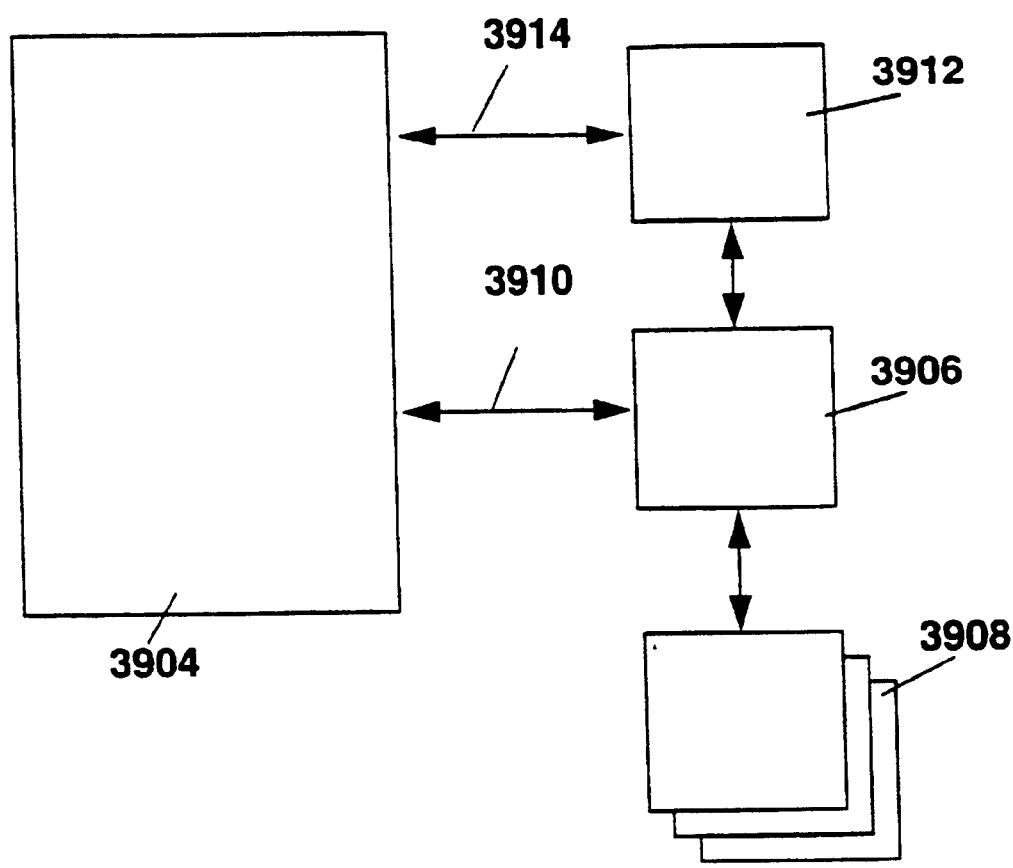
FIG. 28 is an exemplar data primitive.

Referring now to FIG. 28, an exemplar data primitive 3904 is shown which requires a viewer or browser process to display or act upon it. The application has been taught, as described above, how to respond to the receipt of the data primitive, it "knows" when and how to launch process primitives 3912 and 3906. In the viewer/browser exemplar herein presented, receipt of data primitive 3904 by an application causes the application to launch, at 3910 or 3914 either browser 3912 or viewer 3906. Where browser 3912 is launched, it may invoke a plurality, not shown, of viewers 3906. Viewer 3906 invokes, in turn a at least one data primitive 3908 for access to one or more files.

Figure 29:
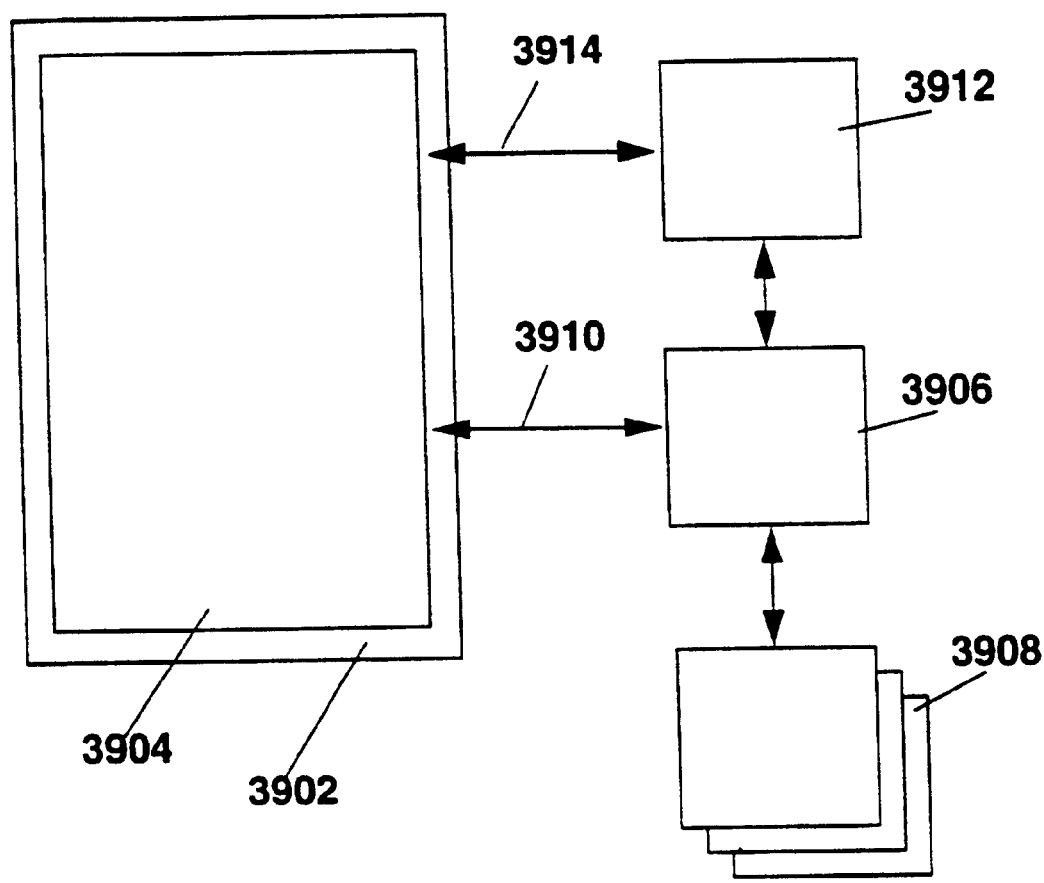
FIG. 29 is an exemplar data primitive implemented as an attachment.

Referring now to FIG. 29, data primitive 3904 is shown embodied as an attachment, for instance a MIME attachment, to a message 3902. By way of illustration but not limitation, message 3902 could be an e-mail message, word processing document, text document, and so forth. Depending on the application, the attachment may be implemented as the previously discussed MIME attachment, or as a file type. When the application is instructed to act upon the attachment, it invokes the process primitive associated with the attachment type, as previously discussed.

It will be understood that the immediately preceding discussion of the viewer/browser process primitive is presented for purposes of illustration and not limitation. The principles of the present invention comprehend an almost limitless number of process primitive configurations, of which the previous exemplar is but one. The teachings of the present invention specifically contemplate all such configurations.

4.14.1 Viewer

Video record and playback capabilities can separately be embedded in each application by stand alone means, but preferentially a standardized video record playback utility used across several applications is desirable. Thus a viewer is a good candidate for a process primitive and is explained here as one example of the use of process primitives as taught by the principles of the present invention.

The viewer process primitive sets up the necessary connections and sessions, as previously described, prepares the files for viewing, and provides the necessary viewer interface to enable the user to access and manipulate the files, as permitted. Because the viewer is a standard video call, it can be treated like any other video call. This enables it to be merged with other video calls, conferences, and the like, in similar fashion to any other session enabled by the principles of the present invention.

The implementation of this feature the present invention is disclosed in FIG. 29. Having reference to that figure, the present invention contemplates the utilization of a shell document 3902 invoked for instance by an application in the MCG (not shown). An example of such an application would be the launching of a video mail session, video conference session, or substantially any of the other applications discussed herein. Embedded in shell document 3902 is a MIME attachment 3904. MIME attachment 3904 invokes viewer 3906, which enables the user to access the AVSS through the network as needed to record or playback video files 3908. Permissions to record or playback specific video files may, or to the user accessing the applications. The shared connection, at 3910, presents the novel advantage of enabling video recording or playback and combining it with other applications running concurrently in a separate session. In some applications there is provided a browser, 3912, which enables the user to select between a number of applications 3906. Alternatively, browser 3912 may be embedded in, or part of viewer 3906.

4.14.2 MIME Attachment

Because the viewer is common across all the applications, and because the files it invokes are accessible by the several applications, a first application can use the viewer to record or playback a file, and a second application can utilize the viewer for video mail or substantially any other application. Accordingly, the video files are sharable at the file level, the attachment or MIME level, or at the connection level. The utilization of MIME (Multipurpose Internet Mail Extensions) attachments enables the invocation of the viewer and its associated networking connections within a standardized attachment which is accepted by third parties in accordance with standard MIME protocols. Thus the several applications taught in the present invention are interoperable by means of file sharing by the copying of MIME attachments, or by connection sharing.

4.14.3 Synchronized Shareboard

One example of such a concurrent session would be enable the concurrent implementation of share board graphics and a video conference session. The addition of multimedia synchronization capability to the previously discussed viewer and MIME implementation enables the several video applications previously discussed to include animated graphics files which are synchronized with the video. Share capabilities currently implemented by the principles of the present invention "grabs" a window and stores it as a bitmap file, enabling the user to draw on top of the bitmap file. This enables the document to be used by two or more users which includes overlay graphics, to be stored and synchronized for later synchronous playback.

The synchronization is explained as follows: when the two or more users are conducting a video conference, a first window is opened, and a bitmap superimposed thereon. Any files read into the window or the bitmap may be time stamped. Any animations imposed on the bitmap are draw list events which may also be time stamped. Accordingly the principles of the present invention contemplate the capture of the several times stamps invoked during multimedia recording. This enables the later synchronization, during playback, of the several files to present a synchronous view of the entire session. Where a video conference includes N users, the recorded version of the synchronized session may be regarded as the N+1 user. At playback, the recorded version of the session is again treated like any other user.

The recording process previously discussed is substantially the sequential recording of a sequence of events. If it is desirable that the previously recorded events be capable of reversal, it is necessary to render the graphics in such a way that they are reversible. Similarly, where the system enables "go-tos" it is necessary to render the graphics in such a manner that the rendered image is capable of retrieval at specified "go-to" points.

Now we have the capability to grant any screen in the window and share it with any user or any storage device enabled.

Shared applications (not understood). Recording of shared applications is accomplished by a similar means to bitmap capture.

Where annotations that draw overlays are occurring on top of the video window, the workstations must have the capability for performing graphics overlay on top of video.

4.14.4 Browser

The browser aforementioned can also be adapted by those skilled in the art to act as a process primitive in a manner similar to that described thus far.

4.15 Applications Overview

Figure 30:
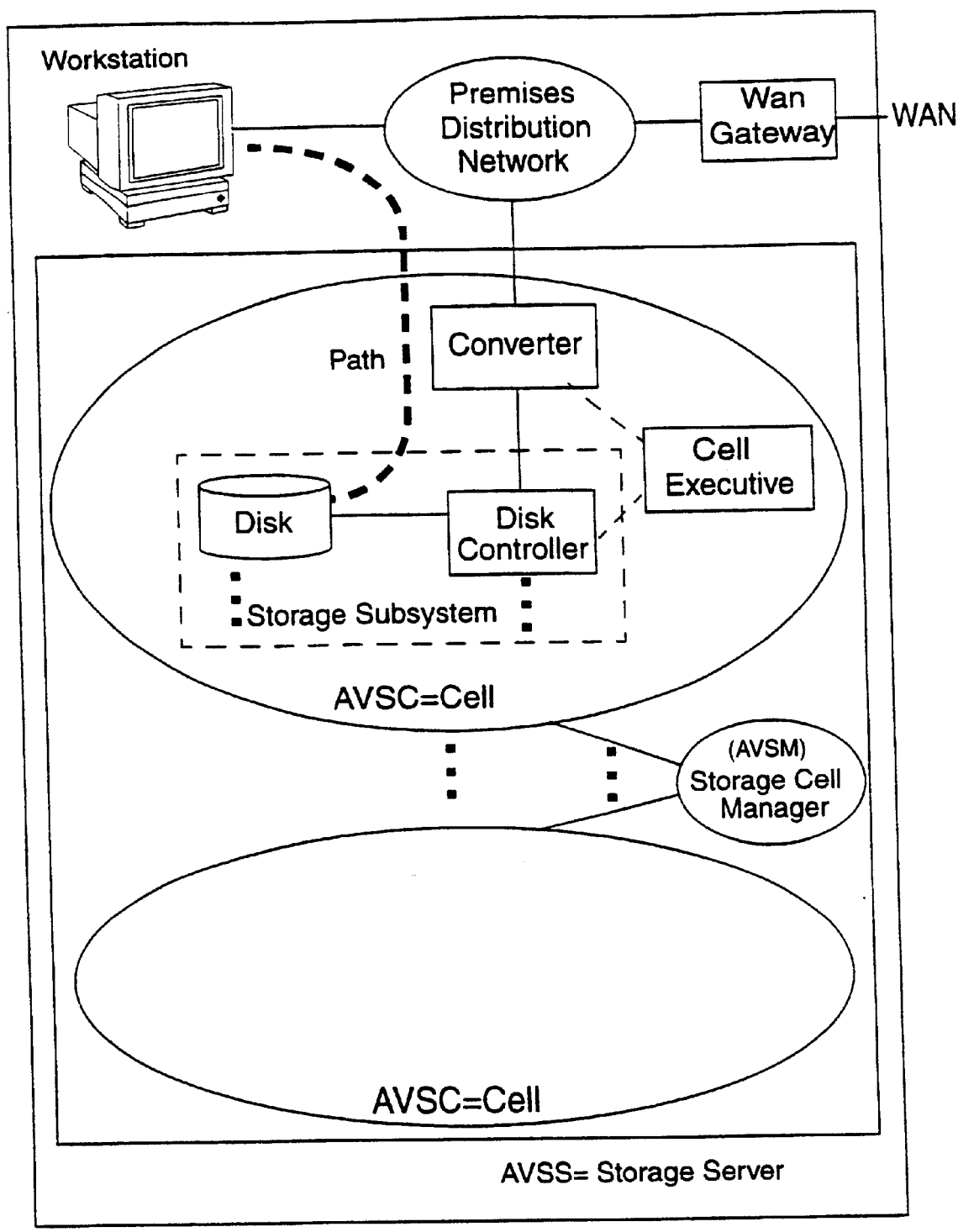
FIG. 30 is an exemplar system for implementing the software applications of the present invention.

The present invention teaches a number of novel software applications enabled by, and for use in conjunction with the video server system, or AVSS, previously discussed. As the present invention enables the implementation of its features in a scalable fashion, the programmatic elements of the present invention provide, among other benefits, the ability to scale the features and advantages presented herein over a wide range of hardware implementations. An overview of one such hardware implementation is shown at FIG. 30.

The present invention provides two broad classes of storage applications. Those which utilize only the basic audio and video recording, storage, browsing, and playback capabilities of the current AVSS will be referred to hereinafter as "video" applications. This is typically a reduced-capability, lower cost implementation. A second class of applications utilize audio and video along with a synchronized data sharing capability, e.g., synchronized-shareboard/T.120recording, storage, browsing, and playback features. Such capabilities are essential for recording conferences, messages, or presentations where information cannot be conveniently conveyed by audio and video alone. This class of storage applications will be referred to hereinafter as "multimedia" applications. The additional functionality provided by this class of applications may require a somewhat higher implementation cost.

The principles of the present invention contemplate the AVSS supporting several types of applications. One way in which the several applications can share information is to share certain common "primitive" elements. This has the added advantage of cutting down on the coding required to embody those applications which utilize primitives. Accordingly, one or more of the applications taught by the present invention may utilize shared primitives to facilitate the interchange of information of between applications or applications elements. Alternatively, one or more of these applications may be implemented as a "stand-alone", or "one-off" implementation which does not utilize shared primitives.

4.16 Video Applications

As previously mentioned, an AVSS can support several types of applications. By way of illustration, but not limitation, some of these applications include a video mail application which combines, in a novel manner, video clips, or files, with e-mail messages whereby one user can leave a detailed audio-video message on another user's e-mail system. Video mail is like e-mail, but with either a video attachment, or with a video file replacing normal e-mail text altogether. The richness and depth of communication afforded thereby enables significantly greater information interchange than is available by simple voice mail messaging. The Video Answering System taught by the present invention answers a user's e-mail when the user is away or otherwise occupied. This application presents the user with the option of greeting callers in a number of manners, and receiving their video messages in response. One alternative of this application contemplates its implementation using the Video Mail application previously discussed. Video Conference Recording enables a plurality of users to record in real time an established video conference. This application may be invoked at the user's command or may, alternatively be invoked automatically when certain conference parameters are met.

In addition to these oriented to electronic meetings applications, the architecture of the AVSS system described herein renders, with facility, several additional capabilities. One such capability is the utilization of the present invention as a general-purpose audio-video storage device. This capability enables users to store and forward audio-video files, in a variety of formats, to users throughout the LAN or WAN. The connectivity of such networks to the Internet provides the additional capability of the system as an intranet or Internet gateway for audio, video, audio-video, or multimedia file transfer. Another application is Video Publishing which enables any of a number of system users to create, edit, store and disseminate complex, informationally rich, audio-video documents to a wide variety of recipients by means of LAN, WAN, or to a world-wide audience utilizing the Internet.

4.16.1 Video Mail

A first video application enabled by the principles of the present invention is video mail. In a first embodiment of this application a "video attachment" capability is provided to existing MIME-based mail systems. Alternatively, video mail may also be implemented by other attachment strategies, without attachments, or as a fully developed stand-alone application which does not rely on any underlying commercial e-mail package.

In a first embodiment of the present invention, a video attachment utility utilizes the generic video storage and session establishment method hereinafter described. Moreover, this utility utilizes the generic MIME video attachment methodology hereinafter discussed. As opposed to the video mail methodology taught in U.S. Pat. No. 5,617,539 which starts a mode control GUI (or "MCG") directly at the user's workstation, an alternative embodiment presented by the present invention sets a "MCG" flag so that the AVSS starts a MCG on the user's workstation. Mail authoring invokes the request for a session with an encoder/decoder pair, while mail reading invokes a request for a session with a decoder only.

The principles of the present invention contemplate the implementation thereof on a wide variety of hardware implementations. In the simplest case, a single AVSS serves both the message authoring user and the message recipient. In this implementation, there are no file transfers required out of the AVSS. Files may be transferred from the AVSS for other reasons, but there is no functional reason for the files to reside on another AVSS in this case. This could be considered a LAN implementation of the principles of the present invention.

Where a given organization is sufficiently large or so geographically distributed that a single AVSS cannot handle the traffic for all the users thereof, multiple AVSSs may be implemented. This case has two sub-cases: the first sub-case is a WAN implementation, and the second is where the implementation at a given site, for instance a large campus, is so large it requires more than one AVSS. In the second sub-case, the multiple AVSSs are interconnected by trunking 16 between switches 32 and/or the local data LAN 20. Where a file is required on a different AVSS than the recording AVSS in the second sub-case, it is simply transferred over the local interconnection environment 16 and 20. In the first sub-case, require the transfer of relatively large files from one AVSS to another, this implementation may use of switched WAN services, frame relay, or one or more of their functional equivalents. Moreover, because there is may be so much bandwidth required for these transfers, it may be necessary to provide bandwidth management solutions. Examples of such network bandwidth management solutions include, but are specifically not limited to conducting file transfers at non-peak times, conducting file transfers in a preemptible manner, and other bandwidth conservation methodologies known or apparent to those having ordinary skill in the art. When file transfers are conducted in a preemptible manner, if a user initiates a higher priority action, for instance she initiates a video conference, the file transfer may be preempted; i.e. aborted, halted and restarted after the high priority application, etc.

Figure 31:
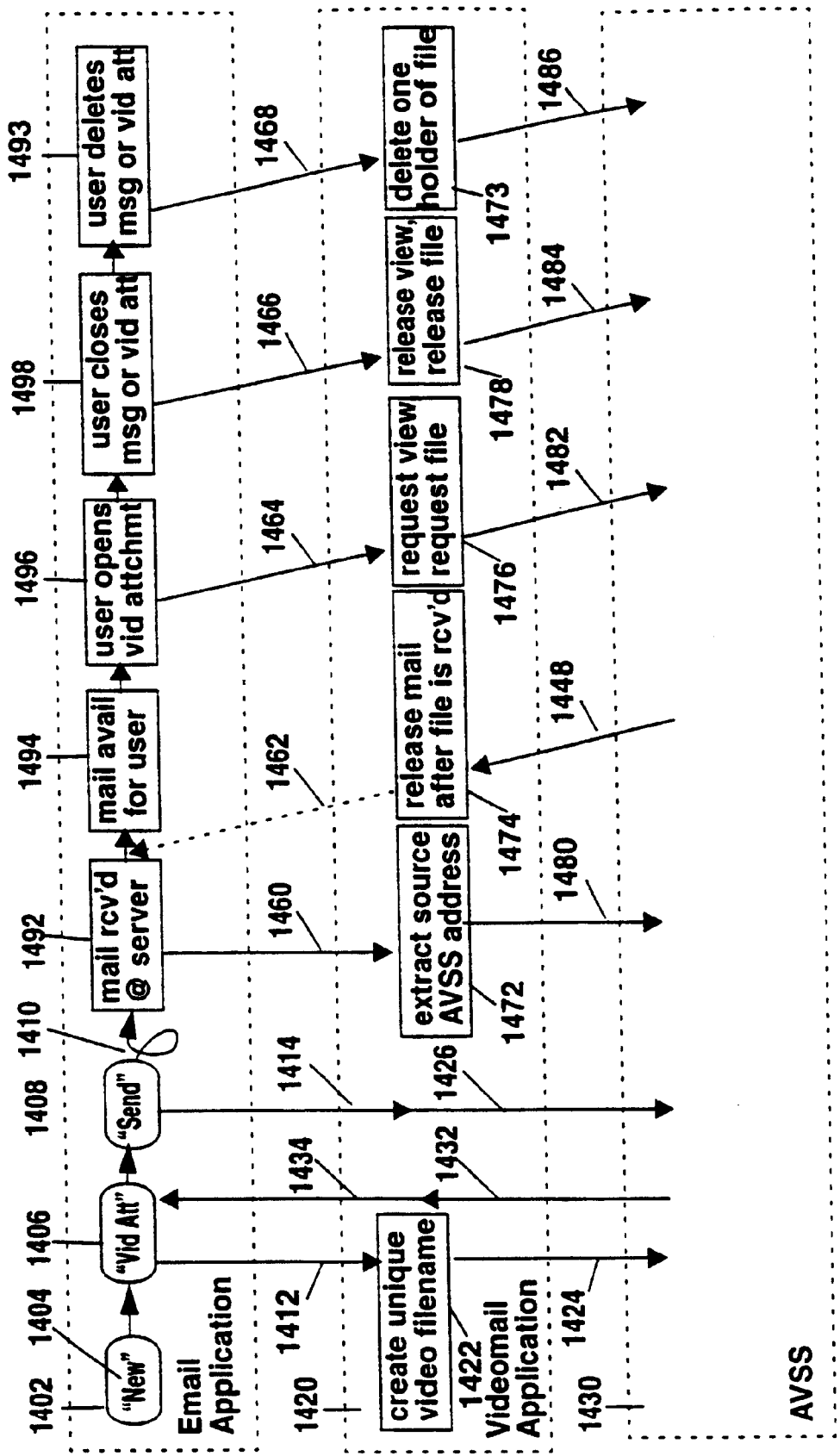
FIG. 31 is a transaction flow diagram among the application elements which facilitate local-area video mail.

Referring now to FIG. 31, the transaction flow among application elements which facilitate a local or LAN implementation of video mail is shown, where a mail message incorporating a video message is both recorded and read from the same AVSS. Having continued reference to FIG. 31, when the user, at 1404, initiates a new e-mail message, the source e-mail system 1402 queries, at 1406, whether the user intends to attach a video attachment to the e-mail. If the user intends to submit a video attachment with the e-mail message, a video authoring request is initiated at 1412 to video mail application 1420. Video mail application 1420 creates a unique video file name at 1422 and requests of the recording AVSS 1430, at 1424, an encode session. The audio-video file is then recorded on AVSS 1430. AVSS 1430 returns the video attachment at 1432 to video mail application 1420. Video mail application 1420 in turn sets the file name pointer at 1434 for e-mail program 1402. Once the e-mail message and video attachment have been completed, the user sends the e-mail, for instance using SMTP protocol 1410, by initiating the send procedure at 1408. Once send procedure 1408 is initiated, e-mail program 1402 initiates a notification at 1414 to video mail application 1420 that the message has been sent. Video mail application 1420 then instructs the AVSS 1430 to release the encode session at 1426.

At this point, the e-mail message itself, not shown in this FIG., has been sent to the user in the normal manner, and the recorded A/V file resides in AVSS 1430. When the e-mail program 1402 receives the e-mail message at 1492, it sends, at 1460, a receipt target and information request to video mail application 1420. Responsive to the receipt target and information request 1460, video mail application 1420 extracts a source AVSS address at 1472. Video mail application 1420 then makes a file transfer request 1480 to AVSS 1430.

Responsive to request 1480, AVSS 1430 confirms it already has the requested A/V file, and confirms, at 1448, that the video file transfer is completed. Responsive to file transfer confirmation 1448, video mail application 1420 at 1474 releases the mail message after the A/V file is received. Video mail application 1420 then releases the mail message to e-mail system 1402 at 1462.

At this point, e-mail system 1402 makes the mail available to the user at 1494. Steps 1494 and 1460, in operative combination, ensure that the user is not notified of a message with an associated video attachment before the video attachment arrives. When the user opens the video attachment at 1496, e-mail system 1402 initiates an attachment open event and sets a file pointer at 1464 to video mail application 1420. In response to set file pointer 1464, video mail application 1420 opens a viewer and prepares to decode the AV file at 1476. Video mail application 1420 in turn requests a decode session from AVSS 1430 at 1482. Decoding of the A/V file by AVSS 1430 renders the file available to the user.

At 1498, once the user closes the message or the video attachment, a view message/attachment and file pointer close event is initiated at 1466. This causes video mail application 1420 to release the view and release the file at 1478. Responsive to release event 1478, video mail application 1420 issues, at 1484, a decode session release command to AVSS 1430. When, at 1493, the user deletes either the message or its video attachment, e-mail system 1402 initiates a message/attachment delete event 1468 to video mail application 1420. Responsive to this event, video mail application 1420 deletes, at 1473, one holder of the file, and at 1486 releases user ownership of the file to AVSS 1430. Alternatively, of course, a video file may be set to expire after a pre-assigned lifetime.

It should be noted that receipt target and information request 1460, release mail message 1462, view message/attachment and file pointer close event 1466, and message/attachment delete event 1468 as taught by this invention are novel concepts and as such are not supported by any known widely available e-mail domain servers. Study of the principles herein disclosed will make obvious to one having ordinary skill in the art that additional dialogs and displays in the video mail application can provide the information supplied by the previously listed messages. Further, a variety of alternate implementations are of course possible and the teachings of the present invention render them clear to those skilled in the art. These alternatives include workarounds for the absence of any or all of 1460, 1462, 1466, and 1468; for example, the unavailability of 1468 could be handled by a file lifetime monitor which takes action to delete a file after a designated period of inactivity.

Figure 32:
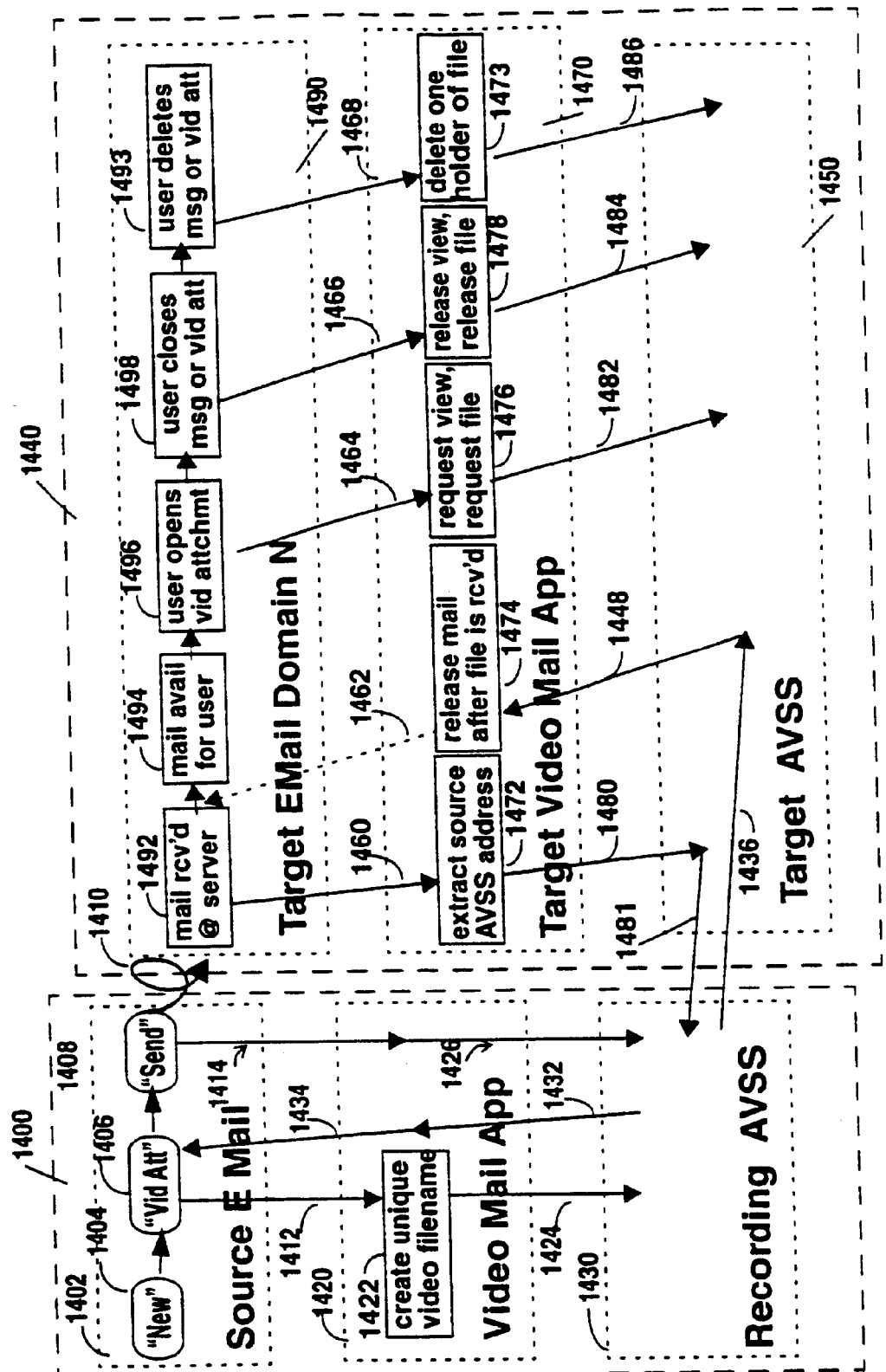
FIG. 32 is a transaction flow diagram among the application elements which facilitate wide-area video mail.

Referring now to FIG. 32, the transaction flow among application elements which facilitate wide-area video mail is shown, where a mail message incorporating a video message is transmitted from a recording, or source. AVSS 1430 to a target AVSS 1450.

When the user, at 1404, initiates a new email message, the source email system, 1402, queries at 1406 whether the user intends to attach a video attachment to the email. If the user intends to submit a video attachment with the email message, a video authoring request is initiated at 1412 to the video mail application program 1420. Video mail application program 1420 creates a unique video filename at 1422 and requests of the recording AVSS 1430, at 1424, an encode session. The video attachment is then recorded on the recording AVSS, 1430. AVSS 1430 then returns video attachment 1432 to video mail application 1420. Video mail application program 1420 in turn sets the video filename pointer at 1434 for source email program 1402. Once the email program and video attachment have been completed, the user sends the email, for instance using SMTP protocol 1410, by initiating the send procedure at 1408. Once send procedure 1408 is initiated, source email package 1402 initiates a notification to the video mail application 1420, at 1414, that the email message has been sent. Video mail application 1420 then instructs the recording AVSS 1430 to release the encode session, at 1426.

At this point the email message itself, not shown in this figure, has been sent to a remote AVSS utilizing normal SMTP methodology, while the encoded A/V file resides in recording AVSS 1430. When the email message is received, at 1492, at target email domain 1490 a receipt target and information request 1460 is sent to target video mail application 1470. Responsive to the receipt target and information request 1460 target video mail application 1470 extracts the source AVSS address at 1472. Target video mail application 1470 then sends target AVSS 1450 a file transfer request 1480. This in turn initiates the request 1481, by target AVSS 1450, to recording AVSS 1430 for the A/V file.

The recording AVSS, 1430, transfers the A/V file, at 1436, to the target AVSS 1450. Target AVSS 1450 confirms to the target video mail application 1470, at 1448, that the video file transfer is completed. Responsive to file transfer confirmation 1448, target video mail application, 1470, at 1474 releases the mail message after the A/V file is received. Target video mail application 1470 then releases the mail message to the target email domain 1490 at 1462.

At this point target email domain 1490 makes the mail available to the user at 1494. Steps 1494 and 1460, in operative combination, ensure that the user is not notified of a message with an associated video attachment before the video attachment arrives. When the user opens the video attachment at 1496, target email domain 1490 initiates an attachment open event and sets a file pointer, at 1464, to target video mail application 1470. In response to the set file pointer 1464, target video mail application 1470 opens a view and prepares to decode the file for the user at 1476. Target video mail application 1470 in turn requests a decode session from the target AVSS 1450 at 1482. Decoding of the A/V file by the target AVSS 1450 renders the file available to the user.

At 1498, once the user closes the message or the video attachment, a view message/attachment and file pointer close event is initiated at 1466. This causes the target video mail application 1470 to release the view and release the file at 1478. Responsive to release event 1478, target video mail application 1470 issues, at 1484, a decode session release command to target AVSS 1450. When, at 1493, the user deletes either the message or its video attachment, target email domain 1490 initiates a message/attachment delete event 1468 to target video mail application 1470. Target video mail application 1470 deletes, at 1473, one holder of the file, and at 1486 releases user ownership of the file to target AVSS 1450. Alternatively of course, video files can expire after a pre-assigned lifetime.

It should be noted that receipt target and information request 1460, release mail message 1462, view message/attachment and file pointer close event 1466, and message/attachment delete event 1468 taught by this invention are novel concepts and as such are not supported by any known widely available e-mail domain servers. Study of the principles herein disclosed will make obvious to one having ordinary skill in the art that additional dialogs and displays in the video mail application can provide the information supplied by the previously listed messages. Further, a variety of alternate implementations are of course possible and the teachings of the present invention renders them clear to those skilled in the art. These alternatives include workarounds for the absence of any or all of 1460, 1462, 1466, and 1468; for example, the unavailability of 1468 could be handled by a file lifetime monitor which takes action to delete a file after a designated period of inactivity.

The exemplar discussed above and illustrated in FIG. 32 demonstrates a wide-area implementation of the present invention utilizing two systems, 1400 and 1440. Shown in the figure is a first methodology whereby two or more instances of a conventional electronic mail system, two or more AVSSs, and two or more instances of a simple video mail software application "middleware" can be used to create a multi-AVSS, WAN-capable video mail system. This relatively simple network implementation is presented herein for clarity. Study of the principles herein disclosed will make obvious to one having ordinary skill in the art that a number of target systems 1440 may be similarly implemented. All such implementations are specifically contemplated by the principles of the present invention.

Figure 33:
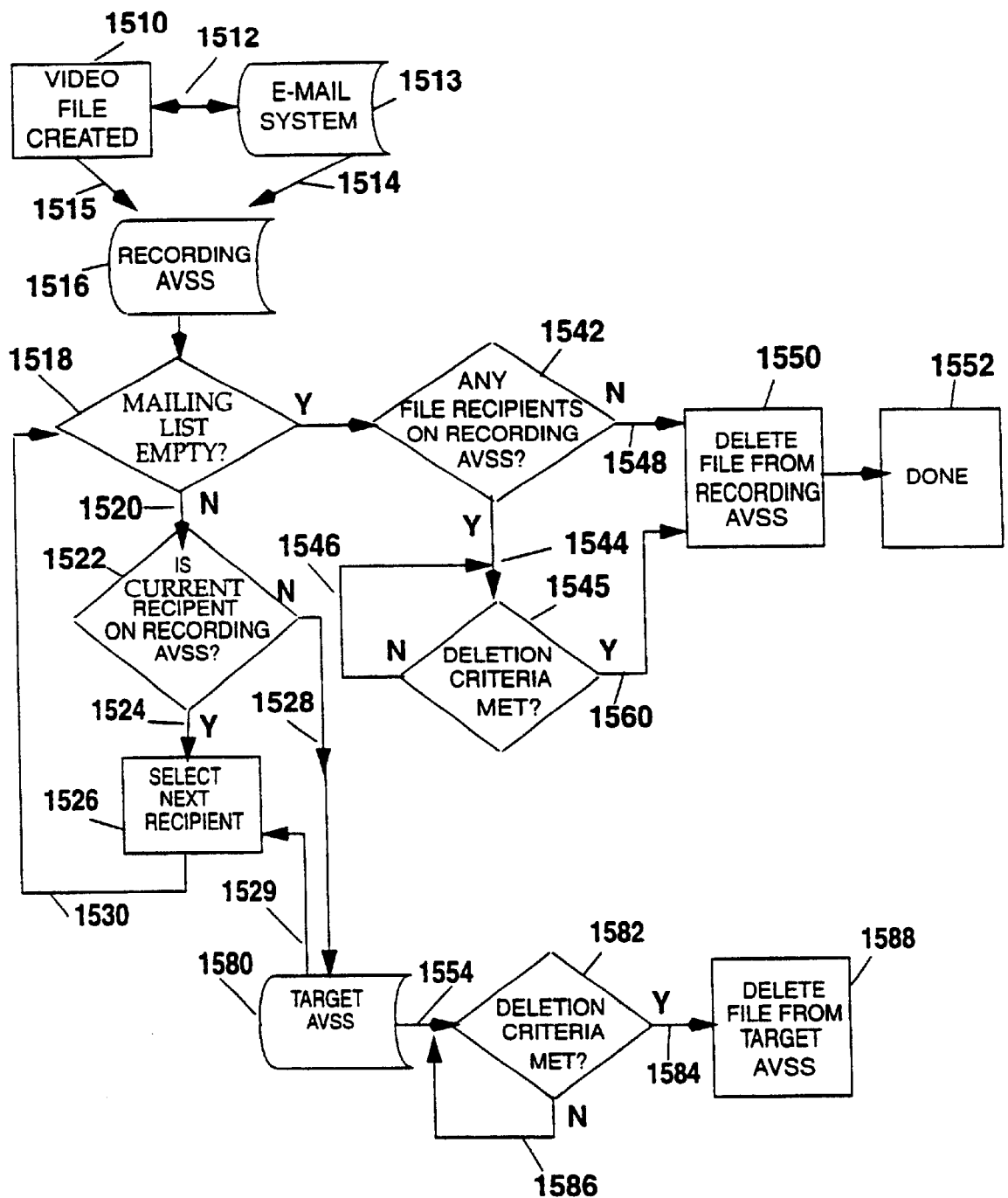
FIG. 33 is a representation of the life cycle of an exemplar video message file.
Figure 34:
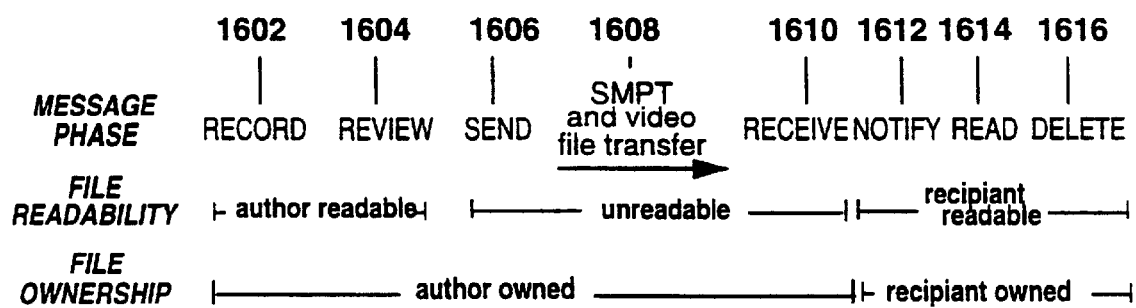
FIG. 34 is a comparative diagram of the ownership and readability of video files associated with a video mail attachment, over the message lifetime.

The novel concepts of file ownership and video message life cycle are shown in FIGS. 33 and 34. In several of the applications taught herein, including video mail, file ownership evolves through the different phases of a message's lifetime. At message authoring, for example, the file is owned by the message author, while at message review the file is owned by the message recipient. This notion of changing file ownership is presented in FIG. 34, which more clearly points out both ownership and readability of the video files associated with a video mail attachment over the message lifetime. Not shown in the figure are the effects of messaging forwarding, but this is simply a second authorship/recipientship transaction exactly like that shown in the figure.

Having reference now to FIG. 33, the life cycle of an exemplar video message file is discussed as follows:

When a video file is created, at 1510, associated with a message by means of a reference pointer 1512, then transmitted, a mailing list 1514 is obtained from the conventional email system, 1513, and presented to the recording AVSS at 1516. Recording AVSS 1516 determines the recipients' addresses from mailing list 1514, which are then associated with the name of their serving AVSS by means of directory services. The directory services provide a mechanism whereby names, e-mail address or login identities of users may be looked up and associated with their video address in a LAN or WAN environment. The AVNM server in the present embodiment could provide such directory services, or these services may be provided by well known directory protocols such as LDAP.

At 1518 the programmatic elements of the present invention make a determination as to whether or not the mailing list 1514 associated with the video mail message is empty. If, at 1520, it is determined that the mailing list is not empty, a further determination is made for each recipient in the list if the current recipient of the message is served by the recording AVSS at 1522. If, at 1524 the determination is made that the current recipient is served by the recording AVSS the file is retained on the AVSS and the next recipient is chosen from the mailing list at 1526. Responsive to the selection of the next recipient at 1530, step 1518 is again invoked until the mailing list is empty. Responsive to a determination of 1528 that the current recipient is not on the recording AVSS the file is transferred to a target AVSS 1580. The completion of the copy at 1529 returns to step 1526 to select the next recipient from the mailing list. Responsive to the selection of the next recipient, at 1530, step 1518 is again invoked until the mailing list is empty.

It is a principal feature of the present invention that the relatively large video files associated with multimedia and video communications be distributed where required and maintained thereat, but only for so long as required. In this manner the principles of the present invention present a heretofore unattained level of systems economy with respect to mass storage, bandwidth, and other system delimiters. Accordingly, the principles of the present invention specifically contemplate the automated deletion of video files once certain deletion criteria have transpired. Examples of these criteria include, but are specifically not limited to: the reading of a giving file by all of its intended recipients, the passage of a certain period of time, a certain number of invocations of the message, and other message accounting parameters well known to those having ordinary skill in the art. Having this deletion criteria in mind, a determination is made at 1582 if one or more deletion criteria has been met. In the event that the deletion criteria has not been met the system loops back, at 1586, and returns to wait for the deletion criteria to be met at 1582. Responsive to a determination, at 1584, that the deletion criteria has been met at 1588 the file is deleted from the target AVSS at 1588.

Returning now to the loop through the mailing list at step 1518, if, at 1540 a determination is made that the mailing list is empty a query is made a 1542 as to whether any file recipients are served by the recording AVSS. Responsive to a determination at 1540 that no file recipients are served by the recording AVSS, the file is deleted from the recording AVSS at 1550 and this function of the present invention is completed at 1552. Responsive to a determination by step 1542 at 1544 that file recipients are served by the recording AVSS, a determination is made at 1545 at to whether file deletion criteria has been met. If a determination is made at 1546 that the file deletion criteria has not been met the system loops back and returns to wait for the deletion criteria to be met at 1545. Responsive to a determination by step 1545 at 1560 that the file deletion criteria has been met the file is deleted from the recording AVSS at step 1550 which action completes this function of the present invention at 1552.

From the foregoing, several novel aspects of the present invention are made manifest.

Within each AVSS, copies of the file can be distributed to one or more additional disks with the same AVSC or multiple AVSCs so as to diminish blocking to file access. This improves both system responsiveness and system reliability. In smaller implementations of the present invention, this file distribution utilizes full replication of the video files. In larger implementations, a "hashing" mapping is utilized, and is explained as follows: where a file may be in high usage, rather than leaving it on only one AVSS, for instance the AVSS on which the file was authored, thereby leaving it only on the one disk which may result in unwanted delays in access time, the principles of the present invention contemplate the distribution of high usage files to one or more storage devices within an AVSC, or indeed to a number of differentAVSCs within the system. This may be accomplished by means of any of a number of hashing schemes known to those having ordinary skill in the art. This of course improves the availability of the file, and thus the reliability of the system which relies on the file.

The life cycle advantages presented by an exemplar embodiment of the present invention include, but are not necessarily limited to, the following:

(A) Video files are maintained only on those AVSSs serving a specified recipient for the video file, unless stored at another location for purposes of reliability and data redundancy.

(B) Video files are deleted automatically once all messages which include the video file have been deleted; and (C) Where a recipient is located on an AVSS other than the recording AVSS, the video file is automatically transferred to the target AVSS. The transfer function may be implemented as "copy" or "reliable move".

These advantages ensure that relatively large video files are transferred only where needed, and retained only on those AVSSs which require them, and then only for as long as the files are required. Unneeded files are automatically deleted from any AVSS when no longer required by any recipient served by that AVSS.

Referring now to FIG. 34, during the recording and review processes, 1602 and 1604, a given file is both readable and owned by its author. Once the author sends the file, at 1606, it is still owned by the author but is unreadable. This condition continues through SMPT and video file transfer 1608 and the receive phase, 1610. Once the recipient is notified, at 1612, of the arrival of the email message and video file, both file readability and file ownership pass to the recipient. This condition continues through the message read and delete phases, 1614 and 1616 respectively. Of course, once the file is deleted it is neither owned nor readable.

The author could select to be a recipient or simply remain an owner. The file would therefore remain readable by the author during the send 1606, transfer 1608, received 1610 and notified 1612 steps. The author would participate in the read 1614 and delete 1616 phases.

Certain AVSS capabilities are required depending on the conference client implemented at individual desktops or rooms. When the previously discussed video mail system is implemented inside an enterprise incorporating desktops or rooms outfitted with workstation conference clients as described in U.S. Pat. No. 5,617,539, the following AVSS features are assumed:

1. Generic control protocol interface/API.
2. A generic multi-platform audio-video recording/playback utility (similar to vfstool) referred to herein as the "mode control GUI" or "MCG".
3. Multi-session recording/playback capability.
4. Analog A/V I/O.
5. An AVSC decoder is co-allocated when an encoder is allocated. This ensures at the decoder is always available during the record session for review.
6. Variable capacity scaling to match the needs of supported applications.
7. File transfer capability (pull model) among AVSSs driven by specific file transfer requests made by applications.
8. Effective "loopback" at the AVSC of incoming video to outgoing video during record mode.
9. A video editing capability. This capability may be internally implemented as part of an applications program, or in the alternative, may be capable of invoking third party video and/or audio editors.

Where desktops or rooms are not outfitted with the workstation conference clients taught in U.S. Pat. No. 5,617, 539, but rather are fitted with standard MPEG or other encoder/decoders, the following additional capabilities are required:

10. The capability to accept and playback appropriate digital files from third parties as controlled by applications.
11. The capability to transfer appropriate digital files to third parties as controlled by applications.

Sending video email naturally implies the creation of a video file. The principles of the present invention contemplate numerous video file creation scenarios. Video files may be pre-recorded, edited, and stored using the AVSS as a video file storage repository. They may be created at the same time the user is sending the video email. Video files may be imported from other video sources as described elsewhere herein, and attached to video mail messages. Finally, a video mail attachment may completely obviate the need for text with the message. In this latter embodiment of the present invention, the video attachment becomes the message, to the exclusion of text. Accordingly, it will be appreciated that substantially any methodology used to create a video file may be implemented to create video attachments for video mail, and are all comprehended by the teachings of the present invention.

When a user wishes to send a new audio-video attachment to a video mail message, this is accomplished by creating a new audio-video file by selecting FILE: NEW from the viewer main menu and then recording the video. Video recording may comprehend, in one or more embodiments, several levels of editing capability. The most rudimentary of these enables a user to delete a file and then re-record it. Only slightly more sophisticated is an embodiment which enables a user to first review his recording, and then delete it if needed A further improvement is an editing scheme which enables the user to insert/delete/import material into a file. Finally, the video file is saved as an audio-video file on the local file system. The present invention contemplates each of these editing strategies in each of the applications taught herein.

While the present invention contemplates the incorporation therein of the above-described editing features, it also contemplates the utilization of a third-party video editor for any and all video editing. The third-party editor may be invoked from the present invention by means of primitive, plug-in, invocation button, scripts, or other invocation methodologies well known to those having ordinary skill in the art.

Where desired, the user then uses her normal email package to create an e-mail text message. She then attaches the AV file pointers to the email and then transmits or sends the email. An alternative embodiment contemplates a more closely integrated mail package which includes an Attach Video menu item in the mail package compose dialogue. To slightly simplify the previously discussed process, the Attach Video menu item would launch the viewer with the –n switch to indicate the viewer should automatically create a new video file and open an encode session.

When a user receives an email with an audio-video attachment, he opens the attachment using his email reader. This launches the viewer to open the audio-video attachment. If the video is password protected, the user is prompted the supply the password. If the password is incorrect, the file is not opened. Alternatively, the viewer will in turn, if necessary launch the conference mode of operation. In the case where the file is stored on the AVSS to which the viewer is connected, when conference successfully connects to the AVSS, the VCR controls for playback are enabled on the viewer. Utilizing the play, seek, and rewind buttons of those controls the user plays the video and sees and hears the output at the workstation.

In the case where the file is not stored locally, the AVSS will initiate a file transfer to receive the MPEG video from the remote AVSS. The user is notified that the transfer is taking place. When the file transfer is complete, VCR type controls for playback will be enabled on the viewer. Alternatively, the user could choose to connect to the remote AVSS in a manner similar to connecting to the local AVSS.

The preceding discussion has centered on a first embodiment of the present invention. Alternative embodiments contemplated by the teachings herein disclosed include: the attachment of A/V files by means of pointing to file locations as opposed to direct use of MIME systems; invocation of one or more of the previously discussed processes at the opening or closing of an attachment, or the opening or closing of a message; A/V network and server socket management schemes; video viewer and location and close management methodologies; and screen cleanup and connection management methodologies.

4.16.2 Video Answering System

The video answering application utilizes the AVSS to record an audio and video message from an incoming caller whose call attempt is either not answered or is refused by the recipient. The present invention also contemplates the incoming caller simply wishing to leave a message without connecting to the recipient. One implementation of this feature of the present invention supports the case were no A/V codec trunks are available at that the time when a call is placed to a user. The video answering system includes several major components: an answering module; a browser module; a playback module; and a module wherein file transfers are potentially handled among AVSSs.

The principles of the present invention contemplate several methodologies whereby the video answering application is invoked. One way of invoking video answering is to provide an option to a caller at any time during the "ring" cycle to leave a message for recipient. Additionally, a caller may be presented the option for leaving the message in any of the following cases: after a specified duration of a ring cycle, i.e., a ringing time-out; when a call is refused; and when the caller receives a busy signal due to an excessive number of waiting calls.

When this application is invoked, the caller may be given the option of leaving a message in a number of ways. Such notification methodologies include, but are specifically not limited to: simple text notification; simple audio tone; an audio-only greeting; a video-only greeting; an audio-video greeting, and a multimedia greeting. The decision to implement any of these notification methodologies depends on several factors including available storage capacity, bandwidth, desired system response parameters, desired system "look and feel," as well as other system constraints well known to those having ordinary skill in the art.

Several implementations contemplated for WAN installations include alternatives for placement of the user greetings, which alternatives include user greetings located on the user's AVSS, or alternatively be distributed to each AVSS on the WAN to be stored locally thereat. These alternatives depend on many systems installation factors including the number of users, system usage, bandwidth, and so forth. With respect to message authoring, the message may be recorded locally and sent to a remote site as in video mail, previously discussed. Alternatively the system may be configured such that it establishes a direct link to the receiving AVSS and the message is recorded on the received side. This later implementation results in more assuredly prompt delivery of the message, but requires more immediate bandwidth.

The caller may explicitly choose to not to leave a message by means of either a specific response to a dialog box, or simply by activating the hang-up button on the call viewer.

One implementation of this feature the present invention provides a caller with the opportunity to leave a message automatically either as part of an existing call status, e.g.: a user busy pop-up, with the automatic playing of a pre-recorded video greeting, or other automatic message system invocation methodologies. Once the user accepts the option to leave the message, a record session request is passed to the AVSS. When the request is granted, an MCG is provided, and an AVNM connection is established. In the event that the recipient attempts to answer the call when the caller is recording the message, a non-destructive escape is provided which enables the caller to complete the message and then connect the call to the called party. A similar non-destructive escape is utilized when the called party attempts to call back when the message recording is a process. The principles of the present invention further contemplate a destructive escape if the caller wishes to abandon the message during the recording session. Finally, in the event that the AVSS has insufficient resources to grant the record request, a fall back mode presents the caller with the option to leave a non-video message. Such a non-video message is provided by the "Leave Word" function of the incorporated reference.

In one embodiment of the present invention, recipients are notified when there are messages present in their respective queues. Since there could be more than one message in queue at any given time, the video answering system provides a browser to enable the recipient to review the messages waiting in her queue. The browser can display information about the video messages, including, but not limited to: caller's name, time and date of call, video file name, playback duration, description, text note from caller, and creation time of video. Finally, a playback mode is provided to enable the recipient to play the messages selected for viewing.

File ownership in the video answering application is as follows: When a message is being authored, the file is owned by the message's author. When the message is being reviewed, file ownership passes to the recipient, as identified by the AVNM.

Figure 35:
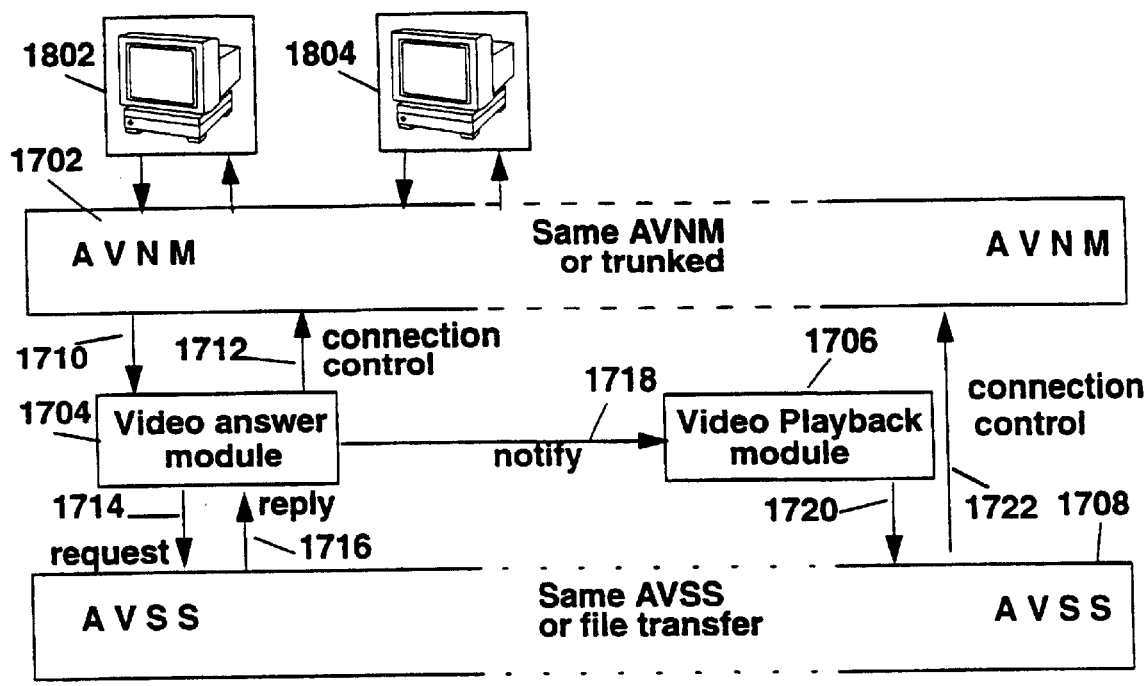
FIG. 35 is an overview of one embodiment of the video answering system of the present invention.

Referring now to FIG. 35, an overview of one embodiment of the video answering system of the present invention is discussed. When a caller, for instance at workstation 1802, calls a recipient, for instance the user at workstation 1804, and the video answering system is invoked as previously discussed, a request is sent from workstation 1802 to AVNM 1702. AVNM 1702 then forwards a request at 1710 to video answer module 1704, which in turn submits a session request to AVSS 1708 at 1714. Responsive to session request 1714, AVSS 1708 provides a reply, 1716, to the video answer module.

Responsive to reply 1716, the video answer module 1704 establishes, at 1712, a connection control with AVNM 1702 and notifies video playback module 1706 of the establishment of a video answering session at 1718. Responsive to this notification, video playback module 1706 submits its own session request to AVSS 1708 at 1720. Responsive to this session request, AVSS 1708, at 1722, establishes a second connection control with AVNM 1702 at 1722.

Figure 36:
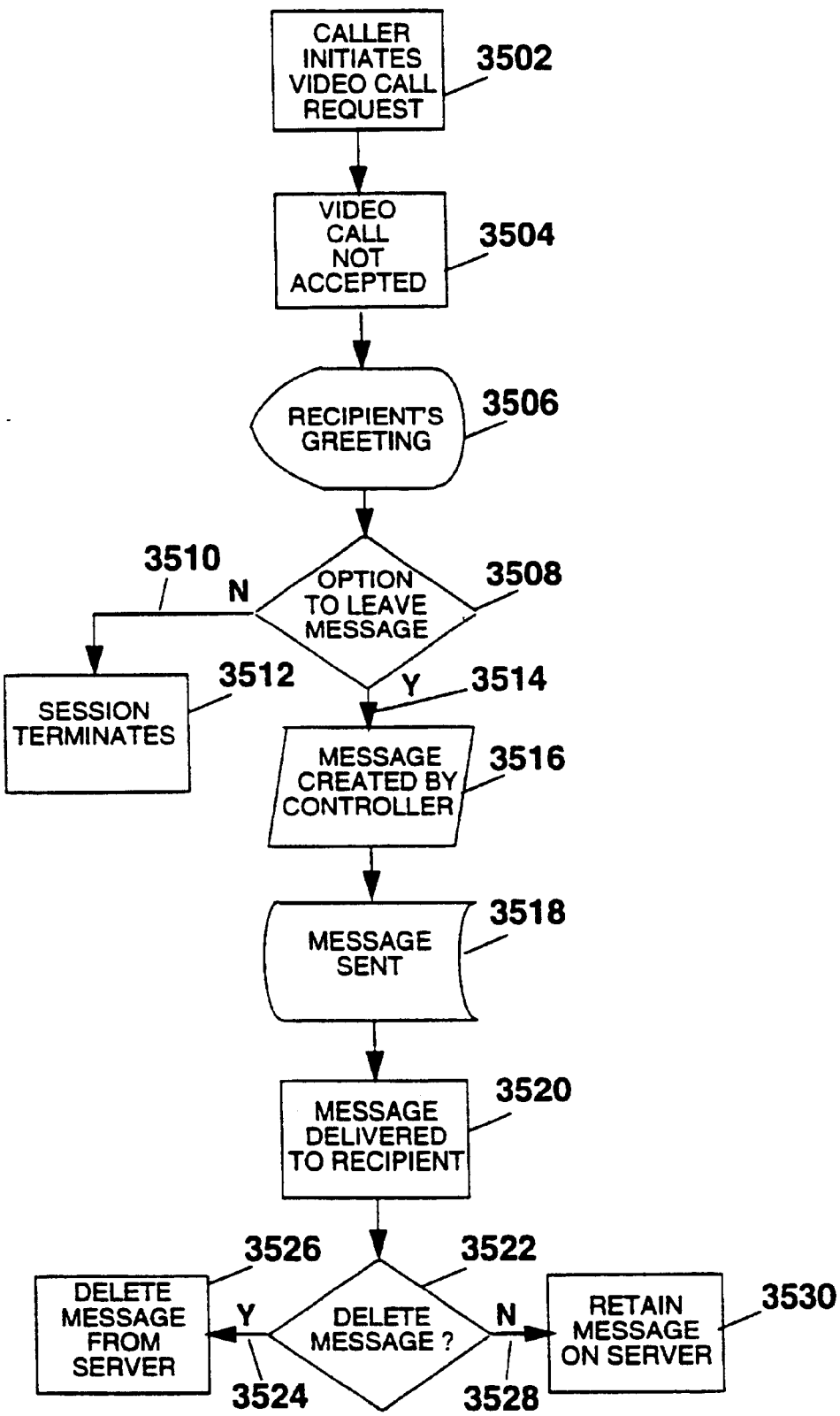
FIG. 36 is a data flow diagram detailing the operation of one embodiment of the present invention.

A data flow diagram detailing the operation of one embodiment of the present invention is given at FIG. 36. Having reference to that figure, a caller initiates a video call request at 3502. When the video call request is not accepted at 3504, the recipient's greeting is invoked at 3506. As previously discussed, the video call request may not be accepted for a number of reasons, including but specifically not limited to: the caller exercising her option at any time during the "ring" cycle to leave a message for the recipient; after a specified duration of a ring cycle, i.e., after a ringing time-out; when a call is refused; and when the caller receives a busy signal due to an excessive number of waiting calls.

If the video call is not accepted, the recipient's greeting is played at 3506 and the caller is presented, at 3508, with the option of leaving a message for the recipient. This option may again be presented in a number of manners, by way of example but not limitation including: a simple text notification; a simple audio tone: an audio-only greeting; a video-only greeting; an audio-video greeting; and a multimedia greeting. If the user, at 3510, exercises her option not to leave a video message, the video answering session terminates at 3512. In the alternative, if the user exercises her option, at 3514, to leave a video message, she may create the message at 3516 in any of the manners previously discussed for the creation of video messages.

Responsive to the creation, by the caller, of the video message at step 3516, at 3518 the message is sent to the appropriate AVSS. At some later point in time, the message is delivered to the recipient at 3520. Subsequent to the recipient invoking a browser, reader, or other file inspection methodology for the purpose of reading the message, not shown in this view, the user is presented with the option, at 3522, of deleting the message.

In the event the recipient elects, at 3524, to delete the message, it is deleted from the AVSS at 3526. In the alternative, where the recipient elects, at 3528, not to delete the message, it retained on the AVSS at 3530.

The principles of the present invention contemplate two broad strategies for implementing the video answering system taught herein. A first broad strategy implements a "layered" methodology, integrating a number of applications, some of which may be preexisting, into the video answering system of the present invention. One such layered implementation contemplates the use of the previously discussed video mail application as a message handling vehicle. This embodiment inherently defines many of the major file ownership issues. Further, the previously discussed authoring, browsing, playback, and notification functions are all provided by the video mail application itself. Another version of a layered implementation contemplates the utilization of a dedicated instance of a conventional email system program to provide dedicated video answering system message notification and browsing.

A second broad strategy contemplates the creation of a unique "stand-alone" application to perform the previously defined functions. This strategy, which does not utilize video mail or other program as a message handler, requires the implementation of user interfaces to present the caller with the option of leaving a message. Moreover, such an implementation requires non-mail software and new user interfaces to accomplish the tasks of message notification, message browsing, and message playback.

4.16.2.1 Layered Implementation of Video Answering System

This implementation contemplates the use of the previously discussed video mail application, or other discrete application as a message handler or other system element for the video answering system. According to this strategy, after a video connection has been established responsive to a video call not being accepted, video mail can be authored on either the transmit side, i.e., the caller's AVSS, or on the receive side, i.e., the recipient's AVSS. Which implementation constitutes the embodiment is an economical decision, based on a number of system-specific factors.

Video mail created responsive to the video answering system can be transmitted to the recipient off-line, i.e. in a non-real-time mode. This implementation would likely have minimal impact on system bandwidth in most embodiments. One option for this implementation is to author on the send side, and utilize a priority queue to transmit the message during a period of low bandwidth utilization to the recipient's AVSS. This moves the message out of real time and transmits it at a lower bit rate than authoring on the receive side, which would necessitate full-bandwidth connectivity. The alternative to this latter embodiment is of course to author video mail messages responsive to video answering system invocation on the receive side or transmit the message at the same baud rate as in video conferencing. Either embodiment is a systems administrator issue: conservation of bandwidth against a degree of time delay in the message responses. Where messages are needed almost immediately, the expense of bandwidth may be necessitated.

Where the video message system is invoked responsive to the fact that no communications trunks are available between sites, it may still be desirable to leave a message in any event, for later transmission when communications become available. This functionality may be enabled by a script provided by the system administrator or other automated invocation methodology known to those having ordinary skill in the art.

Where the enterprise is not too large, all greetings files from all users could be stored at all sites. Greetings files from all users at all sites enables a rich environment for video answering, where, even when there are no communications trunks available, a caller is greeted with an audio-visual greeting from any recipient. Again, this is an issue of capability versus storage capacity. Accordingly, the system administrator can determine where greetings are stored in accordance with the principles of the present invention.

Where an enterprise generally experiences low communications volumes, messages can be recorded on the receive side to good effect. This embodiment minimizes time delays in getting mail messages to the recipients. Even in this embodiment, where trunks become unavailable, or encounter periods of high use, the message can be recorded on the callers side under control of a script, and then sent as a mail message when bandwidth is available.

Other modifications to this embodiment include giving the caller the option, on the GUI, of prioritizing her message. When sending a file, e.g. an MPEG file, use of video mail enables a caller to transmit the file as a response to an answering machine response.

There are video mail systems that are entirely separate from video conferencing systems. For example, when a caller is recording a video mail message, she may be recording it in MPEG-1 video format. When a caller is talking to a recipient in real time, she may be sending video in, for example, H.320 format. The principles of the present invention contemplate the implementation of video answering by invoking video mail in such a way that it doesn't use H.320. Alternatively, where H.320 is recorded, the principles of the present invention specifically contemplate the use of this same "live" format for both recorded and real time video applications. This implementation further contemplates the utilization of bandwidth management techniques, recording schemes, and video compression algorithms to minimize the bandwidth impact of the relative large video messages engendered by the use of H.320 format video, as well as some other video formats.

The use of video mail as the message handler for the video answering application presents an additional complication in that it can be recording on the caller's side or on the recipient's side. The latter option ties the application more closely to the act of calling the recipient, thereby ensuring prompt delivery. In one embodiment of the present invention, a call-back feature is implemented, which automatically initiates a call back to the sender to talk to them in real time, or a reply-back feature, to which automatically invokes video mail to enable the recipient of a video message to reply with a video message of her own.

Where video mail is utilized, an attachment, for instance a MIME attachment constructed as herein after discussed, may be included in a caller's message to the recipient, the activation of which enables the recipient to return the call of the original caller. Such a MIME attachment could initiate a dialog box or button which, when activated, launches a reply call and/or message response. This provides a replacement for the "Leave Word" function taught in U.S. Pat. No. 5,617,539. Alternatively, the principles of the present invention contemplate having the "Leave Word" function implemented, using it to notify the recipient of the receipt of a message, and where it can be found, e.g., the recipient's mail queue. Alternatively, the "Leave Word" function could enable querying the message from the mail queue, or it could have an entirely separate account only for video mail.

4.16.2.2 Stand-alone Implementation of Video Answering System

In contrast to the previously discussed layered implementation of this application, an alternative embodiment of the present invention is characterized by being a stand-alone implementation of the video answering system of the present invention. This embodiment does not utilize any other programs, such as video mail, to provide the requisite message handling or other features of the video answering system. Many of the previously discussed engineering choices pertain to this embodiment, including but not limited to greetings used; location of stored greetings; how the greetings are transmitted; and whether messages are recorded remotely or locally. Because this embodiment does not utilize the functionality of other programs, these system engineering choices are not dependent on the message handling system of such an application to implement the answering machine function.

Additionally, the GUI can be better tailored to its function as an answering machine when a stand-alone version is implemented. The stand-alone strategy obviates the need for the recipient to go to the mail system to check her mail file, or any other file specified for answering machine messages. This points out an inconvenience in those versions of video answering which implement video mail as a message handler: these implementations act more like mail systems and less like answering machines. The stand-alone version has an increased potential for being more responsive to the user with fewer intermediate steps for the user to perform in order to access, review, and process her video answering system messages. A video mail-based system is set up as a stand-alone messaging environment, while an answering machine could be more easily tuned to the fact that the recipient had been called and been left a message. This makes the answering machine function much easier to use, and, in most implementations, has at least one less layer than mail system-based implementations. Moreover, the use of video mail-based systems may present limitations on greetings, file, and recording locations, etc.

Another consideration is that, in some organizations, mail and answering machine functions may have very different urgencies. Accordingly, a call message may have a corporate priority above video mail messages. Where this is the case, answering system messages should be easier to get to, easier to review, and easier to respond to than mail messages in these organizations. In contrast, mail messages are more like memos: they are generally more thoughtfully produced documents. Moreover, mail messages not only have mail browsers associated therewith, but they typically also have one or more text fields. Accordingly, use of video mail as a message handler would likely present the recipient with one or more blank text fields when an answering machine message is displayed.

As the use of a stand-alone answering system removes the extra layers inherent in the previously discussed video mail-based application, the recipient can see a listing of those persons who had called, like in the Leave Word function of the incorporated reference. This presents the user with the option of simply replying to the message by returning the call or by clicking on the entry to see what had been left in the answering machine messages: video; audio; or a combination thereof. In any case, response can be by message or by call. Accordingly, this embodiment contemplates the inclusion, in the message transmitted responsive to the video answering machine, of a broad array of video, audio, text, and multimedia attachments therein.

4.16.3 Video Conference Recording

The Video Conference Recording application allows users to record the audio-video portion of audio-video conferences.

In conference recording for a call or conference of N participants, there are potentially N+1 possible viewpoints to record from: the conference as viewed by each individual and the conference as viewed as a sort of composite "global view", which comprehends the combined views, audio, video and multimedia, of all the conference participants. The most comprehensive form of a "global view" would be provided by recording each participant's video and audio separately in multiple concurrent record sessions, for later combination and playback.

Although this extremely comprehensive embodiment would enable a reviewer to freely look back at each participant in full detail at any time, this approach is very re-source and disk-space intensive, as it requires a separate record for each participant. While the principles of the present invention specifically contemplate such an embodiment, for all but the most massively implemented hardware suites it will be appreciated that combining the several participants' views into a single global view file is generally preferred, as it is far less resource intensive. Accordingly, it will be appreciated that there is a strong overhead cost basis for recording only one "global view" video and audio signal.

Referring now to FIG. 37, an overview of the video conference recording application of the present invention is discussed. When the user, for instance 1802, desires to invoke the video conference recording feature taught herein, a request is sent to the AVNM 1810. AVNM 1810 then forwards a request at 1812 to video conference recording application 1830 to initiate a conference recording session. Video conference recording application 1830 then submits a session request, 1814, to AVSS 1816. AVSS 1816 establishes connection control at 1818 with AVNM 1810. Video conference recording application 1830 also allocates a conference bridge at 1820 to AVNM 1810.

A user invokes, at 1806, a browser 1821 which in turn invokes a video playback application 1822. Invocation of video playback application 1822 initiates a session request at 1824 to AVSS 1816. Responsive to the session request, AVSS 1816 establishes connection control at 1820 with AVNM 1810.

Referring now to FIG. 38, an overview of several of the components of the present invention required to implement video conference recording is discussed. Having reference to that figure, a first workstation 1802 can comprise any of a number of the previously discussed workstation implementations including camera 2302, microphone 2304, monitor/video card 2306, and speaker 2308. These components may optionally be connected by means of cabling, or other connection means known to those having ordinary skill in the art, to additional hardware element add-on box 2310 which in turn is connected with MLAN switch 2206. While the present invention contemplates the incorporation of a number of workstations to MLAN switch 2206, only a second workstation, 1804, is shown in this figure for purposes of illustrational clarity. Those having ordinary skill may art will recognize that a number of workstations may be so connected.

MLAN switch 2206 is connected with AVNM 1810, not shown in this view, at 2332. A conference bridge 2208 and AVSS 1816 are severally connected to MLAN switch 2206. Conference bridge 2208 further comprises a transceiver set 2336 in operative combination with MLAN switch 2206. Connected to transceiver set 2336 are video switch 2340 and audio mixer 2342. Further connected to video switch 2340 is a video mosaic generator 2346.

AVSS 1816 includes a further transceiver 2352, an encoder 2354, and a decoder 2356. A storage device, 2408, is coupled with encoder 2354 and decoder 2356.

When a point to point, or two-party, video conference is established, point-to-point connectivity is established between workstations 1802 and 1804 through MLAN switch 2206, as shown in FIG. 39. A video signal 2902 is transmitted from camera 2302 of workstation 1802 to monitor 2320 of workstation 1804. Moreover, an audio signal 2904 is transmitted from microphone 2304 to speaker 2322 of workstation 1804. Similarly, camera 2316 of workstation 1804 transmits its video signal 2906 to monitor 2306 of workstation 1802, while microphone 2318 transmits its audio signal 2908 to speaker 2308. Having continued reference to that figure, the simple implementation of a conference between two users does not invoke either conference bridge 2208 or AVSS 1816.

The inclusion of a third party, or the implementation of the video conference recording request, invokes a conference bridge 2208 as shown in FIG. 40. While this figure may be used to illustrate the principles of a multi-party conference call, only two workstations are illustrated herein for purposes of clarity. Having continued reference to the figure, the invocation of conference bridge 2208 is shown. In this case audio signals 3002 and 3004 are transmitted by means of MLAN switch 2206 through transceiver 23.36 to audio mixer 2342, and thence to their respective recipients. In similar fashion video signals 2508 and 2502 are transmitted through MLAN switch 2206 through transceiver set 2336 and video switch 2340 to video mosaic generator 2346. Mosaic generator 2346 transmits a signal including a mosaic video, 2510, showing all users to video switch 2340. Video switch 2340 then splits this video signal into signals 2506 and 2506'.

When a user initiates a video conference recording request, the signal processing is substantially similar to that shown in FIG. 40, with the additions illustrated in FIG. 41. Having reference to the latter figure, a third video signal 3104, again comprising video mosaic 2510, is split at video switch 2340 and transmitted through MLAN switch 2206 to AVSS 1816. Similarly the audio signals 3002 and 3004 are combined by the audio mixer 2342 producing a summed audio signal 3102. Summed audio signal 3102 is transmitted through MLAN switch 2206 to AVSS 1816. The video mosaic 2510 and summed audio signal are received at transceiver 2352, encoded at encoder 2354, and stored on storage device 2408. A subsequent request from a user for information stored on storage device 2408 is transmitted by means of decoder 2356 through MLAN switch 2206 and thence to the requesting users workstation.

The present invention contemplates that a user may select between any of a number of video representations made available by mosaic generator 2346. By way of illustration, but not limitation, three such alternatives are shown in FIGS. 42, 43, and 44. The previously discussed scenario is shown at FIG. 42 wherein user 1, user 2, and the AVSS all see a mosaic of both users. Referring now to FIG. 43, the view presented to each user, at their selection, is that of a close-up of the other user. Despite this selection, the AVSS continues to receive a mosaic of all users. Referring now to FIG. 44, user 1 in this view sees a mosaic of himself and user 2, and user 2 sees a close-up of user 1. As before, the AVSS continues to receive a mosaic of all users being recorded.

The logic required to implement the previously discussed video conference recording application is presented in the data flow diagram of FIG. 45. This logic may be implemented as software, hardware, firmware, or any combination of the foregoing. Having reference to that figure, a video conference recording request is initiated at 3402. The principles of the present invention specifically contemplate a number of methodologies for initiating this request. One such methodology has been previously discussed, wherein a given user initiates a request for video conference recording. Such a request makes usable the recorded video conference to any user having permission thereto. An alternative to this embodiment contemplates the situation wherein, for legal or record purposes, it is desired that all video conferences be recorded. In this alternative, the administrator having administrative responsibility for the system taught and disclosed herein may mandate, at her option, that video conference recording be implemented for all video conferences conducted, or for certain specified video conferences, for instance between a specified set of users.

Once the video conference recording request 3402 is initiated, video conference recording application 1830, not shown in this view, is initiated at 3404. When a conference bridge was not previously allocated, such a conference bridge is now allocated at 3406. The initiation of the conference recording application initiates an AVSS session request at 3408 which in turn establishes connection control with AVNM 1810 at 3410. This in turn enables AVNM connectivity with the users at 3412.

Conference bridge allocation 3406 enables the establishment of a network A/V connection from a MLAN switch 2206, not shown in this figure, at 3414. Video signals are transmitted to video switch 2340 at 3416, which in turn transmits the signals to mosaic generator 2346 at 3420. Mosaic generator 2346 in turn transmits the mosaic video back to video switch 2342, at 3416, from whence the mosaic video 2510 is transmitted to the user's and AVSS 1816 at 3418.

Referring again to step 3414, audio signals are transmitted to audio mixer 2342 at 3422. Audio mixer 2342 sends the summed audio signals at 3426 to AVSS 1816. As shown at step 3424, audio mixer 2342 further transmits to each user a copy of the summed audio signal, less that user's own audio signal.

At this point mosaic video and summed audio are stored on storage device 2408 at step 3430. When a user, having permissions, desires to access recorded video conference information, he may do so by means of browser 1821 invoked by MCG, not shown in this view, or other user interface at 3450. Browser 1821 then accesses video playback application 1822 at 3452. Step 3452 in turn initiates another AVSS session request at 3408, enabling multiple concurrent recording and playback sessions by authorized users.

Referring now to FIG. 46, the playback of recorded Video conference calls is explained. A previously recorded conference call is stored on storage device 2408 of AVSS 1816. When playback of the conference call is invoked, it is transmitted at 4170 through decoder 2356, which separates the recorded conference call into its composite video and audio signal components, 4180 and 4182 respectively. In the exemplar presented in FIG. 46, only two conference participants, at workstations 1802 and 1804, are shown for purposes of illustrational clarity. Of course the principles of this embodiment of the present invention contemplate a larger plurality of user workstations.

Video signal 4180 is transmitted through MLAN switch 2206 to transceiver 2336, and thence through video switch 2340 to mosaic generator 2346. Note that mosaic generator has inputs for each N conference participant plus one for video signal 4180. In this manner, previously recorded video conferences are treated as additional conference participants during playback. The output from mosaic generator 2346 is a mosaic 4190 having N+1 frames: one for each participant, plus one for the recorded conference being played back. The output from mosaic generator 2346 is transmitted to video switch 2340, where it is split into two video signals, 4188 and 4188' and transmitted to workstations 1802 and 1804 as shown.

A corresponding audio signal 4182 is simultaneously transmitted through MLAN switch 2206 and transceiver set 2336 to audio mixer 2342. Audio mixer 2342 sums the audio inputs, 3004 and 3002, from users at workstations 1802 and 1804 respectively with audio signal 4182 in the following manner: a first summed audio signal, 4184, is transmitted to a first user at workstation 1802, and is composed of the sum of audio signals from a second user at workstation 1804 and from the recorded video signal 4182. A second summed signal 4186 is transmitted to a second user at workstation 1804, and is composed of the sum of audio signals from the first user at workstation 1802 and from the recorded video signal 4182. In this embodiment, note that in each case the workstation's own signal is not transmitted back to that workstation for purposes of improving audio clarity, but that the summed signal contains only audio from other "participants", which includes the signal from the recorded conference. The system may also maintain a summed audio signal for all participants.

From the foregoing, the following features and advantages of a first embodiment the present invention are shown:

1. The "global view" of the sum of all user's audio signals is used by the Video Conference application so as to capture all parts of the conversation.

2. For multi-point conferences, the "global view" for both audio and video is readily obtained from the conference bridge hardware in the following manner:

A. Global view video is naturally produced by the video mosaic box.

B. Global view audio is provided by a special mix in the audio matrix mixer. This "global" mix is exactly the one used in ganging distributed conference bridges. In other words, the "global" mix is the audio signal recorded. A subset of the global mix is sent to each of the conference users.

This subset includes the global mix less the user's own audio signal. This is necessary in order to preclude "echoing" and other adverse audio effects.

Each user is provided with a choice between global view video and a selected close-up view. This feature is enabled by the standard MCG.

3. For point-to-point calls (i.e., a two-user conference), a signal capturing global view is generally not inherently available from within the hardware layer and is synthetically created as described.

In multi-party conferences, a conference bridge is automatically allocated. Where a single global viewpoint is to be recorded, two-user calls mandate that a conference bridge be allocated by the video conference application. This conference bridge is most efficiently used if it comes from the same pool used for real-time multi-party conferences.

In the case of protracted conference recordings it may be desirable to "tag" points in time where certain discussion events occurred. One embodiment of the present invention contemplates the use of such tags. Tags are preferably given a unique identifier, for instance a searchable text label or letter, whereby a specific discussion event is uniquely identified.

A user interface is provided to invoke and name a conference recording, and to invoke and operate the tag interface, where implemented. Additional user interfaces are implemented on the MCG for message notification; message browsing; and invocation of message playback.

It should be further noted that the conference bridge is not sensitive as to the nature of the input source. Accordingly, by way of illustration but not limitation, input can be by means of security camera, VCR, or substantially any other video or audio source, and so forth. Moreover, a conference call can specifically include a previously recorded video file All these inputs can be recorded as they are discussed. From this, and as previously discussed, it follows that the system enables multiple simultaneous source sessions: e.g.: one or more recording sessions and one or more playback sessions, and they are all completely independent. Each is connected to the conference bridge, and the user interfaces are available to one or more users during the video meeting.

The Video Conference Recording application previously discussed utilizes and implements the following capabilities:

1. Generic control protocol interface/API.

2. A generic multi-platform audio-video recording/playback utility referred to herein as the "mode control GUI" or "MCG".

3. Multi-session recording/playback capability.

4. Analog audio-video input and output.

5. A decoder co-allocated when an encoder is allocated. This ensures that the decoder is always available during the record session for review.

6. Variable capacity scaling to match the needs of supported applications, and hardware configurations.

Moreover, the following capabilities may be required or advantageous, depending on how wide-area calls are handled, or where architecturally convenient.

7. File transfer capability (pull model) among AVSSs driven by specific file transfer requests made by applications.

8. Effective "loopback" at the AVSC of incoming video to outgoing video during record mode.

9. A video editing capabilities. This capability may be internally implemented as part of an applications program, or in the alternative, may be capable of invoking third party video and/or audio editors.

4.16.4 Video Documents

The Video Documents application allows stored video files to be included in an on-line electronic document such as Word™ or Framemaker™. This can be used for many enterprise-wide applications including, but not necessarily limited to: training, corporate memory, procedures, references, marketing, and so forth. There are also many potential overlaps with the Intranet and Internet, as discussed below.

One embodiment of this feature of the present invention is shown in FIG. 19. Having reference to that figure, substantially any archival video are combinable with text or documents. Moreover, the principles of the present invention comprehend video overlay graphics, which overlay the video, as well as a compendium of a plurality of video files which further include additional text or graphics, standalone videos, and MIME attached video files. Accordingly, the video document may bring up a video window alongside the document as viewed by the user, or overlaying the document, which enables the user to play the video while viewing the document. Video can come from any previously discussed source. Videos in a video document are sharable during a conference call or by video mail or messaging.

An embodiment of the present invention contemplates attaching the viewer to a message as a MIME or other functional attachment. A given call may be expanded to include other participants and other mechanisms to merge the document into a running conference. In other words, by the establishment of another concurrent session. This is more than simple video as it enables synchronized graphics either overlaying the video or accompanying the video.

Of course, any such implementation which necessitates the interface with third-party software raises some interoperability issues. Some of these issues include:

The necessity, in some implementations, to make available an additional document type for the supported package using MIME extensions.

The workstation Conference client video window and the MCG may be used for video delivery. However, in some applications of the principles of the present invention, it may make more aesthetic sense to include the video window and some associated controls, e.g., the playback control, in the document itself. One means of implementing this feature would be as a graphics type within an anchored frame.

The necessity, in some implementations, to capture both "video type" delete events and "entire document" delete events so as to not fill the file system with unused video files.

The necessity, again, in some implementations, for an automatic file transfer or user-warning mechanism to ensure that video files are transferred when the document is transferred to a domain not served by the authoring AVSS.

Each of these issues is, of course, highly application specific. The implementation of specific solutions thereto is within the purview of those having ordinary skill in the art, in light of the teachings herein enumerated.

The system can support video document applications either using conventional third-party document systems or document systems enhanced to offer the ability to obtain and or file copy events from the document system.

The present invention can use word processing GUIs and the MCG. Accordingly, additional user interfaces are not required.

The Video Documents application requires the following capabilities:

1. Generic control protocol interface/API.
2. A generic multi-platform audio-video recording/playback utility (similar to vfstool) referred to herein as the "mode control GUI" or "MCG".
3. Multi-session recording/playback capability.
4. Analog A/V I/O.
5. An AVSC decoder is co-allocated when an encoder is allocated. This ensures that the decoder is always available during the record session for review.
6. Variable capacity scaling to match the needs of supported applications.
7. File transfer capability (pull model) among AVSSs driven by specific file transfer requests made by applications.

8. Effective "loopback" at the AVSC of incoming video to outgoing video during record Additionally, the following feature is required to include other video file sources:

9. The capability to accept and playback appropriate digital files from third parties as controlled by applications.

Finally, in a first embodiment of the present invention, in order to support Internet access, the following feature is required:

10. The capability to transfer appropriate digital files to third parties as controlled by applications.

12. A video editing capabilities. This capability may be internally implemented as part of an applications program, or in the alternative, may be capable of invoking third party video and/or audio editors.

4.16.5 General Purpose Video Storage

In many cases there are needs for less sophisticated "raw" video storage capabilities reachable from workstations over the video distribution network. These "raw" needs amount to the functionality of a network-accessible VCR or writable laserdisk with its information organized according to file system conventions. Sources for the stored video content may be, for example, clips from broadcast news programs, copies of camcorder footage, captured segments from videotapes, video files transferred from the CDs, DVD, or the Internet. Although user workstations are likely involved with the acquisition, capture, or transfer of such video information (via auxiliary audio/video input jacks at the desktop workstation, file transfer actions, etc.), in general the genesis of this class of video is in contrast video captured from video calls, video conferences, message authoring, or video document authoring. Further, the storage of this class of "raw" video information would not support supplementing the video with any annotations, text, shared graphics, etc.

Current trends in computing lead users to treat such "raw" video clips as any other file in their networked computing environment, freely copying individual copies of large video files and storing them on local disk or in standard data-network file servers. Such an approach has several disadvantages:

such video only available at workstations with decoding capabilities for the needed video protocol and file format data networks and standard data file systems get heavily loaded given even a modest amount of video usage large numbers of private copies of large video files load local disks and file servers even further by huge multiples.

It is obvious to one skilled in the art that the current invention easily addresses these shortcomings by offering:

centralized shared encoding, decoding, and transcoding moving video over appropriate video-engineered networks rather than data networks sharing of a small number (one to a few) of these large-size files across the entire community of users who need access to the file still permitting file-transfer and digital streaming where required or desired.

To do this, the video file formats used must match those supported by the AVSS.

By appropriately designing the invention's handling of this class of video information, the video information can be freely exchanged with other types of applications. For example, subject to file permissions, video information can be exchanged between "raw" video clips of the general purpose video storage application and other AVSS applications:

- a "raw" video clip can be incorporated into a videomail message, video document, video publishing applications, video web pages, etc.
- a "raw" video clip can be viewed within a video call or conference
- any video captured within a recorded video call, recorded video conference, video message, or other networked video applications could be captured as a "raw" video clip.

In some situations such exchange of video information between applications would involve an entire unaltered video file. The actual methods for the exchange for this case can be accomplished in at least one of two ways:
- creating a new application-owner of the existing file
- playing back the file as rendered video which is then re-recorded, possibly during viewing, by another networked video application Other methods are also possible for one skilled in the art.

In other situations, only segments of an original video file are to be transferred between applications, or other edits of the original video file may be required. For these cases, the actual methods for the exchange could include at least one of the two following ways:
- use of a video file editor on the existing file to create a new (edited) file, and assigning the appropriate application-owner to this new file
- playing back the file as rendered video and, during viewing, re-record selected segments by means of another networked video application.

Other methods are also possible for one skilled in the art.

The General Purpose Video Storage application requires, in most implementations, the following capabilities:
1. Generic control protocol interface/API.
2. A generic multi-platform audio-video recording/playback utility (similar to vfstool) referred to herein as the "mode control GUI" or "MCG".
3. Multi-session recording/playback capability.
4. Analog A/V I/O.
5. An AVSC decoder is co-allocated when an encoder is allocated. This ensures that the decoder is always available during the record session for review.
6. Variable capacity scaling to match the needs of supported applications.
7. File transfer capability (pull model) among AVSSs driven by specific file transfer requests made by applications.
8. Effective "loopback" at the AVSC of incoming video to outgoing video during record.
9. The capability to accept and playback appropriate digital files from third parties as controlled by applications.
10. The capability to transfer appropriate digital files to third parties as controlled by applications.
12. A video editing capabilities. This capability may be internally implemented as part of an applications program, or in the alternative, may be capable of invoking third party video and/or audio editors.

In some limited domain cases, only features 1–8 may be required.

4.16.6 Intranet Video Storage Utility

Intranet refers to the use of Internet utilities, such as web pages, web browsers and web sites, as a means for distributing enterprise-internal information. In that web page authoring tools commonly accept MIME attachments, clearly the AVSS video MIME attachment service primitive can be used in a web page within an enterprise outfitted with the invention. As shown in FIGS. 3 and 4, the AVSS can readily be connected with the Internet to facilitate the use of its capabilities with web pages and other Internet utilities.

Use of the AVSS video MIME attachment allows not only the attachment of video clips to arbitrary intranet web pages but also any other features that could be included in the MIME attachments, such as synchronized shareboard sessions, discussed later). Further, as any AVSS video file or AVSS MIME attachment can, subject to permissions, be transferred easily from AVSS-application to AVSS-application, the intranet can serve as another useful enterprise-internal video publishing method.

It should be noted that other types of AVSS-based video applications could be written to serve as web page building blocks by those skilled in the art. Thus, the AVSS advantages described above can be obtained by those skilled in the art via means other than the AVSS MIME attachment.

The Intranet Video Storage application enables raw audio-video files as well as video documents be stored, searched, and accessed within the enterprise, in accordance with Intranet browser interfaces and other conventions.

The General Purpose Video Storage application requires, in most implementations thereof, the following capabilities:
1. Generic control protocol interface/API.
2. A generic multi-platform audio-video recording/playback utility (similar to vfstool) referred to herein as the "mode control GUI" or "MCG".
3. Multi-session recording/playback capability.
4. Analog A/V I/O.
5. An AVSC decoder is co-allocated when an encoder is allocated. This ensures that the decoder is always available during the record session for review.
6. Variable capacity scaling to match the needs of supported applications.
7. File transfer capability (pull model) among AVSSs driven by specific file transfer requests made by applications.
8. Effective "loopback" at the AVSC of incoming video to outgoing video during record
9. The capability to accept and playback appropriate digital files from third parties as controlled by applications.
12. A video editing capabilities. This capability may be internally implemented as part of an applications program, or in the alternative, may be capable of invoking third party video and/or audio editors.

In some limited domain cases, only features 1–8 may be required.

4.16.7 Internet Gateway

Current trends in desktop computing technology, networking, and Internet usage has just started the emergence of video files and streaming over the Internet. These few early video exchanges are essentially all low resolution and usually low frame-rate, hence the resulting impact on limited Internet bandwidth, limited corporate network bandwidth, and limited enterprise file system space has been noticeable but manageable. As video rapidly increases in importance to business, limited Internet bandwidth, limited corporate network bandwidth, and limited enterprise file system space will be immediately taxed. Also to be noted is that increasing business use of video will demand increasing resolution and frame-rate, ballooning the bandwidth and file size requirement for each second of video information. Finally, current trends continue to encourage a plethora of video standards and protocols; to support all of them and their respective evolutions at each desktop workstation demands costly computing power, applications software, dedicated hardware, and administration; in many enterprises, this is completely intractable.

As shown in FIGS. 3 and 4, the AVSS can readily be connected with the Internet. With this connectivity, the AVSS can be used as a gateway for incoming Internet video streams (which it can read into and thus convert into a file) as well as a proxy-server for incoming video file transfers from the Internet. Once these resulting video files are in the AVSS, perhaps initially captured as "raw" video (as described earlier), they then can be viewed at user workstations or used in other AVSS applications. The AVSS can provide any transcoding operations that may be needed. This approach permits, at no appreciable additional cost, an enterprise outfitted with the invention to pull in large amounts of video information from the Internet, store it economically, and make it available to any user with a workstation fitted with the invention's low-cost audio-video networking hardware and software.

The AVSS can also be used as a repository for video files accessed outside the enterprise via the Internet. The simplest implementation of this nature would simply make "raw" video files available on the network. This could be extended to include annotation animations, generated for example by shareboard or a similar data-sharing application; such annotation animations could in fact be available stand-alone or temporally synchronized to audio, video, or audio-video material. Software viewers and players (with software-only video decoding, for example) could be created as application software for use with, or incorporation into, Internet browsers. The software viewers and players can be implemented and deployed in various ways in a manner readily understood by those skilled in the art, for example:

- an applet downloaded from the server over the Internet
- a full application downloaded from the server over the Internet, said application such that it can be installed on the Internet-user's personal computer
- a stand-alone application product bought and sold in the marketplace It is noted that all of the above functionality could further be extended in scope to include the capability of handling the full AVSS MIME attachments.

The Internet Gateway application implements at least one of the following functions: the reception of incoming audio-video information from the internet; and the making of internal audio-video information digitally accessible to third parties on the Internet.

Implementation of a first embodiment of this part of the present invention requires the following AVSS features:

8. Effective "loopback" at the AVSC of incoming video to outgoing video during record 9. The capability to accept and playback appropriate digital files from third parties as controlled by applications.

12. A video editing capabilities. This capability may be internally implemented as part of an applications program, or in the alternative, may be capable of invoking third party video and/or audio editors.

Where a remote user is outside the enterprise, the principles of the present contemplate the utilization of third-party browsers including, but specifically not limited to Netscape, Microsoft Internet Explorer, and/or FTP.

Embodiments of the Internet Gateway application would typically require the following capabilities:

1. Generic control protocol interface/API.
2. A generic multi-platform audio-video recording/playback utility (similar to vfstool) referred to herein as the "mode control GUI" or "MCG".
3. Multi-session recording/playback capability.
4. Analog A/V I/O.
5. An AVSC decoder is co-allocated when an encoder is allocated. This ensures that the decoder is always available during the record session for review.
6. Variable capacity scaling to match the needs of supported applications.
7. File transfer capability (pull model) among AVSSs driven by specific file transfer requests made by applications.
8. Effective "loopback" at the AVSC of incoming video to outgoing video during record Additionally, at least one, and in some implementations both, of the following capabilities are required by some embodiments:

9. The capability to accept and playback appropriate digital files from third parties as controlled by applications.
10. The capability to transfer appropriate digital files to third parties as controlled by applications.
12. A video editing capabilities. This capability may be internally implemented as part of an applications program, or in the alternative, may be capable of invoking third party video and/or audio editors.

4.16.8 Video Publishing

Video publishing is accomplished by a user posting video on the AVSS for viewing within the desktop collaboration system or throughout the standard data-based Internet/Intranet.

Desktops (analog or digital) can access stored video documents, either over the LAN, the WAN, or the Internet. They can also be made available to CMW users, as well as outside workstations which have reduced graphics capability. Video publishing enables the publishing of the documents to the outside world, as well as the importing, from the outside world, of additional material, again including text, graphics, audio, video or multimedia files. This latter feature comprehends the import and export of a number of disparate video and other formats including, but specifically not limited to, MPEG1–7 Motion JPEG, Video for Windows, Quicktime, DVI, recorded H.320, wavelets, and wavelet-compressed fractals.

The implementation of video publishing on the AVSS comprehends a transcoding methodology embodied as hardware, software or firmware to enable the transcoding among the several formats required, thereby making the video files substantially format transparent to the receiver thereof. Any user with a workstation and permissions from the system administrator can accordingly publish documents to any user on the net or any other person outside the net who has access to the files. This enables high quality video publishing from analog equipment without the expense of implementing digital equipment At some point, it becomes cost-prohibitive to maintain all the video files ever created by an enterprise on rapid online storage, such as magnetic or magneto-optical hard drives. At some point long term or mass storage must be implemented for outdated or seldom-accessed video files. The present invention contemplates the inclusion therein of an automated routine which determines the relative time importance of files and either moves them to and from one or more types of long term storage device, including mass storage, magnetic tape, or other long term storage technology well known to those having ordinary skill in the art, or which deletes the files from the system. This algorithm either presents the user with the option of archiving her video files, or does so automatically. This may be done by user script from the System Administrator, or other archival storage technology well known to those having ordinary skill in the art.

4.17 Multimedia Applications

The present invention enables the establishment of real time data sharing sessions between two workstations using shareboard or other synchronized data sharing technologies. The implementation of shareboard enables a given application to be invokable on each work ion involved in the video conference, video mail or other application taught herein. Any user having permission to access the file may then import onto his screen, as another window, a copy of the application onto that screen. Independent scrolling of each screen is enabled. On top of this application in the window the users may then independently point, draw, type text, and perform other graphics functions by means of graphics overlay files. The user can further grab other file programs and so forth and draw them into the conference window. Further, the users may independently telepoint the items on one or more of these applications. Each of the shareboard features are further explain in the incorporated reference.

The present invention enables the shareboard features previously discussed to be extended to the use of stored applications. This enables a user to simultaneously narrated and telepoint, for instance point into the subject of interest and using language like "this one here and that one over there". Accordingly, it will be appreciated that what is required is minimally the user's voice being synchronized with the actions of the pointer. The present invention not only enables this feature in real time, but further enables that this synchronized speech and graphics capability is storable and retrievable such that when the stored file is invoked the data, speech, and graphics synchronlzation remains accurate. This enables the file to be recorded, stored, and sent to another user as video mail, as an input in response to an answering system greeting, as a document, or substantially in any other file format taught or made obvious by the teachings of the present inventions. It should be noted that this storage includes underline bitmaps of any application so invoked.

The shareboard reference, fully discussed n the incorporated reference, is used in a first embodiment of the present invention. This provides for a uniform user interface. As shareboard is an intricate feature of the video conference methodologies taught herein, the extension of its features to the other applications taught herein enables like functionality without the implementation of additional recording tools or user interfaces. In a very real sense the utilization of shareboard not only means that a user must learn only one interface, usable in real time or otherwise, but it also helps with the users ideation that he is enabled, by the principles of the present invention, to share data across the several applications forming the application suite herein. The combination of multimedia synchronization, previously discussed, combined with shareboard functionality solves a number of compatibility, data reuse, and user interface problems. Moreover, the user shareboard in operative combination with the multimedia synchronization previously discussed enables the implementation of the principles of the present invention utilizing very specific data storage formats as well as the sharing of bitmaps.

A slightly more general case in the use of shareboard is application sharing. When an application is invoked and a plurality of conference users can simultaneously utilize it, for instance each entering data in a single shared spreadsheet program. The present invention is no longer operating with only a snapshot of a bitmap image, but rather is actually working in the process of the application and the several users are simultaneously changing files together.

4.17.1 Multimedia Mail

The Multimedia Mail application adds synchronized datashare, e.g., synchronized-Shareboard/T.120 recording, storage, browsing, and playback capabilities to the Video Mail application described in the previous section. This inclusion of this feature provides significant value in that mail messages can now include the same media options as real-time desktop video conferencing. Thus a user can telepoint to one number in a spreadsheet, and then circle another number in the spreadsheet, as she first smiles and then says "How on earth could this number be half of this number?" and the entire cross-media message gets captured and conveyed as it would have been in a live desktop video conference, including all the subtle communications included by gesture, tone of voice, body language, and so forth.

The full content of other multimedia storage applications with synchronized datashare, e.g., synchronized-Shareboard T.120 recording and playback capabilities. Thus a user can forward a multimedia answering application message, multimedia conference recording, and so forth with other authors or authoring venues in multimedia mail or other multimedia application taught herein. This application requires a new AVSS feature:

11. Synchronized datashare, e.g., synchronized-shareboard/T.120 recording, storage, browsing, and playback. This event list information is best stored in a separate file from the MPEG A/V file; the pair of this event list and the MPEG A/V file could be called a "multi-media metafile."

4.17.2 Multimedia Answering System

The Multimedia Answering application adds synchronized datashare, e.g., synchronized-Shareboard/T.120 recording, storage, browsing, and playback capabilities to the Video Answering application described in the previous section.

Utilization of this feature provides significant value-in that a user can leave a more complete message in comparatively very little time should the call recipient themselves or the necessary connectivity not be available at the time a call attempt is made. This is because all relevant graphic overlay can be included in either the recipient's greeting or the caller's message.

Again, this application, like all other multimedia applications discussed herein utilizes the previously discussed feature 11.

4.17.3 Multimedia Conference Recording

The Multimedia Conference Recording application adds synchronized datashare, e.g., synchronized-Shareboard/T.120 recording, storage, browsing, and playback capabilities feature 11 to the Video Conference Recording application described in the previous section. This ensures that all transactions spanning the full spectrum of media used in desktop teleconferences of two or more participants can be captured for later review.

4.17.4 Multimedia Documents

The Multimedia Documents application adds synchronized datashare, e.g., synchronized-Shareboard/T.120 recording, storage, browsing, and playback capabilities of feature 11 to the video documents application described in the previous section. This ensures that procedural descriptions leveraging video can also include synchronized telepointing and annotation. This is extraordinarily valuable in on-line training and reference material applications.

4.17.5 General Purpose Multimedia Storage

The General Purpose Multimedia Storage application adds synchronized datashare, e.g., synchronized-Shareboard/T.120 recording, storage, browsing, and playback capabilities feature 11 to the General Purpose Video Storage application described in the previous section. The advantages presented by such an implementation mirror those discussed above in the section entitled "Multimedia Documents".

4.17.6 Intranet Multimedia Storage Utility

The Intranet Multimedia Storage application adds synchronized datashare, e.g., synchronized-Shareboard/T.120 recording, storage, browsing, and playback capabilities of feature 11 to the Intranet Video Storage application described in the previous section. Again, the advantages presented thereby are similar to those discussed above in the section entitled "Multimedia Documents".

The principles of the present invention have been discussed herein with reference to certain embodiments thereof. Study of the principles disclosed herein will render obvious to those having ordinary skill in the art certain modifications thereto. The principles of the present invention specifically contemplate all such modifications. The present invention may be practiced without any element disclosed herein.

What is claimed is:

1. A networked multimedia system comprising:
   A) a plurality of workstations, each including
      i) video and audio reproduction capabilities, and
      ii) video and audio capture capabilities;
   B) at least one storage server
      i) the storage server including
         (a) at least one storage cell having
            at least one storage disk,
            a storage disk controller
               associated with each disk, and
            at least one converter; and
         (b) a storage cell manager (AVSM), and
      ii) configured to
         (a) store,
            for later retrieval,
            audio/video signals
            converted by the converter(s); and
   C) at least one signal path,
      i) interconnecting,
         (a) the workstations and the storage server,
   wherein the networked multimedia system is configured to
      ii) store the converted audio/video signals by
         (a) selecting any one of the group consisting of disks, disk controllers, converters, storage cells and storage cell managers (AVSM), according to the following approach:
            if a first converter
               of a first cell
               has reached its capacity or bandwidth limit,
               then a second converter, of the first cell, is selected;
            if a first disk controller
               of the first cell
               has reached its capacity or bandwidth limit
               then a second disk controller of the first cell is selected;
            if a first disk,
               associated with a first of the disk controllers
               has reached its capacity or bandwidth limit,
               then a second disk associated with the first disk controller is selected;
            if the first storage cell
               associated with a first storage cell manager (AVSM)
               has reached its capacity or bandwidth limit,
               then a second storage cell associated with the first storage cell manager (AVSM) is selected; and
            if the first storage cell manager (AVSM) has reached its capacity,
               then a second storage server, is selected, and
         (b) storing the converted signals using each of the selected ones of the group.

2. The networked multimedia system of claim 1, wherein
   A) the system is configured to
      i) facilitate transfer
         (a) of converted audio/video signals
         (b) previously stored by a first storage cell
         (c) to another storage cell.

3. The networked multimedia system of claim 1 wherein
   A) the converter is at least one of
      i) a transcoder, an encoder and a combination encoder/transcoder.

4. The networked multimedia system of claim 1 wherein
   A) retrieved signals can
      i) result in audio/video reproduction
      ii) at one or more of the workstations.

5. The networked multimedia system of claim 1 wherein
   A) the converted signals are stored
      i) in at least one file, which can be accessed by
         (a) more than one workstation at the same time and/or
         (b) more than one application type.

6. The networked multimedia system of claim 5 wherein
   A) multiple copies of each such file can exist.

7. The networked multimedia system of claim 5 further comprising:
   A) a storage server defined by at least the following
      i) at least one of the storage cells,
      ii) at least one of the converters and
      iii) at least one controller configured to do at least one of the group of
         (a) determine whether signal conversion is to occur;
         (b) if the system comprises more than one converter, determine which of a plurality of converters will accomplish the conversion;
         (c) if the system comprises more than one storage cell,
            determine which of the storage cells will store the converted signals;
         (d) control the subsequent retrieval of the stored signals; and
         (e) determine which copy of the file is accessed for retrieval.

8. The networked multimedia system of claim 7, wherein
   A) the storage server
      i) is physically distributed or decentralized across the system.

9. The networked multimedia system according to claim 5, wherein the system is further configured to
   A) generate a sequence of graphics rendering events
      i) associated with computer generated images and/or overlay graphics at a workstation, and
   B) save the generated sequence.

10. The networked multimedia system according to claim 9, wherein
   A) the generated sequence of graphics rendering events
      i) can be played back to render computer generated images and/or overlay graphics
         (a) at a workstation,
         (b) together with a workstation-user related audio and video
         (c) in a determinable temporal relationship, and B) the system can
  i) save the event sequence
    (a) related to the displayed computer generated and/ or overlay graphics images and/or the audio and video
  ii) such that the event sequence can later be reproduced
    (a) at a workstation
    (b) in the determined temporal relationship.

11. The networked multimedia system according to claim 10, wherein
A) the at least one file includes
  i) the saved sequence of graphics rendering events.

12. The networked multimedia system according to claim 3, further comprising:
A) at least one decoder, configured to
  i) decode signals retrieved from storage.

13. The networked multimedia system of claims 5, wherein
A) the file is a metafile including
  i) at least one of the group of an audio-video file, audio only file, video only file, a graphics event file, a window event file, an application startup event file, a bit map file, a postscript file, a graphics file, a synchronization file and a text file.

14. The networked multimedia system of claim 13, wherein the metafile further includes
  i) at least one pointer referencing
    (a) a predetermined file or group of files on one or more of the storage cells
  ii) onto at least one storage cell;
D) transferring
  i) previously stored audio/video signals
    (a) to another storage cell whether included in that or another storage cell;
E) managing
  i) the storage arid
  ii) transfer,
    (a) of the audio/video converted signals,
    (b) among storage cells.

15. A method of using a networked multimedia system comprising:
A) capturing audio and video at
  i) one or more workstations, each including
    (a) video and audio reproduction capabilities, and
    (b) video and audio capture capabilities;
B) converting the captured audio and video
  i) into a form suitable for storage;
C) storing
  i) for later retrieval,
  ii) the converted audio/video signals
  iii) by using
    (a) at least one storage cell having
      at least one storage disk,
      a storage disk controller
        associated with each disk, and
      at least one converter; and
    (b) a storage cell manager (AVSM); and
D) storing the converted audio/video signals,
  i) by selecting any one of the group consisting of disks, disk controllers, converters, storage cells and storage cell managers (AVSM), according to the following approach:
    (a) if a first converter
      of a first cell
      has reached its capacity or bandwidth limit,
      then a second converter, of the first cell, is selected;
    (b) if a first disk controller
      of the first cell
      has reached its capacity or bandwidth limit
      then a second disk controller of the first cell is selected;
    (c) if a first disk,
      associated with a first of the disk controllers
      has reached its capacity or bandwidth limit,
      then a second disk associated with the first disk controller is selected;
    (d) if the first storage cell
      associated with a first storage cell manager (AVSM)
      has reached its capacity or bandwidth limit,
      then a second storage cell associated with the first storage cell manager (AVSM) is selected; and
    (e) if the first storage cell manager (AVSM) has reached its capacity,
      then a second storage server, is selected, and
    (b) between any two storage cells
      respectively under control of different storage cell managers (AVSM).

16. The method of claim 15, further comprising the step of:
A) reproducing
  i) audio and/or video
  ii) at one or more of the workstations
  iii) based on the retrieved signals.

17. The method of claim 15, wherein
A) converted signals are stored
  i) in at least one file, which can be accessed by
    (a) more than one workstation at the same time and/or
    (b) more than one application type.

18. The method of claim 17, wherein
A) multiple copies of each such file can exist.

19. The method of claim 17, further comprising the steps of:
A) generating a sequence of graphics rendering events
  i) associated with computer generated images and/or overlay graphics at a workstation, and
B) saving the generated sequence.

20. The method of claim 19, wherein
A) the generated sequence of graphics rendering events
  i) can be played back to render computer generated images and/or overlay graphics
    (a) at a workstation,
    (b) together with a workstation user related audio and video
    (c) in a determinable temporal relationship the method comprising the step of:
  ii) saving th e event sequence
    (a) related to the displayed computer generated and/ or overlay graphics images and/or the audio and video
    (b) such that the event sequence can later be reproduced
      at a workstation
      in the determined temporal relationship.

21. The method of claim 20, wherein
A) the at least one file includes
  i) the saved sequence of graphics rendering events.

22. The method of claim 18, further comprising the step of:
A) decoding signals retrieved from storage.

* * * * *

(12) EX PARTE REEXAMINATION CERTIFICATE (7155th)
United States Patent
Ludwig et al.

(10) Number: US 6,816,904 C1
(45) Certificate Issued: Nov. 10, 2009

(54) NETWORKED VIDEO MULTIMEDIA STORAGE SERVER ENVIRONMENT

(75) Inventors: Lester Ludwig, Hillsborough, CA (US); William Blake Brown, Los Gatos, CA (US); Inn J. Yul, Cupertino, CA (US); Anh T. Vuong, San Jose, CA (US); Richard W. Vanderlippe, San Francisco, CA (US); Gerald Burnett, Atherton, CA (US); Chris Lauwers, Menlo Park, CA (US); Richard Lui, Union City, CA (US); Daniel Applebaum, Incline Village, NV (US)

(73) Assignee: Baldwin Enterprises, Inc., Salt Lake City, UT (US)

Reexamination Request:
No. 90/009,022, Feb. 29, 2008

Reexamination Certificate for:
Patent No.: 6,816,904
Issued: Nov. 9, 2004
Appl. No.: 09/565,192
Filed: May 4, 2000

Related U.S. Application Data

(63) Continuation of application No. PCT/US98/23596, filed on Nov. 4, 1998.
(60) Provisional application No. 60/064,266, filed on Nov. 4, 1997.

(51) Int. Cl.
*G06F 17/30* (2006.01)
G06F 15/173 (2006.01)
G06F 15/16 (2006.01)

(52) U.S. Cl. .................. 709/226; 709/204; 725/145; 348/E7.081

(58) Field of Classification Search .................. 707/10, 707/100
See application file for complete search history.

(56) References Cited

U.S. PATENT DOCUMENTS

| | | |
|---|---|---|
| 3,721,777 A | 3/1973 | Thomas |
| 3,723,653 A | 3/1973 | Tatsuzawa |
| 3,873,771 A | 3/1975 | Kleinerman et al. |
| 3,922,488 A | 11/1975 | Gabr |
| 3,974,337 A | 8/1976 | Tatsuzawa |

(Continued)

FOREIGN PATENT DOCUMENTS

| | | |
|---|---|---|
| DE | 35 07 152 | 8/1985 |
| EP | 0 041 902 | 12/1981 |
| EP | 0 190 060 | 8/1986 |
| EP | 0 354 370 | 2/1990 |
| EP | 376588 | 7/1990 |

(Continued)

OTHER PUBLICATIONS

Ahuja, S.R., Ensor, J. Robert, and Horn, David N., The Rapport Multimedia Conferencing System, ACM Proceedings Conference on Office Information Systems, pp. 1–8 (1988).

(Continued)

*Primary Examiner*—Sam Rimell

(57) ABSTRACT

A video storage environment for a networked multimedia system comprising a plurality of workstations, each with audio and video reproduction and capture capabilities. The video storage environmental comprises one or more storage servers. In one embodiment, each video storage server comprises at least one storage cell. Each storage cell internally comprises at least one storage disk, at least one converter, and at least one storage disk, at least one converter, and at least one storage cell manager. The invention provides for various methods of resource allocation under various conditions and policies where there are pluralities of like entities. The invention also provides for transfers of video files among storage disks anywhere in the storage environment, and provides for the same video file to be used simultaneously by multiple users and types of applications. The approach can be extended to included multimedia files comprising any of graphics animations, dynamic annotations, text, and other media accompanying the stored video.

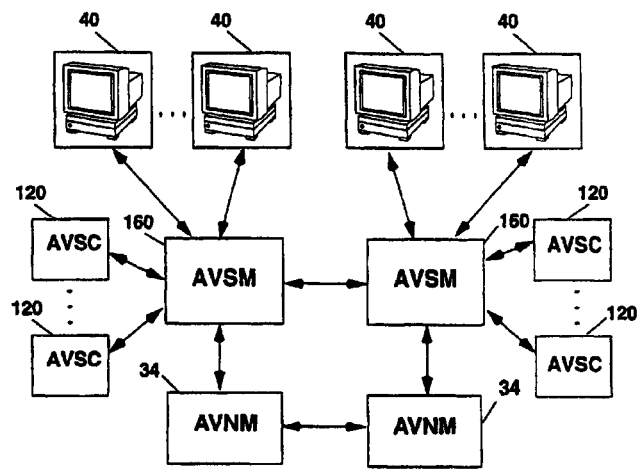

U.S. PATENT DOCUMENTS

| | | |
|---|---|---|
| 4,005,265 A | 1/1977 | Verhoeckx et al. |
| 4,054,908 A | 10/1977 | Poirier et al. |
| 4,210,927 A | 7/1980 | Yumde et al. |
| 4,400,724 A | 8/1983 | Fields |
| 4,430,526 A | 2/1984 | Brown et al. |
| 4,441,180 A | 4/1984 | Schussler |
| 4,451,705 A | 5/1984 | Burke et al. |
| 4,475,193 A | 10/1984 | Brown |
| 4,476,349 A | 10/1984 | Cottrell et al. |
| 4,479,195 A | 10/1984 | Herr et al. |
| 4,500,960 A | 2/1985 | Babecki et al. |
| 4,516,156 A | 5/1985 | Fabris et al. |
| 4,529,839 A | 7/1985 | Colton et al. |
| 4,529,840 A | 7/1985 | Colton et al. |
| 4,531,024 A | 7/1985 | Colton et al. |
| 4,574,374 A | 3/1986 | Scordo |
| 4,577,065 A | 3/1986 | Frey et al. |
| 4,599,611 A | 7/1986 | Bowker et al. |
| 4,625,081 A | 11/1986 | Lotito et al. |
| 4,631,664 A * | 12/1986 | Bachman .................... 707/100 |
| 4,645,872 A | 2/1987 | Pressman et al. |
| 4,650,929 A | 3/1987 | Boerger et al. |
| 4,653,090 A | 3/1987 | Hayden |
| 4,672,442 A | 6/1987 | Yamaguchi et al. |
| 4,686,698 A | 8/1987 | Tompkins et al. |
| 4,691,347 A | 9/1987 | Stanley et al. |
| 4,710,917 A | 12/1987 | Tompkins et al. |
| 4,713,806 A | 12/1987 | Oberlander et al. |
| 4,716,585 A | 12/1987 | Tompkins et al. |
| 4,720,850 A | 1/1988 | Oberlander et al. |
| 4,739,509 A | 4/1988 | Bourg |
| 4,741,025 A | 4/1988 | Maruyama et al. |
| 4,786,741 A | 11/1988 | Sachs |
| 4,796,293 A | 1/1989 | Blinken et al. |
| 4,800,344 A | 1/1989 | Graham |
| 4,817,018 A | 3/1989 | Cree et al. |
| 4,837,798 A | 6/1989 | Cohen et al. |
| 4,847,829 A | 7/1989 | Tompkins et al. |
| 4,849,811 A | 7/1989 | Kleinerman |
| 4,850,009 A | 7/1989 | Zook et al. |
| 4,885,747 A | 12/1989 | Foglia |
| 4,888,795 A | 12/1989 | Ando et al. |
| 4,890,320 A | 12/1989 | Monslow et al. |
| 4,893,326 A | 1/1990 | Duran et al. |
| 4,914,586 A | 4/1990 | Swinehart et al. |
| 4,922,523 A | 5/1990 | Hashimoto |
| 4,931,872 A | 6/1990 | Stoddard et al. |
| 4,953,159 A | 8/1990 | Hayden et al. |
| 4,961,211 A | 10/1990 | Tsugane et al. |
| 4,965,819 A | 10/1990 | Kannes |
| 4,977,520 A | 12/1990 | McGaughey et al. |
| 4,987,492 A | 1/1991 | Stults et al. |
| 4,995,071 A | 2/1991 | Weber et al. |
| 4,995,078 A | 2/1991 | Monslow et al. |
| 4,998,243 A | 3/1991 | Kao |
| 5,003,532 A | 3/1991 | Ashida et al. |
| 5,010,399 A | 4/1991 | Goodman et al. |
| 5,012,509 A | 4/1991 | Nakamura et al. |
| 5,014,267 A | 5/1991 | Tompkins et al. |
| 5,016,976 A | 5/1991 | Horner et al. |
| 5,027,400 A | 6/1991 | Baji et al. |
| 5,042,062 A | 8/1991 | Lee et al. |
| 5,056,136 A | 10/1991 | Smith |
| 5,061,046 A | 10/1991 | Lee et al. |
| 5,072,442 A | 12/1991 | Todd |
| 5,073,926 A | 12/1991 | Suzuki et al. |
| 5,099,510 A | 3/1992 | Blinken, Jr. et al. |
| 5,109,515 A | 4/1992 | Laggis et al. |
| 5,109,517 A | 4/1992 | Houda et al. |
| 5,121,426 A | 6/1992 | Baumhauer, Jr. et al. |
| 5,127,041 A | 6/1992 | O'Sullivan |
| 5,130,399 A | 7/1992 | Ikeno et al. |
| 5,130,793 A | 7/1992 | Bordry et al. |
| 5,130,801 A | 7/1992 | Yamaguchi |
| 5,133,079 A | 7/1992 | Ballantyne et al. |
| 5,146,325 A | 9/1992 | Ng |
| 5,155,761 A | 10/1992 | Hammond |
| 5,157,491 A | 10/1992 | Kassatly |
| 5,170,427 A | 12/1992 | Guichard et al. |
| 5,190,586 A | 3/1993 | Mizuguchi et al. |
| 5,191,611 A | 3/1993 | Lang |
| 5,195,086 A | 3/1993 | Baumgartner et al. |
| 5,195,087 A | 3/1993 | Bennett et al. |
| 5,200,989 A | 4/1993 | Milone |
| 5,202,828 A | 4/1993 | Vertelney et al. |
| 5,202,957 A | 4/1993 | Serrao |
| 5,218,627 A | 6/1993 | Corey et al. |
| 5,224,094 A | 6/1993 | Maher et al. |
| 5,231,492 A | 7/1993 | Dangi et al. |
| 5,239,466 A | 8/1993 | Morgan et al. |
| 5,249,218 A | 9/1993 | Sainton |
| 5,253,362 A | 10/1993 | Nolan et al. |
| 5,260,941 A | 11/1993 | Wilder et al. |
| 5,262,875 A | 11/1993 | Mincer et al. |
| 5,283,637 A | 2/1994 | Goolcharan |
| 5,293,619 A | 3/1994 | Dean |
| 5,303,343 A | 4/1994 | Ohya et al. |
| 5,315,633 A | 5/1994 | Champa |
| 5,319,795 A | 6/1994 | Hamabe et al. |
| 5,323,472 A | 6/1994 | Falk |
| 5,325,423 A | 6/1994 | Lewis |
| 5,333,133 A | 7/1994 | Andrews et al. |
| 5,333,299 A | 7/1994 | Kovai et al. |
| 5,335,321 A | 8/1994 | Harney et al. |
| 5,341,374 A | 8/1994 | Lewen et al. |
| 5,345,258 A | 9/1994 | Matsubara et al. |
| 5,351,276 A | 9/1994 | Doll, Jr. et al. |
| 5,353,398 A | 10/1994 | Kitahara et al. |
| 5,363,441 A | 11/1994 | Feiner et al. |
| 5,363,507 A | 11/1994 | Nakayama et al. |
| 5,365,265 A | 11/1994 | Shibata et al. |
| 5,367,629 A | 11/1994 | Chu et al. |
| 5,373,549 A | 12/1994 | Bales et al. |
| 5,374,952 A | 12/1994 | Flohr |
| 5,375,068 A | 12/1994 | Palmer et al. |
| 5,379,374 A | 1/1995 | Ishizaki et al. |
| 5,382,972 A | 1/1995 | Kannes |
| 5,384,598 A | 1/1995 | Rodriguez et al. |
| 5,384,772 A | 1/1995 | Marshall |
| 5,386,581 A | 1/1995 | Suzuki et al. |
| 5,390,316 A | 2/1995 | Cramer et al. |
| 5,392,223 A | 2/1995 | Caci |
| 5,392,277 A | 2/1995 | Bernstein |
| 5,392,346 A | 2/1995 | Hassler et al. |
| 5,404,316 A | 4/1995 | Klingler et al. |
| 5,404,435 A | 4/1995 | Rosenbaum |
| 5,408,526 A | 4/1995 | McFarland et al. |
| 5,408,662 A | 4/1995 | Katsurabayashi |
| 5,410,595 A | 4/1995 | Park et al. |
| 5,416,618 A | 5/1995 | Juday |
| 5,422,883 A | 6/1995 | Hauris et al. |
| 5,432,525 A | 7/1995 | Maruo et al. |
| 5,440,624 A | 8/1995 | Schoof, II |
| 5,444,476 A | 8/1995 | Conway |
| 5,467,288 A | 11/1995 | Fasciano et al. |
| 5,471,318 A | 11/1995 | Ahuja et al. |
| 5,473,679 A | 12/1995 | La Porta et al. |
| 5,475,421 A | 12/1995 | Palmer et al. |
| 5,477,546 A | 12/1995 | Shibata et al. |
| 5,485,504 A | 1/1996 | Ohnsorge |
| 5,491,695 A | 2/1996 | Meagher et al. |

| | | |
|---|---|---|
| 5,506,954 A | 4/1996 | Arshi et al. |
| 5,515,491 A | 5/1996 | Bates et al. |
| 5,517,652 A | 5/1996 | Miyamoto et al. |
| 5,526,024 A | 6/1996 | Gaglianello et al. |
| 5,550,966 A | 8/1996 | Drake et al. |
| 5,553,222 A | 9/1996 | Milne et al. |
| 5,561,736 A | 10/1996 | Moore et al. |
| 5,565,910 A | 10/1996 | Rowse et al. |
| 5,581,702 A | 12/1996 | McArdle |
| 5,590,128 A | 12/1996 | Maloney et al. |
| 5,594,495 A | 1/1997 | Palmer et al. |
| 5,602,580 A | 2/1997 | Tseng |
| 5,608,653 A | 3/1997 | Palmer et al. |
| 5,610,972 A | 3/1997 | Emery et al. |
| 5,623,690 A | 4/1997 | Palmer et al. |
| 5,659,369 A | 8/1997 | Imaiida |
| 5,689,553 A | 11/1997 | Ahuja et al. |
| 5,719,786 A | 2/1998 | Nelson et al. |
| 5,751,336 A | 5/1998 | Aggarwal et al. |
| 5,777,663 A | 7/1998 | Shibata et al. |
| 5,796,727 A | 8/1998 | Harrison et al. |
| 5,815,233 A | 9/1998 | Morokawa et al. |
| 5,864,844 A | 1/1999 | James et al. |
| 5,872,923 A | 2/1999 | Schwartz et al. |
| 5,881,168 A | 3/1999 | Takaoka et al. |
| 6,181,867 B1 | 1/2001 | Kenner et al. |
| 6,336,143 B1 | 1/2002 | Diedrich et al. |
| 6,343,314 B1 | 1/2002 | Ludwig et al. |
| 6,577,324 B1 | 6/2003 | Palmer et al. |
| 7,152,093 B2 | 12/2006 | Ludwig et al. |

FOREIGN PATENT DOCUMENTS

| | | |
|---|---|---|
| EP | 0 403 118 | 12/1990 |
| EP | 410378 | 1/1991 |
| EP | 0 414 222 | 2/1991 |
| EP | 0 436 345 | 7/1991 |
| EP | 0 453 128 | 10/1991 |
| EP | 0 497 022 | 8/1992 |
| EP | 0 516 371 | 12/1992 |
| EP | 0 523 618 | 1/1993 |
| EP | 0 523 626 | 1/1993 |
| EP | 0 535 601 | 4/1993 |
| EP | 0 548 597 | 6/1993 |
| EP | 561133 | 9/1993 |
| EP | 0 561 381 | 9/1993 |
| EP | 574138 | 12/1993 |
| EP | 0 604 053 | 6/1994 |
| JP | 62091045 | 4/1987 |
| JP | 1318136 | 12/1989 |
| JP | 2002441 | 1/1990 |
| JP | 2089482 | 3/1990 |
| JP | 2 285 759 | 11/1990 |
| JP | 5014525 | 1/1993 |
| JP | 6086276 | 3/1994 |
| WO | WO 9100664 | 1/1991 |
| WO | WO 9103116 | 3/1991 |
| WO | WO 9120149 | 12/1991 |
| WO | WO 9212583 | 7/1992 |
| WO | WO 9221211 | 11/1992 |
| WO | WO 9307703 | 4/1993 |
| WO | WO 9424803 | 10/1994 |

OTHER PUBLICATIONS

Ensor, J.R., Ahuja, S.R., Connaghan, R.B., Pack, M., and Seligmann, D.D., The Rapport Multimedia Conferencing System (Demonstration), CHI '92, May 3–7, pp. 581–582 (1992).

16.2 IPv4: The Internet Protocol Version 4.

ACM Press, Conference on Organizational Computing Systems, SIGOIS Bulletin, vol. 12, No. 2–3, Nov. 5–8, 1991.

Addeo, et al., "An Experimental Multi–Media Bridging System", ACM 1988.

Addeo, et al., "Personal Multi–media Multi–point Communications Services for Broadband Networks", IEEE Ch2535–3/88/000–0053 1988.

Ahuja, et al., "Coordination and Control of Multimedia Conferencing," IEEE Communication Magazine, pp. 38–42, May 1992.

Ahuja, et al., "The Rapport Multimedia Conferencing System", Conference on Office Information Systems, Mar. 1988.

Ahuja, et al., A Comparison of Application Sharing Mechanisms in Real–Time Desktop Conferencing Systems, 1990.

Ahuja, et al., Networking Requirements of the Rapport Multimedia Conferencing System, 1988 IEEE.

Andersen, Plato People: Term–talk: Plato's Instant Messaging, Dec. 19, 2002.

Anderson, D. P. and Homsy, G., "A Continuous Media I/O Server and Its Synchronization Mechanism", Oct. 1991, Computer 24, 10 (Oct. 1991), 51–57.

Banks, Michael A., "America Online: A Graphics–based Success" Link–Up, Jan./Feb. 1992.

Bellcore News, "IMAL Makes Media Merging Magic," 5(20), Nov. 9, 1988.

Belville, Sharon, "Zephyr on Athena," Massachusetts Institute of Technology, ver. 3, Sep. 10, 1991.

Biswas, et al., "Distributed Scheduling of Meetings: A Case Study in Prototyping Distributed Application," System Integration, 1992 2.sup.nd. International Conference.

Boll, et al., "Suppression of Acoustic Noise in Speech Using Two Microphone Adaptive Noise Cancellation," IEEE Transactions on Acoutics, Speech, and Signal Processing, vol. ASSP–28, No. 6, Dec. 1980.

Cheng, et al., "A model for secure distributed computations in a heterogeneous environment," Proc. Of the Aerospace Computer Security Applications Conference, Orlando, Dec. 12–16, 1988, Washington, IEEE Comp., Soc. Press, US, vol. Conf. 4, p. 233–241.

Chu, P.L., PictureTel Corporation, "Audio Compression and Echo Cancellation for Low Bit Rate Video Teleconferencing," Applications of Signal Process to Audio and Acoustics, Oct. 1991.

Cohen, et al., "Audio Windows for Binaural Telecommunication," EIC, Tokyo (Oct. 1991).

Cohen, et al., "Audio Windows: User Interface for Manipulating Virtual Acoustic Environments," pp. 479–480.

Cohen, et al., "Design and Control of Shared Conferencing Environments for Audio Telecommunication," Proceedings of the Second Int'l Symposium on Measurement and Control Robotics (ISMCR '92), Tsukuba Science City, Japan, (Nov. 15–19, 1992), pp. 405–412.

Cohen, et al., "Exocentric Control of Audio Imaging in Biaural Telecommunication," IEICE Tans. Fundamentals, vol. E75–A, No. 2, (Feb. 1992).

Cohen, et al., "Multidimensional Audio Window Management," Int'l Journal of Man–Machine Studies, vol. 34: 319–336 (1991).

Cohen, et al., "Multidimensional Audio Windows: Conference, Concerts and Cocktails," Human Factors Society Meeting, SF, CA, pp. 1–15, Jun. 12, 1991.

Crawford, et al., "Videomatic Switching: System and Services", Digital Communications, 1988 Int. Zurich Seminar 1988.

Crowley, et al., "MMConf: An Infrastructure for Building Shared Multimedia Applications," CSCW 90 Proceedings, Oct. 1990.

DellaFera, et al. "The Zephyr Notification System," Proceedings of the USENIX Winter Technical Conference, Feb. 1988.

Dourish, "Culture and Control in a Media Space", Proceedings of the 3rd European Conference on Computer–Supported Cooperative Work 1993.

Edwards, W. Keith, "The Design and Implementation of the Montage Multimedia Mail System," Communication Software, IEEE Tricomm '91 Proceedings (Apr. 1991).*

Ellis, et al., "Groupware, Some Issues and Experiences", Communications of the ACM, Jan. 1991.

Elrod, S., et al. "Liveboard: A Large Interactive Display Supporting Group meetings, Presentations and Remote Collaboration" CHI '92 (May 3–7, 1992), 1992 ACM at 599–607.

Ensor, et al., "The Rapport Multimedia Conferencing System—Software Overview," Computer Workstation Conference, IEEE, pp. 52–58, 1988.

Ensor, et al., The Rapport Multimedia Communication System (Demonstration), May 1992.

Ensor et al., "User Interfaces For Multimedia Multiparty Communications," IEEE International Conference on Communications ICC '93, pp. 1164–1171, May 23–26, 1993.

Ensor, J.R., et al., "Control Issues in Multimedia Conferencing," IEEE, CN2955–3/91/0000–0133, 1991.

Fitzpatrick, et al. "Smart Icons for Address Book Detailed View Entries," IBM Technical Disclosure Bulletin, Dec. 1992.

Free BSD Hypertext Man Pages: Unix 4th Berkeley Release 1991 man pages for 'login,' 'htmp,' 'talk,' and 'who.' Online Internet: http://www.de.freebds.org.

FreeBSD Hypertext Man Pages: rwho, Jun. 6, 1993, 1 pg.

FreeBSD Hypertext Man Pages, Login(1), 4th Berkeley Distribution, Jun. 29, 1991, 3 Pgs.

FreeBSC Hypertext Man Pages, UTMP(5), 4th Berkeley Distribution, May 5, 1991, 3 Pgs.

FreeBSD Hypertext Man Pages, Who(1), Apr. 23, 1991, 2 pgs.

FreeBSD Hypertext Man pages: rwhod, Dec. 11, 1993, 3 Pgs.

Furner, et al., "An ISDN Multipoint Teleconferencing Environment", IEEE Journal on Selected Areas in Communications, vol. 9, May 1991.

Gibbs, "LIZA: An Extensible Groupware Toolkit", Human Factors in Computing Systems, CHI 89 Conference Proceedings, May 1989.

Goldberg, et al., "A Framework for Implementing Groupware", Active Mail—ACM 1992 Conference on Computer–Supported Cooperative Work, Nov. 1992.

Goldberg, et al., "Active Mail: An Architecture for Groupware", Technical Report CS92–1? Weizmann Institute of Science, Oct. 1992.

Gopal, et al. "Directories for networks with casually connected user", IEEE pp. 1060–1064, 1988.

Greenberg, et al., "Issues and Experiences Designing and Implementing Two Group Drawing Tools", Groupware and Computer–Supported Cooperative Work, 1992.

Harrick M. Vin & P. Venkat Rangan, Designing a Multi–User HDTV Storage Server, Jan. 1993, IEEE Journal on Selected Areas in Communications, vol. 11, No. 1, pp. 153–164.

Harris, et al., "Intelligent Network Realization and Evolution: CCITT Capability Set 1 and Beyond," Proceedings of the International Switching Symposium. Yokohama, Oct. 25–30, 1992, Tokyo, IEICE, JP, vol. 2, Symp. 14, p. 127–131, XP0003377009.

Harvey, et al. "Some Aspects of Steeophony Applicable to Conference Use", Journal Audio Engineering Society, Jul. 196, v.11, pp. 212–217, 1963.

Hasebe, K. and Yamaguchi, K., "Continuous Media Network Server", Apr. 1992, in: Proceedings of SPIE, vol. 1662, pp. 291–298.

Hill, G. "Improving Audio Quality: Echo Control in Video-Conferencing", Teleconference, Mar.–Apr. 1991.v.10, n.2, pp. 29–43.*

Horn, et al., "An ISDN Multimedia Conference Bridge", TENCON '90–1990 IEEE Region 10 Conference on Computer and Communication, pp. 853–856, 1990.

Hoshi, et al., "B–ISDN Multimedia Communication and Collaboration Platform Using Advanced Video Workstations to Support Cooperative Work," Dec. 1992.

IBM TDB0992, "Public Nicknames in OS/2 Office Address Book," Sep. 1992.

IBM TDB1192, "Public Search Lists in OS/2 Office Address Book," Nov. 1992.

Ishii, et al., "Beyond Videophones: TeamWorkStation–2 for Narrowband ISDN", Proceedings of the 3rd European Conference on Computer–Supported Cooperative Work, Sep. 1993.

Ishii, H. "TeamWorkstation: Towards a Seamless Shared Workspace", CSCW 90 Proceedings, pp. 13–26, oct. 1990.

Ishii, H., et al. "Clearboard: A seamless Medium for Shared Drawing and Conversation with Eye Contact," CHI p92 (May 3–7, 1992), 1992 ACM at 525–532.

Ishii, H., et al. "Toward an Open Shared Workspace: Computer and Video Fusion Approach of TeamWorkstataion," Communication of the ACM, vol. 34, No. 12, pp. 37–50, Dec. 1991.

Jack, Terry, Alternative Technologies and Delivery Systems for Broadband and ISDN Access, Aug. 1992, Communications Magazine, IEEE, vol. 30, Issue 8, pp. 58–64.

Kamel, "An Integrated Approach to Share Synchronous Groupware Workspaces", IEEE 1993.

Kendall, et al., "Simulating the Cue of Spatial Hearing in Natural Environments," Northwestern University, Evanston, IL 60201.

Kippenhan, et al., "Videoconferencing in the Energy Research Community," National HEPnet Management, Fermi National Accelerator Laboratory, Aug. 1992.

Kirsche, et al., "Communication support for cooperative work" Computer Communications, Sep. 1993.

Klein, Telecommunikation von Angesichtzu Angesicht 2323 Telcom Report 9 (1986) Sep./Oct., No. 5, Erlangen, W. Germany.

Kobayashi, et al., "Development and Trial Operation of Video Teleconference System," IEEE Globecom, pp. 2060–2063, 1999.

Koszarek, et al., "A Multi–User Document Review Tool," Multiuser Interfaces and Applications, 1990, p. 207–214.

Lake, et al., "A Network Environment for Studying Multimedia Network Architecture and Control" (1989) Globecom.

Lakshman, et al., "Design and Implementation of a Multimedia Protocol Suite in a BSD Unix Kernel", USENIX Summer 1993 Technical Conference Proceedings.

Lantz, An Experiment in Integrated Multimedia Conferencing, Department of Computer Science, Stanford University, Stanford, CA 94035, Dec. 1986.

Lantz, et al., Collaboration Technology Research at Olivetti Research California, Aug. 1989.

Lauwers, et al., Collaboration Awareness in Support of Collaboration Transparency: Requirements for the Next Generation of Shared Windows Systems, (Olivetti Reserach California) Version of Apr. 1989.

Lauwers, et al. Replicated Architecture for Shared Window Systems: A Critique, (Olivetti Research California), CHI 90 Proceedings, Version of Apr. 1990.

Leffler, Samuel J., et al., An Advanced 4.4BSD Interprocess Communication Tutorial, 1993 The Regents of the University of California.

Leung, et al., "Optimum Connection Paths for a Class of Videoconferences", IEEE 1991.

Lichty, Tom, "America Online Tour Guide", MacIntosh Edition, Version 2, Title Page, Copyright Page, Foreword, xviii, pp. 5–6, 24–44, 67, 69, 70–72, 229–253, 297–298, 373, 375–376, and 388, Ventana Press, 1992.

Ludwig, et al., "Laboratory For Emulation and Study of Integrated and Coordinated Media Communication," Bell Communications Research, 1988.

Ludwig, "Integration of CAD/CAE With Multimedia Teleconferencing and Messaging Via Broadband Networks and Shared Resource Servers", 1990 IEEE.

Ludwig, Lester, "A Threaded/Flow Approach to Reconfigurable Distributed Systems and Service Primitives Architectures," Frontiers in Computer Communications Technology, Sigcom '87 Workshop (Aug. 11–13, 1987).

Maeno, et al., Distributed Desktop Conferencing System (Mermaid) Based on Group Communication Architecture, The Transactions of the Institute of Electronics, Information and Comm. Engineers E74 (1991) Sep., No. 9, Tokyo, JP.

Maeno, K., et al., "Distributed Desktop Conferencing System (Mermaid) Based on Group Communication Architecture," IEEE, ICC '91 CH2984–3/91/0000–0520, pp. 0520–0525.

Marshak, Ronni T. "Beyond Mail for Windows—epitomizing the mail–enabled application", Patricia Seybold's Office Computing Report, Sep. 1992 v15 n9. (full text copy from Computer Select 1992 CD).

Martens, et al., "Principal Components Analysis and Resynthesis of Spectral Cues to Perceived Direction," Proc. Of the 1987 Int'l Computer Music Conference, Illinois.

Masaki, et al., "A Desktop Teleconferencing Terminal Based on B–ISDN: PMTC," NTT Review, 4 (4):81–85, 1992.

Masaki, S., et al. "Multimedia Handling Scheme in a Groupware System for B–ISDN," Globecom '92 pp. 747–750, Dec. 1992.

Miller, et al., News On Demand for Multimedia Networks (date unclear).

Naganawa, et al., "A Study of Audio Communication Devices for ISDN," IEEE Transactions of Consumer Electronics, IEEE Inc. New York, vol. 36, No. 3, Aug. 1, 1990, p. 753–757.

Nakamura, et al., "Personal Multimedia Teleconferencing Terminal," IEEE, 1990.

Newman–Wolfe, et al., "A Brief Overview of the DCS Distributed Conferencing System", USENIX Summer 1991 Technical Conference Proceedings.

Nunokawa, et al., "Teleconferencing Using Stereo Voice and Electronic CHP", IEEE 1988.

Ohkubo, M., et al., "Design and implementation of a shared workspace by integrating individual workspaces," Conferencing on Supporting Group Work Proceedings of the conference on Office information systems, pp. 142–146, 1990.

Ohmori, et al., "Distributed Cooperative Control for Sharing Applications Based on Multiparty and Multimedia Desktop Conferencing System", IEEE 1992.

P. V. Rangan and H. M. Vin, "Designing file systems for digital video and audio", 1991, in: Proc. of the Thirteenth ACM Symposium on Operating System Principles, pp. 81–94.

P. V. Rangan, et al., "Designing an On–Demand Multimedia Service", Jul. 1992, IEEE Communications Magazine, vol. 30, No. 7, pp. 56–65.

Pagani, et al., "Bringing Media Spaces into the Real World", Proceedings of the 3rd European Conference on Computer–Supported Cooperative Work 1993.

Pascoe, R.A., "Interactive Computer Conference Server" IBM Technical Disclosure Bulletin, vol. 34, No. 7A, Dec. 1991.

Pate "Trends in Multimedia Applications and The Network Models to Support Them", Globecom's 90:, 1990.

Perkins, "Spider: An investigation in collaborative technologies and their effects on network performance" 1991.

Poggio, et al., "CCWS: A Computer–Based, Multimedia Information System Computer"—Oct. 1985.

Ramanathan, et al., Optimal Communication Architecture for Multimedia Conferencing in Distributed Systems, Multimedia Laboratory Dept. of Computer Science and Engineering, University of San Diego, La Jolla, CA.

Rangan, et al. "Media synchronization in distributed multimedia file systems," Multimedia Communications, 1992 pp. 315–328.*

Rangan, et al., "A Window–Based Editor for Digital Video and Audio," System Sciences, 1992 Hawaii Int'l Conference (1992).

Rangan, et al., "Software Architecture for Integration of Video Services in the, etherphone System," IEEE Journal on Selected Areas in Communications, vol. 9, No. 9, Dec. 1991, pp. 1395–1404.

Reinhart, Andy, "Video Conquers the Desktop," Byte, Sep. 1993, p. 64–80.

Rowe, L. and Smith, B., "A Continuous Media Player", Nov. 1992, In Proc. 3rd Int. Workshop on Network and Operating System Support for Digital Audio and Video, pp. 376–386.

Sakata, "B–ISDN Multimedia Workstation Architecture", IEEE 1993.

Sakata, et al., "Development and Evaluation of an In–House Multimedia Desktop Conference System," NEC Research & Development No. 98, pp. 107–117, Jul. 1990.

Sammartino, et al., "Desktop Multimedia Communications—Breaking the Chains," IEEE, 1991.

Saunders, S., "Economical Video Network Uses Unshielded Twisted–Pair Wiring," Data Communications, McGraw Hill, New York, vol. 19, No. 10, p. 103–104, Aug. 1, 1990.

Schooler, Eve M., "A Distributed Architecture for Multimedia Conference Control," ISI/RR–91–289, USC/Information Sciences Institute, Nov. 1991.

Schooler, Eve M., Steven L. Casner, A Packet–switched Multimedia Conferencing System, ACM SIGOIS Bulletin, vol. 1, No. 1, pp. 12–22, Jan. 1989.

Shepherd, et al., "Strudel—An Extensible Electronic Conversation Toolkit", Proceedings of the Conference on Computer–Supported Cooperative Work, Oct. 1990.

Soares, et al., "LAN Based Real Time Audio–Graphics Conferencing System", IEEE Inforcom 1989 Proceedings, vol. II.

Stefik, et al. "Beyond the Chalkboard: Computer Support for Collaboration and Problem Solving," Communications of the ACM, vol. 30, No. 1, Jan. 1987.

Stevens, A. I., "The LOTUS Open Message Interface," Dr. Dobbs Journal, Mar. 1992.

Swinehart, Daniel C. "Systems Support Requirements for Multi–Media Workstations," Xerox PARC, CSL–89–2, 1989.

Swinehart, Daniel C. "Telephone Management in the Etherphone System," Xerox PARC, CSL–89–2, May 1989, pp. 1–5.

Tanigawa, H., et al. "Personal Multimedia–Multipoint Teleconference System," Proc. IEEE INFOCOM'91, pp. 1127–1134, 1991.

Terry and Swinehart, "Managing Stored Voice in the Etherphone System," Xerox PARC, CSL–89–2, 1989.

The Challenges of Networking Video Applications, Starlight Networks, Inc., Feb. 1992.

Velthuijsen, Hugo, "Distributed Artificial Intelligence for Runtime Feature–Interaction Resolution," Computer, vol. 26, No. 8, Aug. 1993, p. 48–55.

Vin, et al. "Multimedia Conferencing in the Etherphone Environment", Computer Magazine V.24 Iss. 10 pp. 69–79, Oct. 1991.

Vin, et al., Heirarchical Conferencing Architecture for Inter–Group Multimedia Collaboration, Multimedia Laboratory Department of Computer Science and Engineering University of California at San Diego, La Jolla, 1991.

Watabe, et al., "A Distributed Multiparty Desktop Conferencing System and Its Architecture", IEEE 1990.

Watabe, et al., "Distributed Desktop Conferencing System with Multiuser Multimedia Interface", IEEE Journal on Selected Areas in Communications, vol. 9, No. 4, May 1991, pp. 531–539.

Watabe, K., et al., "Distributed Multiparty Desktop Conferencing System: Mermaid," CSCW 90 Proceedings, pp. 27–38, Oct. 1990.

Weiss, C., "Desk Top Video Conferencing—An Important Feature of Future Visual Communications," ICC 90, pp. 134–139, 1990 Munich—West Germany.

Whitmyer, Claude, "Groupware: The Software for Collaborative Computing," The Office, Jun. 1989, p. 28.

Zellweger, "Active Paths through Multimedia Documents," Xerox PARC, CSL–89–2, 1989.

Zellweger, et al., "An Overview of the Etherphone System and Its Applications", 1988, in Proceedings of the 2nd IEEE Conference on Computer Workstations, p. 160–168.

Zimmerman, The Finger User Information Protocol, RFC 1288, Dec. 1991.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–14 is confirmed.

Claim 15 is determined to be patentable as amended.

Claims 16–22, dependent on an amended claim, are determined to be patentable.

15. A method of using a networked multimedia system comprising:
- A) capturing audio and video at
  - i) one or more workstations, each including
    - (a) video and audio reproduction capabilities, and
    - (b) video and audio capture capabilities;
- B) converting the captured audio and video
  - i) into a form suitable for storage;
- C) storing
  - i) for later retrieval,
  - ii) the converted audio/video signals
  - iii) by using
    - (a) at least one storage cell having at least one storage disk, a storage disk controller associated with each disk, and at least one converter; and
    - (b) a storage cell manager (AVSM); and
- D) storing the converted audio/video signals, *using the networked multimedia system, wherein the networked multimedia system is configured to store the converted audio/video signals,*
  - i) by selecting any one of the group consisting of disks, disk controllers, converters, storage cells and storage cell managers (AVSM), according to the following approach:
    - (a) if a first converter of a first cell has reached its capacity or bandwidth limit, then a second converter, of the first cell, is selected;
    - (b) if a first disk controller of the first cell has reached its capacity or bandwidth limit then a second disk controller of the first cell is selected;
    - (c) if a first disk, associated with a first of the disk controllers has reached its capacity or bandwidth limit, then a second disk associated with the first disk controller is selected;
    - (d) if the first storage cell associated with a first storage cell manager (AVSM) has reached its capacity or bandwidth limit, then a second storage cell associated with the first storage cell manager (AVSM) is selected; and
    - (e) if the first storage cell manager (AVSM) has reached its capacity, then a second storage server, is selected, and (b) between any two storage cells respectively under control of different storage cell managers (AVSM).

* * * * *